(12) United States Patent
Chikusa et al.

(10) Patent No.: US 7,251,701 B2
(45) Date of Patent: Jul. 31, 2007

(54) DISK ARRAY APPARATUS

(75) Inventors: Takashi Chikusa, Odawara (JP);
Satoru Yamaura, Odawara (JP);
Toshio Tachibana, Atami (JP);
Takehiro Maki, Hadano (JP); Hirotaka Honma, Chigasaki (JP)

(73) Assignee: Hitachi, Ltd., Tokyo (JP)

( * ) Notice: Subject to any disclaimer, the term of this patent is extended or adjusted under 35 U.S.C. 154(b) by 348 days.

(21) Appl. No.: 10/975,417

(22) Filed: Oct. 29, 2004

(65) Prior Publication Data
US 2006/0047908 A1 Mar. 2, 2006

(30) Foreign Application Priority Data
Sep. 1, 2004 (JP) ............... 2004-254522

(51) Int. Cl.
*G06F 13/38* (2006.01)

(52) U.S. Cl. ............... 710/74; 710/300; 711/114; 711/167

(58) Field of Classification Search ............... None
See application file for complete search history.

(56) References Cited

U.S. PATENT DOCUMENTS

| | | | |
|---|---|---|---|
| 2,006 A | * | 3/1841 | Ashmore ............... 12/119.5 |
| 3,665,405 A | * | 5/1972 | Sanders et al. ............ 370/538 |
| 5,901,151 A | | 5/1999 | Bleiweiss et al. |
| 6,915,380 B2 | | 7/2005 | Tanaka et al. |
| 6,971,805 B1 | | 12/2005 | Linnell |
| 2005/0108452 A1 | | 5/2005 | Loffink |
| 2005/0138154 A1 | * | 6/2005 | Seto ............... 709/223 |
| 2005/0138191 A1 | | 6/2005 | Seto et al. |
| 2005/0138258 A1 | | 6/2005 | Seto |
| 2005/0289386 A1 | | 12/2005 | Tawil et al. |
| 2006/0007576 A1 | | 1/2006 | Georgis |
| 2006/0041691 A1 | | 2/2006 | Bashford et al. |

OTHER PUBLICATIONS

Rob Elliott, Serial Attached SCSI, Sep. 30, 2003, HP invent, General Overview, p. 53.*
Working Draft Serial Attached SCSI (SAS), Jul. 9, 2003, pp. 152-153, 191-193.

* cited by examiner

*Primary Examiner*—Kim Huynh
*Assistant Examiner*—Dean Phan
(74) *Attorney, Agent, or Firm*—Mattingly, Stanger, Malur & Brundidge, P.C.

(57) ABSTRACT

A disk array apparatus using an SAS can transfer data without lowering a transfer efficiency of data even if rates of a plurality of physical links connected to a controller and storage device are different. A plurality of HDDs are connected to a controller through an expander. Data are transferred from the controller to the expander and then to HDD. In this connection, the controller and the expander transfers a set of transfer data in a plurality of the HDD-side physical links. The controller-side physical link integrates the transfer data, and multiplexes them to transfer. A plurality of HDDs-side physical links separates the transfer data to transfer in parallel.

22 Claims, 38 Drawing Sheets

FIG. 13A
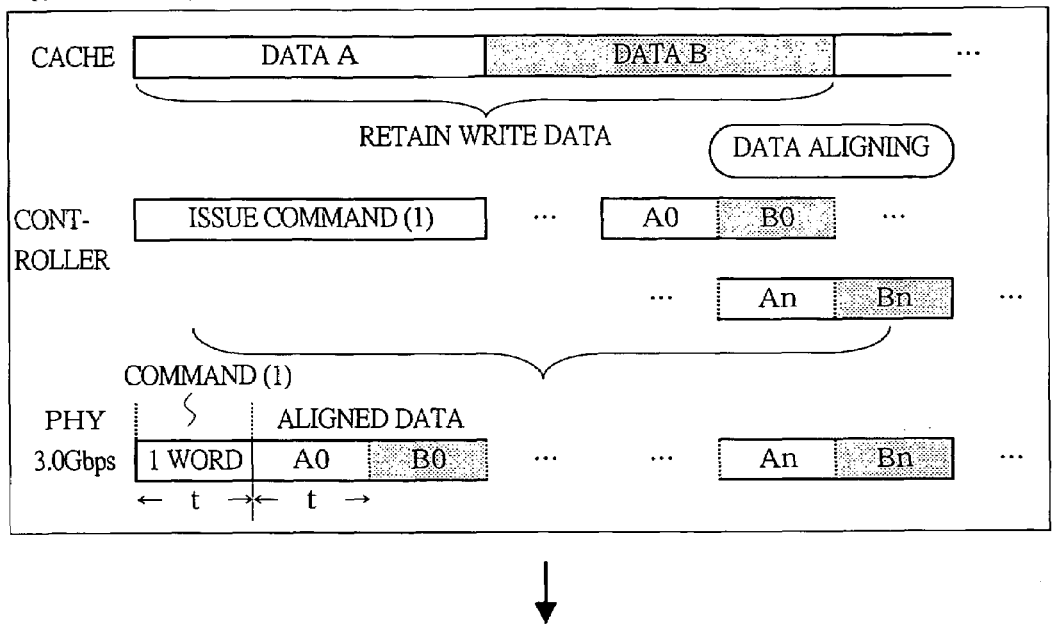
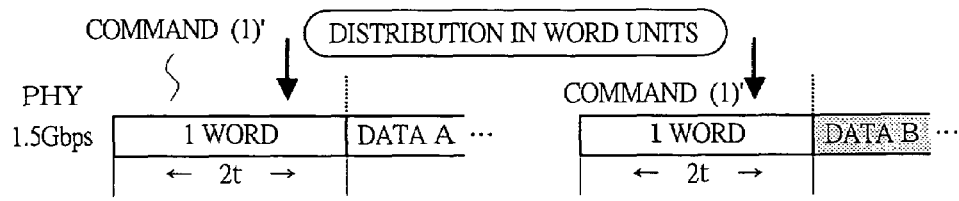
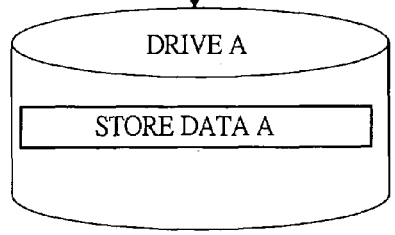 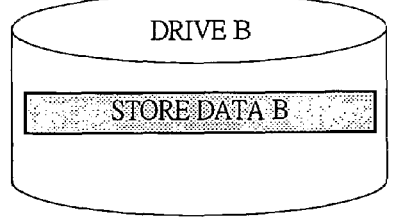

FIG. 16A
<UPON WRITE>
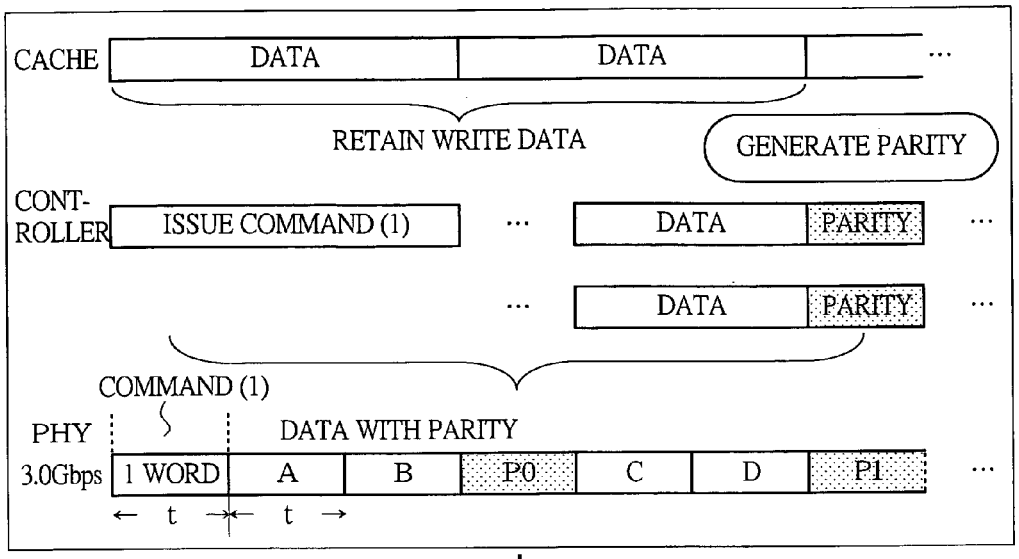
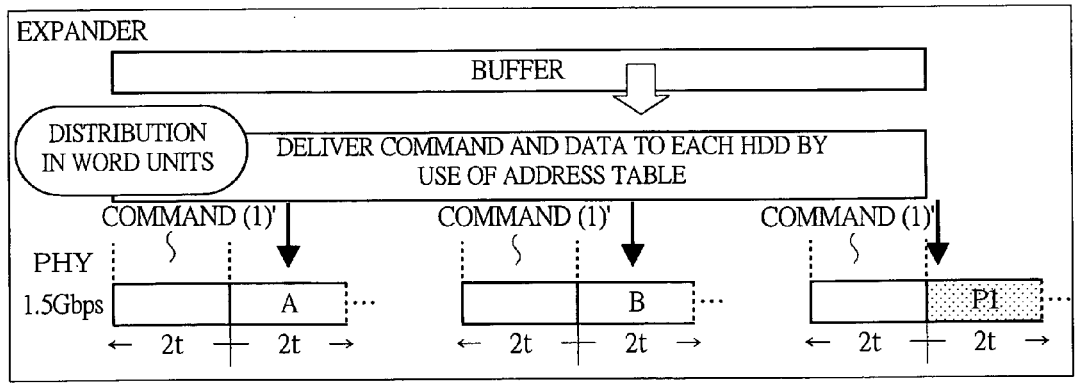
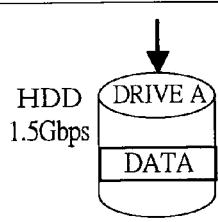
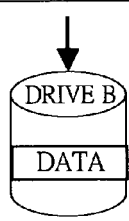
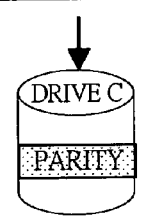

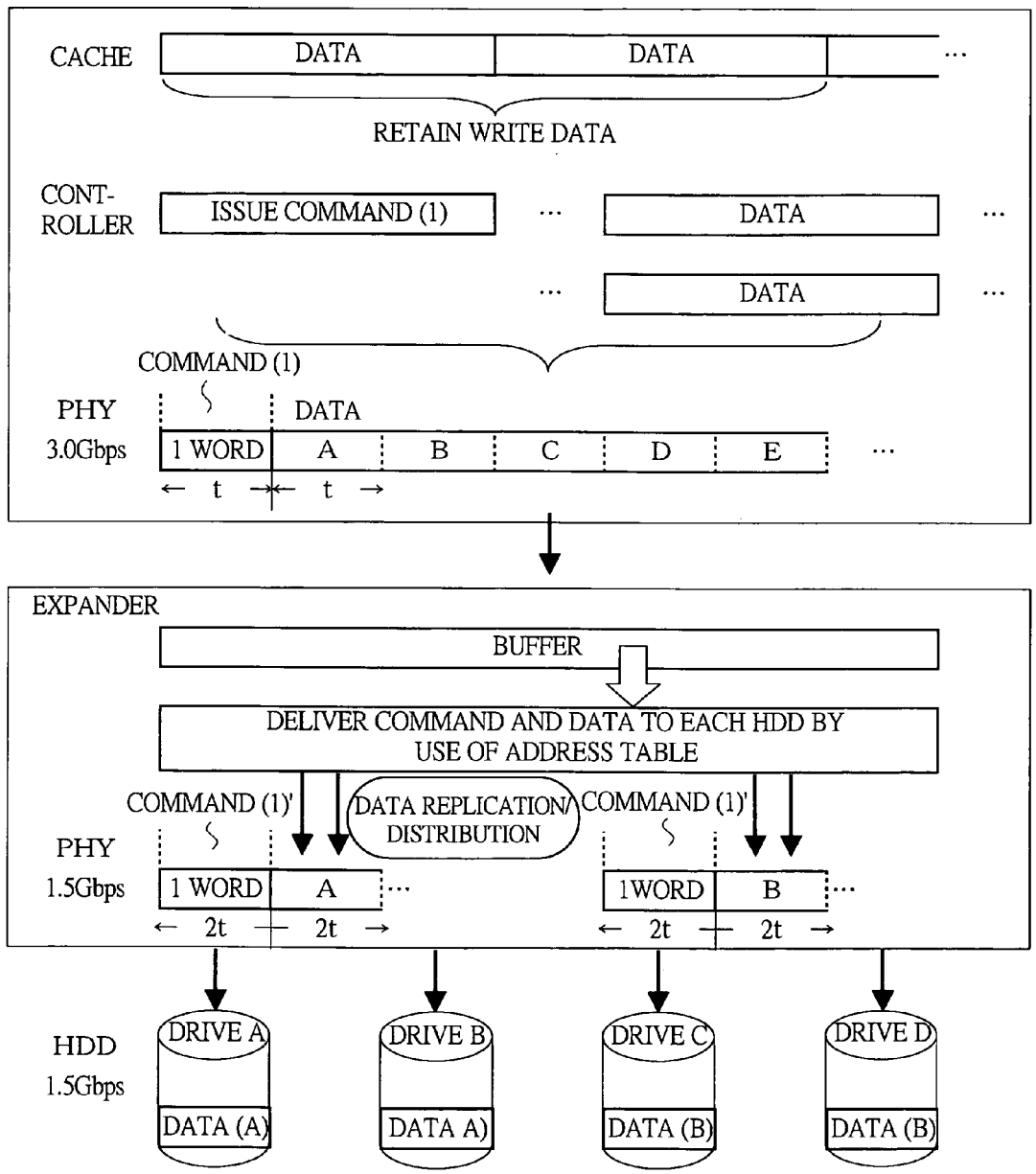

*FIG. 26*

| | DRIVE A | DRIVE B | RECOVERY AVAILABLE OR NOT | CORRESPONDING EMBODIMENTS | EXPANDER OPERATION |
|---|---|---|---|---|---|
| a | NO RESPONSE | NO RESPONSE | × | ALL | AFTER WAITING, REPORT NO-RESPONSE ERROR |
| b | NO RESPONSE | REPORT ERROR | × | ALL | AFTER WAITING, REPORT ERROR CODE OF DRIVE B AND NO-RESPONSE ERROR |
| c | REPORT ERROR | REPORT ERROR | × | ALL | REPORT ERROR CODES OF DRIVE A AND B |
| d | NORMAL | NO RESPONSE | × | ALL | AFTER WAITING, REPORT NORMAL DATA AND NO-RESPONSE ERROR |
| e | NORMAL | NO RESPONSE | ○ | 5~8 | AFTER WAITING, REPORT RECOVERED DATA (NOTIFY RECOVERY) |
| f | NORMAL | REPORT ERROR | × | ALL | REPORT NORMAL DATA AND ERROR CODE OF DRIVE B |
| g | NORMAL | REPORT ERROR | ○ | 5~8 | REPORT RECOVERED DATA (NOTIFY RECOVERY AND RETAIN ERROR CODE) |

DISK ARRAY APPARATUS

CROSS-REFERENCE TO RELATED APPLICATION

The present application claims priority from Japanese Patent Application No. JP 2004-254522 filed on Sep. 1, 2004, the content of which is hereby incorporated by reference into this application.

TECHNICAL FIELD OF THE INVENTION

The present invention relates to a disk array apparatus (storage apparatus), particularly relates to the technique for transferring data between a controlling device (controller) and storage devices in a disk array apparatus, and the technique employing SAS (serial Attached SCSI) as an interface with the storage devices.

BACKGROUND OF THE INVENTION

A disk array apparatus is provided as a system for realizing, for example, reducing the risk of losing all data by storing user data in a storage area which is provided by a storage device such as a hard disk drive (HDD). The disk array apparatus has a controller which controls storing data, and storage devices connected thereto. The controller controls storing data in a storage area based on the instruction from a host. Also, the disk array apparatus performs RAID control employing a plurality of storage devices, and various types of control such as data replication and backup.

Meanwhile, a SAS is provided as an interface between a computer and storage devices. The SAS system has a computer as a device for performing data transfer which serves as a transfer source, an end device such as storage devices which serve as transfer destination (target), and an expander device which relays the data transfer between the end devices. A number of end devices can be connected to the expander device. A predetermined data-transfer speed (rate) is ensured at the physical links between the physical ports provided at each device. In the connection and the data path between the end devices via the expander device, data transfer is performed at the connection rate which is determined at the plurality of physical links by rate matching or the like.

In a SAS system, there performed a process for inserting ALIGN primitive to the transfer data in order to, for example, perform the rate matching in a connection including physical links of different rates. The ALIGN insertion in a SAS is described in a non patent document: Working Draft American National Standard, Project T10/1562-D Revision 5, "Information technology-Serial Attached SCSI (SAS)", 4.3.2 Transmit data path, pp. 45-49, 7.2.5.2 ALIGN, pp. 152-153, 7.13 Rate matching, pp. 191-193, (online), Jul. 9, 2003, (searched on Jul. 22, 2004), the Internet <URL: http://www.t10.org/drafts.htm/sas-r05.pdf>.

SUMMARY OF THE INVENTION

In order to improve performance, etc., application of SAS to a disk array apparatus is assumed as an interface for data transfer between a controller and storage devices. When SAS is simply applied to the disk array apparatus, the above described ALIGN primitive is inserted in accordance with the SAS standard in a case where, for example, a plurality of physical links have different rates.

However, the demerits of the ALIGN primitive insertion resides in that, when data transfer is performed in a connection including a slow SAS end device (for example, an HDD corresponding to 1.5 Gbps), the connection rate is set to slow (for example, 1.5 Gbps) as a result of the above described rate matching or the like even if the physical link rate is fast (for example, 3.0 Gbps). Therefore, the data transfer efficiency and bus efficiency in the connection and the data paths are lowered.

The present invention has been accomplished in consideration of the above described problems, and an object thereof is to form an disk array apparatus to which SAS is applied as an interface with storage devices, and to provide techniques which enable efficient data transfer without lowering the data transfer efficiency and the bus efficiency even when a plurality of physical links in the connection between the controller and storage devices have different rates.

Brief explanation of the general outline of a typical invention among the inventions disclosed in the present application is as the following. In order to accomplish the above described object, a disk array apparatus of the present invention has a plurality of storage devices such as HDD; and a controller (controlling device) which performs controlling of data storing in the storage area provided by the above described storage device, in accordance with an instruction given from a data processing device which serves as a host; and the disk array apparatus is characterized by having the below-described technical means.

(1) A disk array apparatus of the present invention has a configuration to which SAS is applied as an interface between a controller and storage devices wherein at least one SAS expander device (expander) is connected to the controller and the storage devices via physical links, and communication of data transfer according to the SAS or SATA (serial ATA) protocol is performed in the connection between the controller, the expander, and the storage devices. Each of the controller, expander, and the storage devices has means (for example, a circuit for processing communications according to the SAS protocol) for performing data transfer in accordance with the SAS protocol. The physical link is formed by having physical ports which is provided at each member, and port line (bus) which connects between the members. The controller and the storage devices serve as the SAS end devices. Particularly, the expander is equipped with at least one physical port at the controller-side and a plurality of physical ports at the storage device-side. Data transfer speed (rate) is ensured at each of the physical links for the above described data transfer. The present apparatus is equipped with means for performing multiplex transfer in which, as for input/output data transferred via the plurality of physical links between the expander and the plurality of storage devices in the data transfer in the connection between the controller and the storage devices and in the data path thereof, the input/output data are multiplexed and transferred at the controller-side (between the controller and the expander) physical link. By the means for performing multiplex transfer, the controller multiplexes and transfers the transfer data to the expander via the controller-side physical link, and the expander transfers the transferred data in parallel to the storage devices via the plurality of storage-side (between the expander and the storage devices) physical links. Herein, the process is performed without insertion of ALIGN primitive or the like.

In addition, as means for performing the multiplex transfer, each of the controller and the expander are equipped with a data processing means for integration of multiple pieces of data into multiplex data and for separation of the multiplex data into multiple pieces of data, and a memory for storing therein the object data to be processed. As the data processing means, the controller is equipped with a first means (data separation/integration circuit) for performing separation/integration process of the transfer data for the multiplex transfer, and the expander is equipped with a second means (data separation/integration circuit) for performing separation/integration process of the transfer data for the multiplex transfer.

By the means for performing multiplex transfer, in the data transfer in the connection between the controller and the storage devices, upon a write process of data to the storage device, the controller integrates the write data (the objective data to be written in the storage devices) by the first circuit and transmits, as multiplex data, to the physical port of the expander via the controller-side physical link. Then, the expander separates the received data by the second circuit, and the expander transmits the separated data to the physical ports of the plurality of the storage devices via the plurality of storage device-side physical links and distributes the data over the storage devices so as to perform write process. Upon read process of data from the storage devices, the expander transfers the read data (the objective data to be read from the storage devices) from the plurality of storage devices through the corresponding physical ports and via the plurality of storage device-side physical links. Then, the expander integrates the data which have been received from the storage devices by the second circuit and transmit the data as multiplex data to the physical port of the controller via the controller-side physical link. Then, the controller performs a process of separating the data which have been received from the expander, by the first circuit.

The present apparatus performs data transfer by the means for performing multiplex transfer without insertion of ALIGN primitive or the like, even when, particularly, the rates of the physical links of the controller-side and storage device-side in relation to the expander are different. By the means for performing multiplex transfer, in the connection between the controller and the storage devices, and in a configuration where the rate of the storage device-side physical links is slower than the rate of the controller-side physical link, the multiplex transfer is performed by employing a set of data transferred via the plurality of slow rated physical links as the object.

In the present apparatus, between the controller and the storage devices, there selectively performed a particular operation such as the multiplex transfer with the mediation of the process of the expander, or a normal access in which data transfer, etc. is performed directly without the process of the expander. When the multiplex transfer is executed, for example, the controller issues a command to the expander for the instruction, and specifies in the command, as the destination thereof, the address of the expander and the physical ports which are employed as the process objects. The expander has means for interpreting the command given from the controller-side, and mediates the data between the controller and the target storage devices by converting the frame address so as to process the multiplex transfer. The expander recognizes the addresses of the process-object storage devices by referencing to the address table which has been created and retained in the device itself. The expander transmits the SAS/SATA command and data to the storage devices by the specified physical ports corresponding to the above described physical port specification. The expander replicates the command which has been given from the controller-side, and employ the command which are to be transmitting to the storage devices. For example, in the above described command, attribute of the process relating to the particular process such as the degree of multiplex, e.g., duplex(2×) transfer and multiplex-4(4×) transfer, is specified.

In the present apparatus, as the multiplex transfer, double (2×), triple(3×), quadruple(4×), or multiplexing more than that are executed in accordance with, for example, the state of the storage devices (e.g., whether connected or not, and physical link rates) and the type of the objective data to be processed. Particularly, as the multiplex transfer, 2× transfer or 4× transfer is performed by employing the transfer data as the objects for the plurality of storage devices. In a case of 2× transfer, the controller multiplexes the transfer data which are for, e.g., two storage devices and transfers the data to the expander via the controller-side physical link, and the expander transfers the transfer data in parallel to the two storage devices via the storage device-side two physical links. Similarly in a case of 4× transfer, the controller multiplexes the transfer data which are for, e.g., four storage devices, and transfers the data to the expander via the controller-side physical link, and the expander transfers the transfer data in parallel to the four storage devices via the four storage device-side physical links.

In the present apparatus, as the plurality of storage devices connected to the expander, for example, HDDs corresponding to SAS (SAS-HDD), and HDDs corresponding to SATA (SATA-HDD) can be employed.

Another disk array apparatus of the present invention further has the following characteristics in addition to the above described configuration. By the means for performing multiplex transfer, the controller transfers the objective data to be processed without modification via the controller-side physical link. That is, one or more path of data are integrated in order and serially transferred. Then, the expander performs distribution of data in a predetermined size, for example, per word units, to the plurality of storage devices via the plurality of storage device-side physical links. That is, the expander separates the multiplex data so as to transfer the data to the plurality of storage devices, and transfers the separated data in parallel over the storage devices.

In the present apparatus, as the hardware configuration, the expander is mounted, for example, on one or more disk controlling unit which is provided at one or more chassis that forming the present apparatus, or on a board (e.g., power supply controller board) to which the disk controlling unit is mounted. The disk controlling unit means a data processing device's request which executes input/output such as read/write to the storage devices. When a plurality of expanders is provided in the configuration, the configuration is made such that the expanders are connected via the physical links and can transfer data mutually. Even when the target storage devices are spread over the plurality of expanders, the multiplex transfer is performed via the physical links between the plurality of expanders.

In the present apparatus, upon employment of the multiplex transfer, a HDDs set is formed by a plurality of physical storage devices based on the configuration relating to the physical link rates, said a virtual storage device (set) is created by the one set of storage devices, and a predetermined RAID group and logical unit, etc. are set over the one or more virtual storage devices. By virtue of the setting, the device can be applied to various types of RAID levels while employing the multiplex transfer.

The present apparatus employs the multiplex transfer to an internal data copy operation in which the data processing device serving as the host does not mediates. Upon execution of internal data copy, the controller reads the copy source data from the storage device by use of the multiplex transfer, and performs a process of writing in the storage devices which are the copy destination, by use of the multiplex transfer.

In another disk array apparatus of the present invention, in addition to the above described configuration, further, the controller performs aligning of the transfer data in accordance with the parallel transfer (distribution) of data via the plurality of storage device-side physical links, and transfers the aligned data via the controller-side physical link. The expander distributes the transfer data according to the alignment order, via the plurality of storage device-side physical links.

Another disk array apparatus of the present invention further has, in addition to the above described configuration, a means for recognizing, by the expander, the storage device states including whether the storage devices are connected or not and the data transfer speed, and reporting those information to the controller. In accordance with the recognition of the state of the storage devices, the controller and the expander determines the attribute of the process including the storage devices which are employed as the objects in relation to the particular operation such as multiplex transfer.

The multiplex transfer described in above (1) as a particular operation, is expanded as described below, in addition to the simple multiplexing of data which are input to or output from the plurality of storage devices. In the below described decompression, the transfer process of data is also performed by use of the plurality of storage device-side physical links corresponding to the controller-side physical link, therefore, effects of efficiency enhancement is attained as well as the case of the above described simple multiplexing.

(2) Another disk array apparatus of the present invention further has the following characteristics in addition to the configuration described in above (1). The present apparatus has means for performing multiplex transfer accompanied with parity process, wherein, in the data transfer in the connection between the controller and the storage devices, a parity process (e.g., insertion or removal of parity) is performed with the transfer data. By the means, the controller multiplexes the transfer data and transfers to the expander via the controller-side physical link, and the expander distributes the transfer data, which have undergone parity process, into data and parity and transfers them in parallel to the plurality of storage devices via the plurality of storage device-side physical links. In the parity process, for example, the parity data is inserted at a predetermined intervals in the data sequence of the transfer.

By the means for performing the multiplex transfer accompanied with the parity process, for example, the controller performs the parity process on the transfer data, and the data with parity are multiplexed and transferred via the controller-side physical links. Then, the expander distributes the data with parity divided into data and parity and transfers them in parallel to the plurality of storage devices via the storage device-side physical links.

By the means for performing multiplex transfer accompanied with the parity process, for example, the controller transmits the transfer data via the controller-side physical link without modification, the expander performs the parity process on the transfer data, and the data are distributed into data and parity and transferred in parallel via the plurality of storage device-side physical links. Meanwhile, upon read process, when an error is present in the data read from the storage device, the expander performs, as the parity process, automatic data recovery process by use of parity. In the process, check of the error and recovery to original data are performed by XOR operations employing the data and the parity. The controller performs, on the recovered data obtained by the data recovery process, a process of transmitting the data to data processing device which serves as the host (in response to a read request), or a process of writing the data to another storage device such as an replaced HDD or a spare HDD (process relating to copy back).

In another disk array apparatus of the present invention, the expander is equipped with, when the means for performing multiplex transfer accompanied with the parity process is provided, a means for reporting error information in the data transfer to the storage devices, information regarding the automatic data recovery at the expander (e.g., information notifying that the data has been recovered by use of the parity or the later-described multiplex writing), to the controller. The controller recognizes and judges the state of the error in the storage device based on the report of the error information and the information regarding the data recovery.

(3) Another disk array apparatus of the present invention has a plurality of storage devices, a controller for controlling storing data in the storage devices, and an expander for connecting the storage devices and the controller via physical links; wherein the controller, the expander, and the storage devices have means for performing data transfer in the connection between the controller and the storage devices in accordance with the SAS protocol, and have means for performing, in data transfer in the connection between the controller and the storage devices, multiplex writing in which the data same as the transfer data is written to the plurality of storage devices. In the present apparatus, a set of the plurality of storage devices are employed as the object of the multiplex writing of the transfer data, the controller transfers the objective data of the multiplex writing to the expander via the controller-side physical link; and with the objective transfer data of the multiplex writing, upon write process, the expander replicates and transfers in parallel the data via the plurality of physical links corresponding to the storage device which is employed as the object of the multiplex writing so as to perform write, and upon read process, the data are read in parallel and original data are obtained.

As the multiplex writing process, particularly, double writing process in which identical data are written to two storage devices is effective. In this case, a set of the plurality of storage devices are employed as the object of the double writing of the transfer data. The data employed as the object of the double writing are transferred via the controller-side physical link, and, with the transfer data employed as the object of the double writing, upon write process, the expander replicates and transfers in parallel the data via the plurality of physical links corresponding to the storage devices employed as the objects of the double writing so as to perform write, and upon read process, the data are read in parallel and original data are obtained.

In another disk array apparatus of the present invention, there performed a particular operation in which the multiplex transfer described in above (1) and the above described multiplex writing are performed in combination. In the present apparatus, for example, a set of the plurality of storage devices are employed as the object of the data distribution, and a pair of the storage devices are employed as the object of the double writing of the each of the separated pieces of data of the above described data distribution. The objective data of the data distribution and the double writing are transferred via the controller-side physical link, and with the transfer data, the expander performs the data distribution and the double writing via the plurality of physical links corresponding to the objective storage devices.

In another disk array apparatus of the present invention, there performed a particular process in which the multiplex transfer accompanied with the parity process described in above (2) and the multiplex writing are performed in combination. In the present apparatus, a set of a plurality of storage devices is employed as the object of the data distribution, the pieces of separated data of the data separation are employed as the object of the parity process, and a pair of the storage devices are employed as the object of the double writing of each piece of the separated data including parity which is generated in the parity process. The objective data of the data distribution, the parity process, and the double writing are transferred via the controller-side physical link, and with the transfer data, the expander performs the data distribution, the parity process, and the double writing via the plurality of physical links corresponding to the objective storage devices.

(4) Another disk array apparatus of the present invention further has the below described characteristics in addition to the configuration described in above (1). The present apparatus has means for performing, in data transfer performed in the connection between the controller and the storage devices, compression/decompression process of transfer data, and multiplex transfer accompanied with compression/decompression. The controller and the expander have means for performing compression/decompression process of transfer data, the compressed data of the transfer data are transferred via the controller-side physical link, and the decompressed data of the compressed data are transferred via the plurality of storage device-side physical links.

(5) Another disk array apparatus of the present invention is characterized by having a configuration, as another configuration relating to the application of the expander, in which an expander is connected to a controller and storage devices via physical links, and a "data separation/integration end device" is connected to the expander from outside via bus or the like. The expander performs, except the processes relating to the particular operation such as multiplex transfer described in above (1), communication processes according to the SAS protocol. The data separation/integration end device has means for performing, as a process relating to the particular operation such as the multiplex transfer, particularly, a data separation/integration process, that is, a process of integrating a plural pieces of data into multiplex data and separating the multiplex data into a plural pieces of data. The data separation/integration end device has, in the connection to the expander, a path for communicating with controller-side, and a plurality of paths for communicating with the storage device-side. Upon the execution of the particular process, the data transfer communication is performed in the connection between the controller and the storage devices with the mediation of the process at the data separation/integration end device. The communication for data separation/integration process is performed between the expander and the data separation/integration end device.

Among the inventions disclosed in the present specification, the effects attained by a typical invention are briefly explained as below.

According to a disk array apparatus of the present invention, there formed a disk array apparatus to which SAS is applied as an interface with storage devices, and there enabled efficient data transfer without lowering the data transfer efficiency and the bus efficiency even when a plurality of physical links in the connection between the controller and storage devices have different rates.

BRIEF DESCRIPTIONS OF THE DRAWINGS

Figure 6:
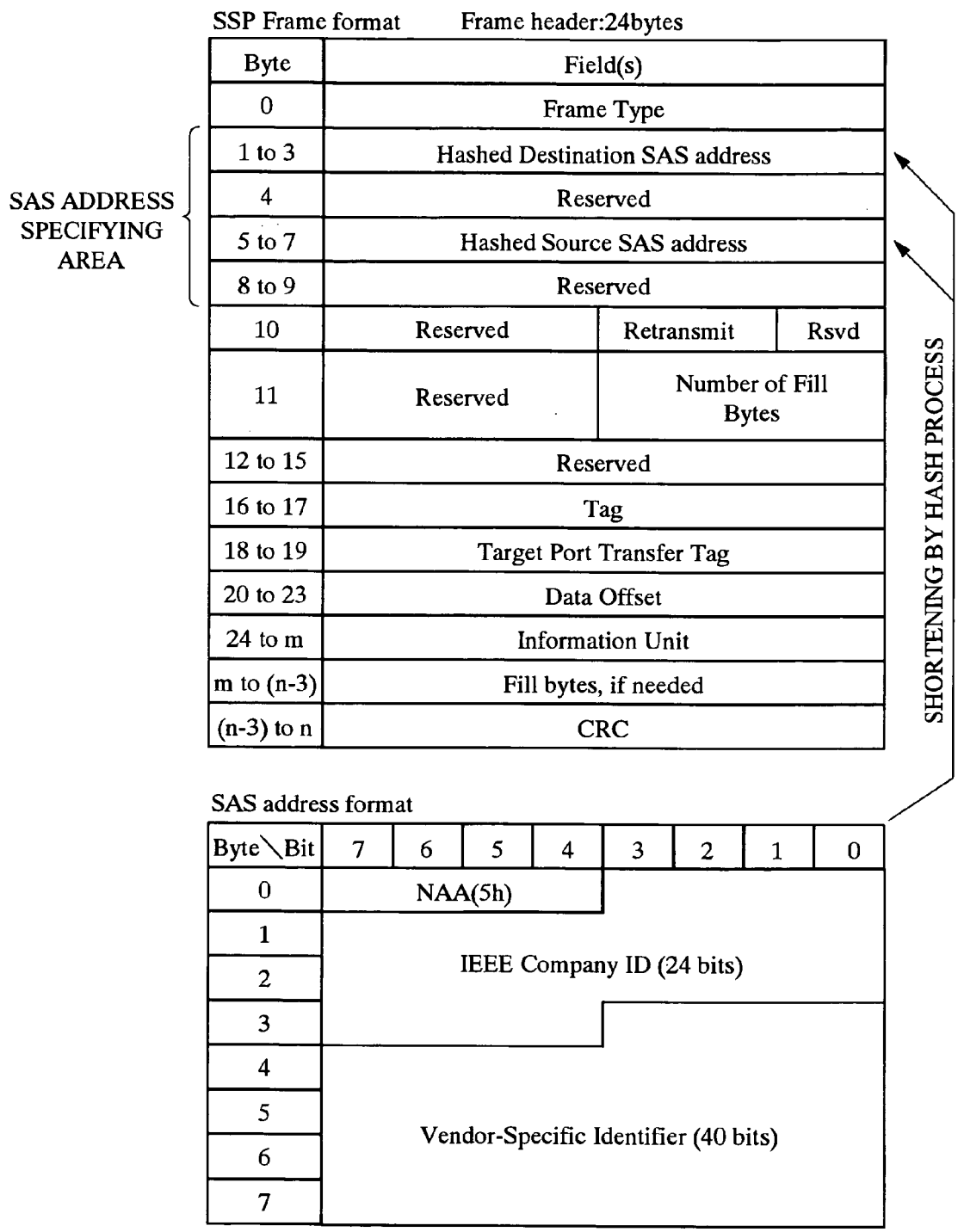
Figure 7:
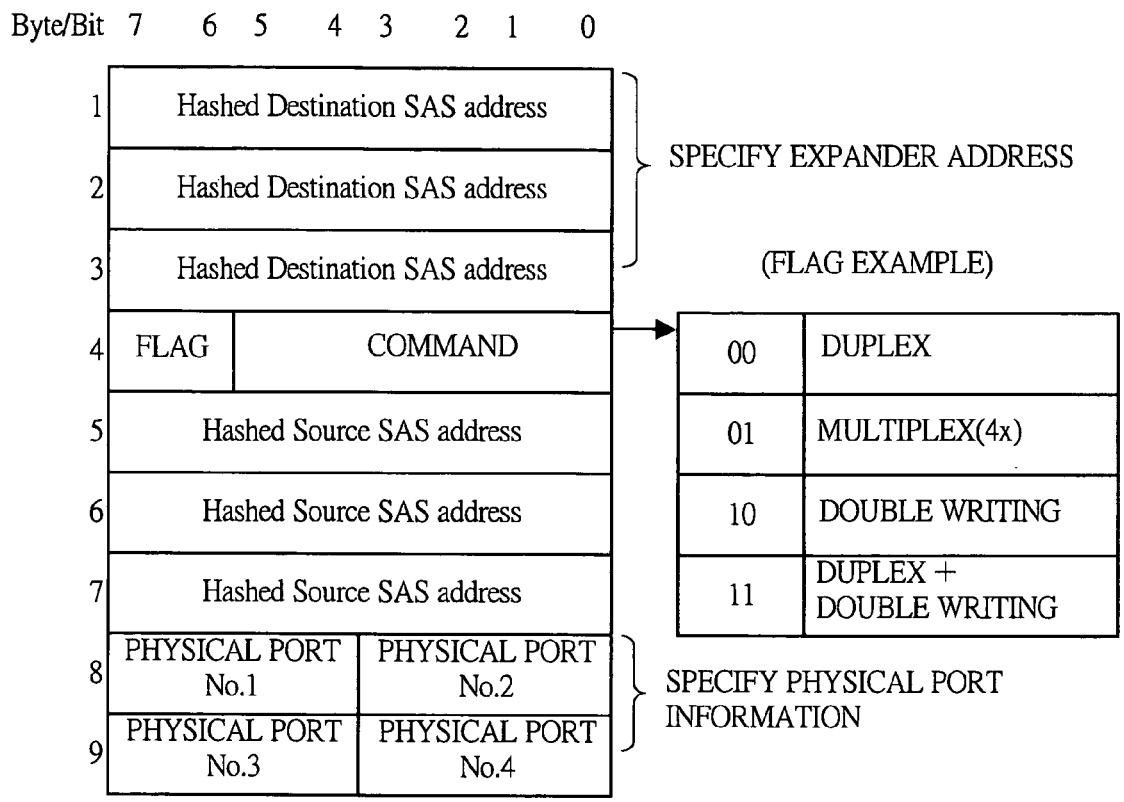
Figure 8:
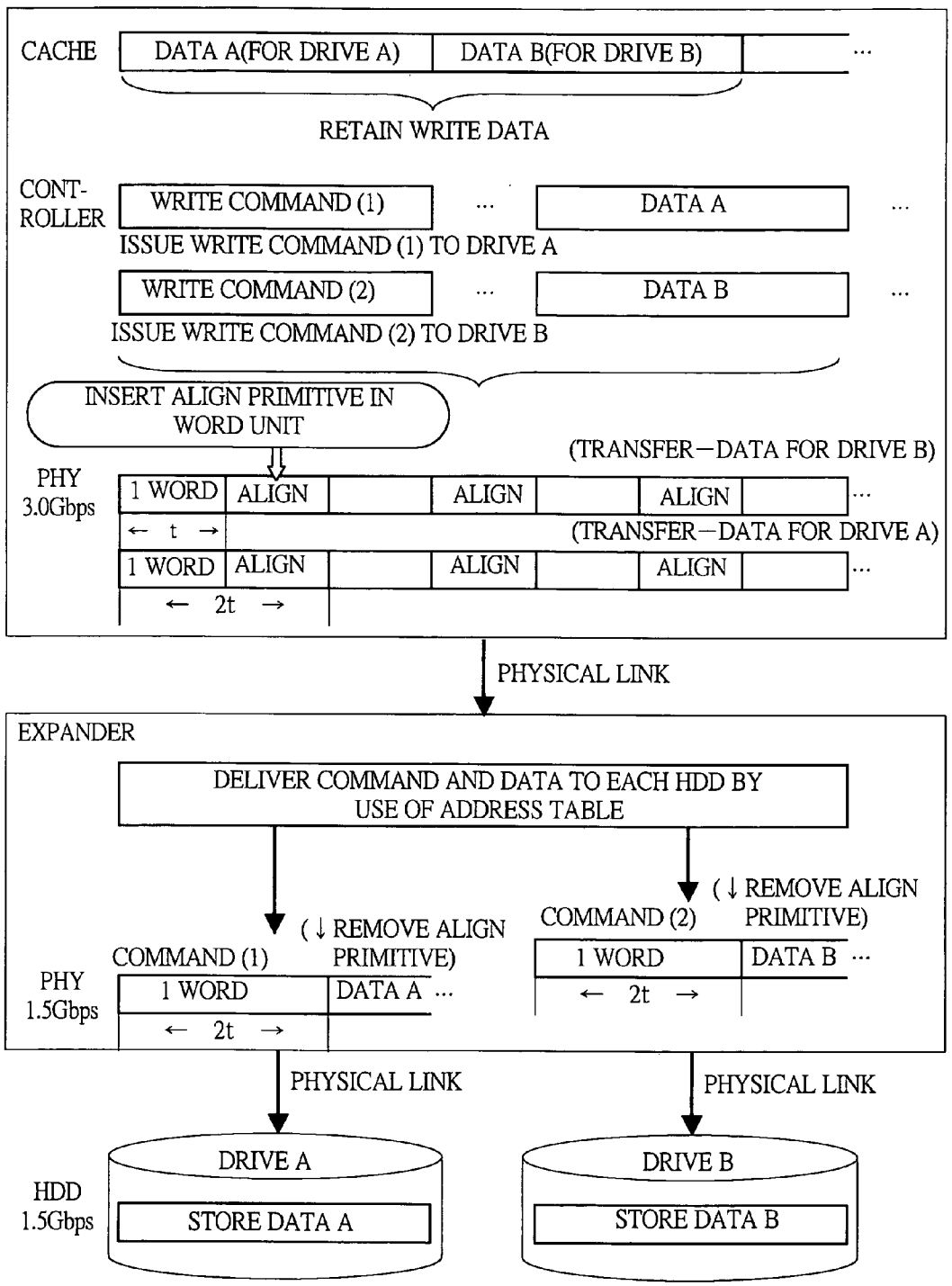
Figure 9:
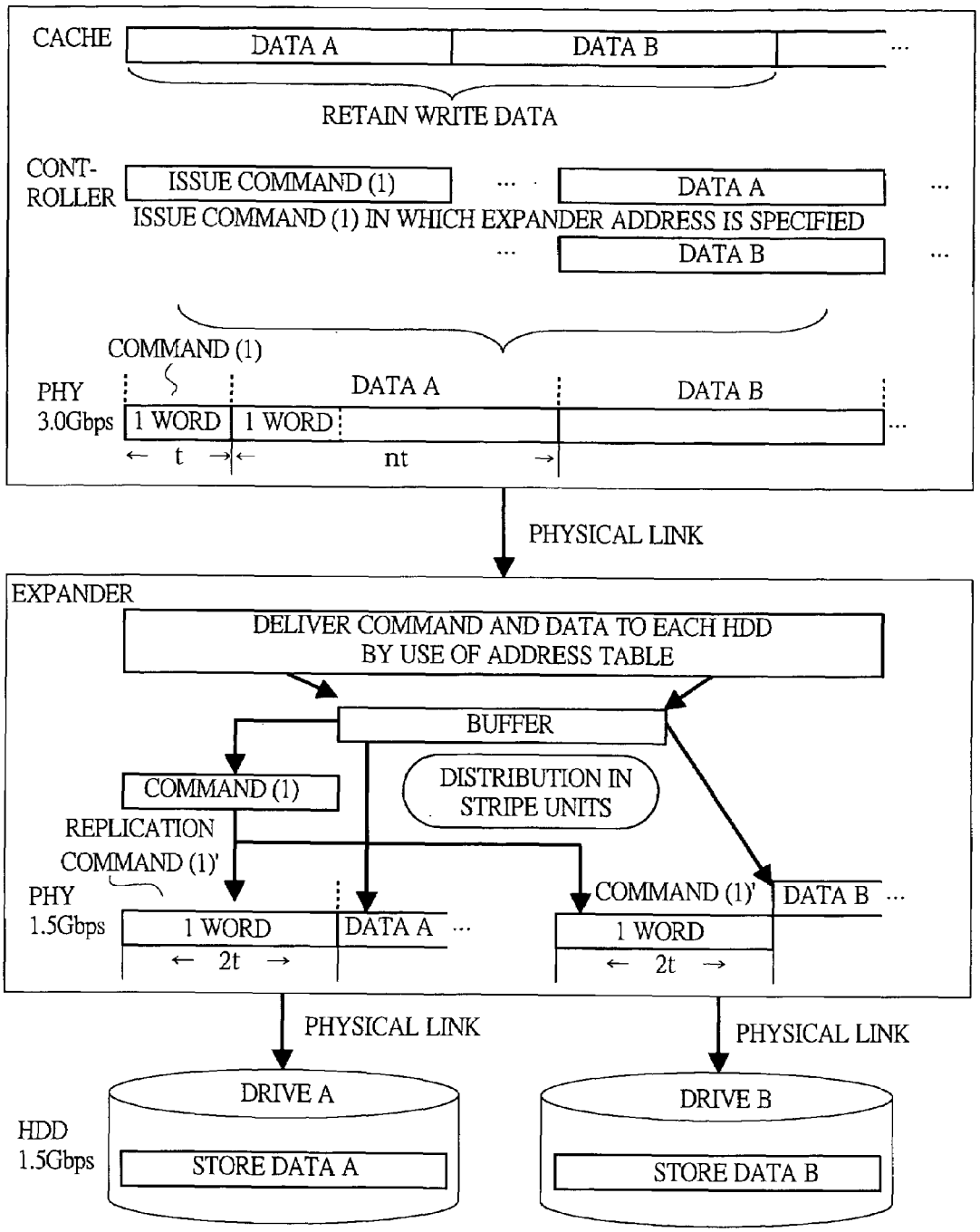
Figure 10A:
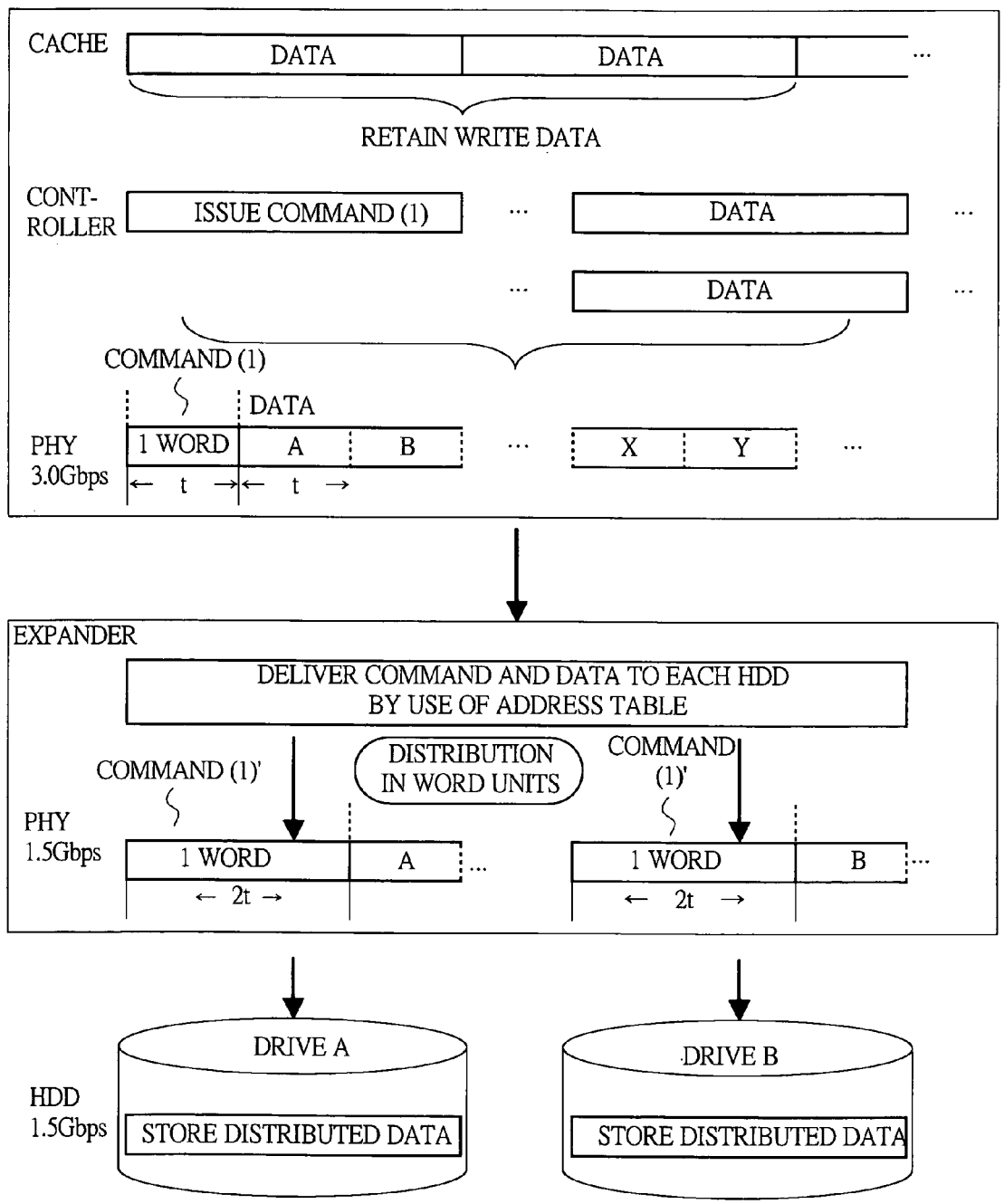
Figure 10B:
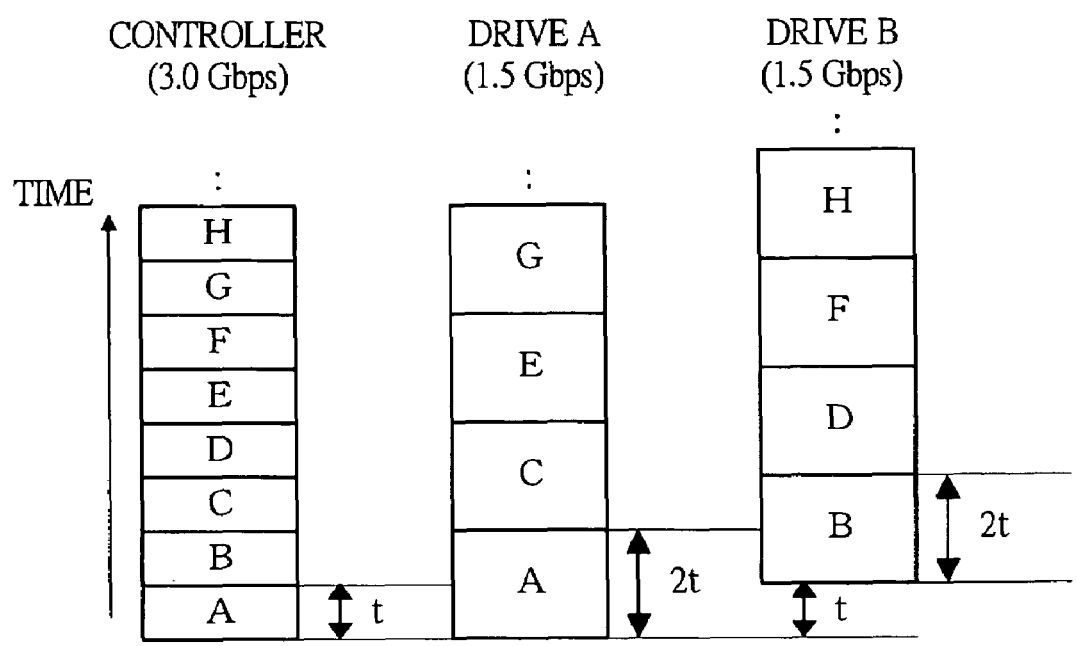
Figure 11A:
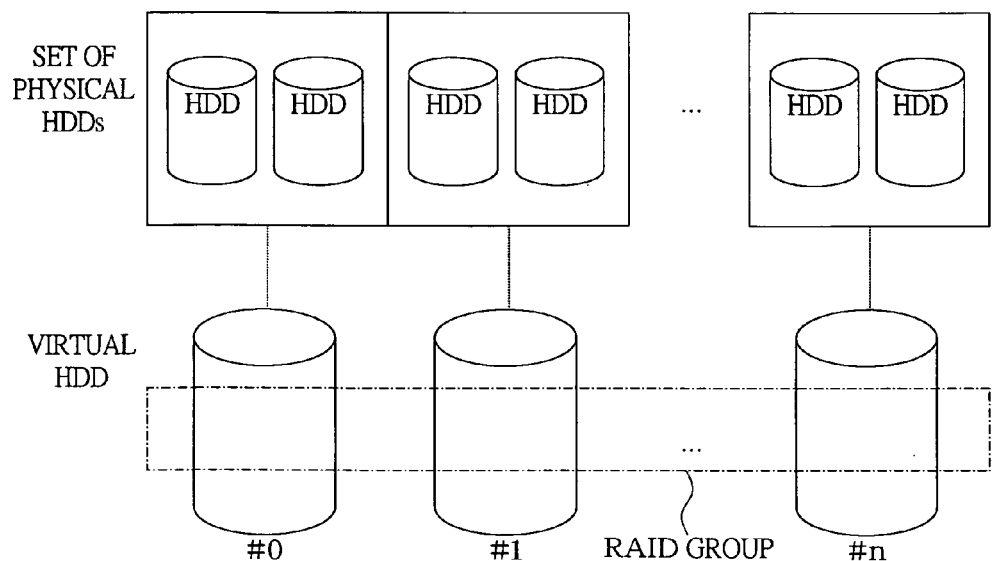
Figure 11B:
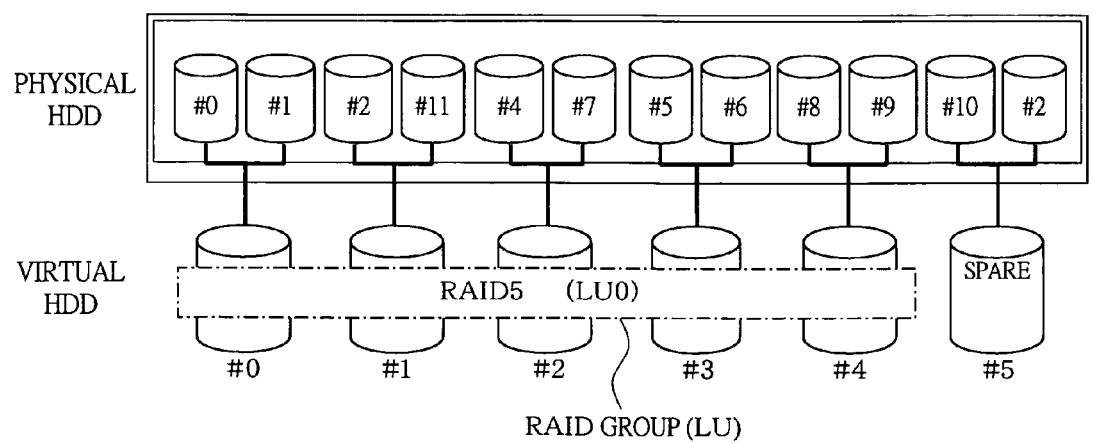
Figure 12:
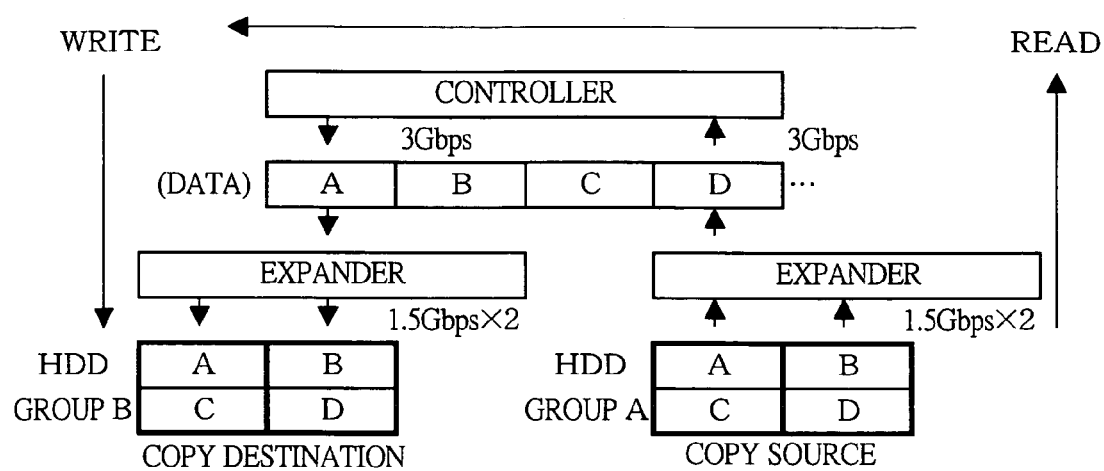
Figure 13B:
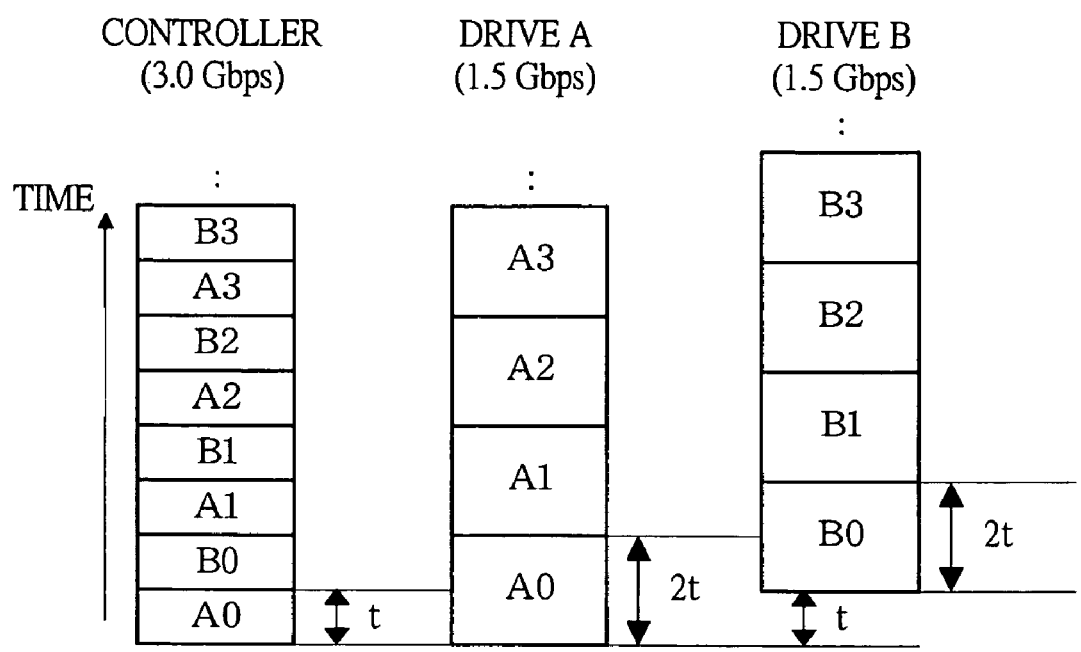
Figure 14A:
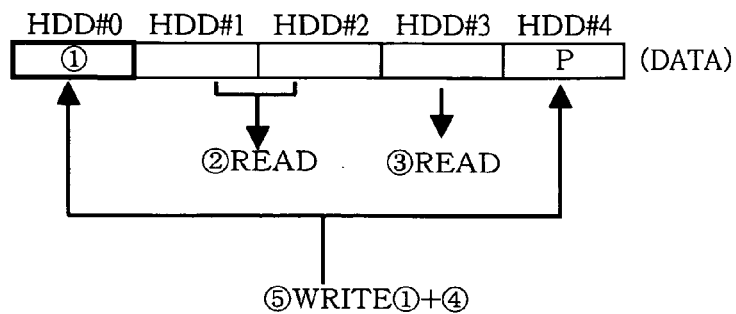
Figure 14B:
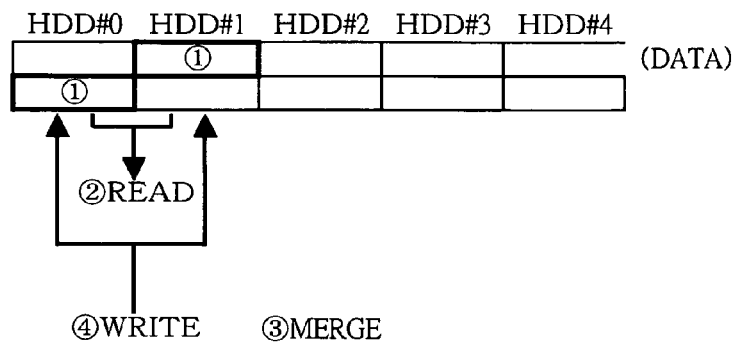
Figure 15:
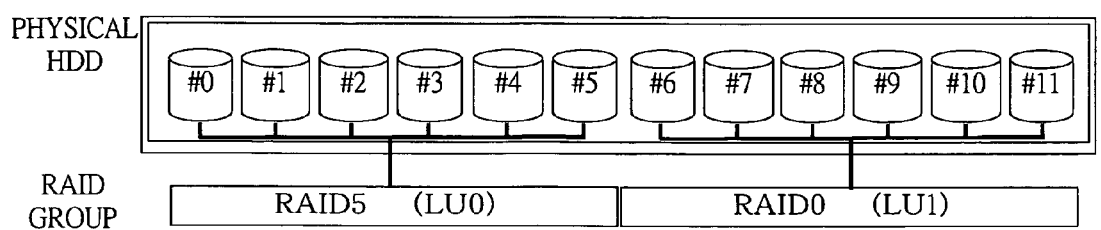
Figure 16B:
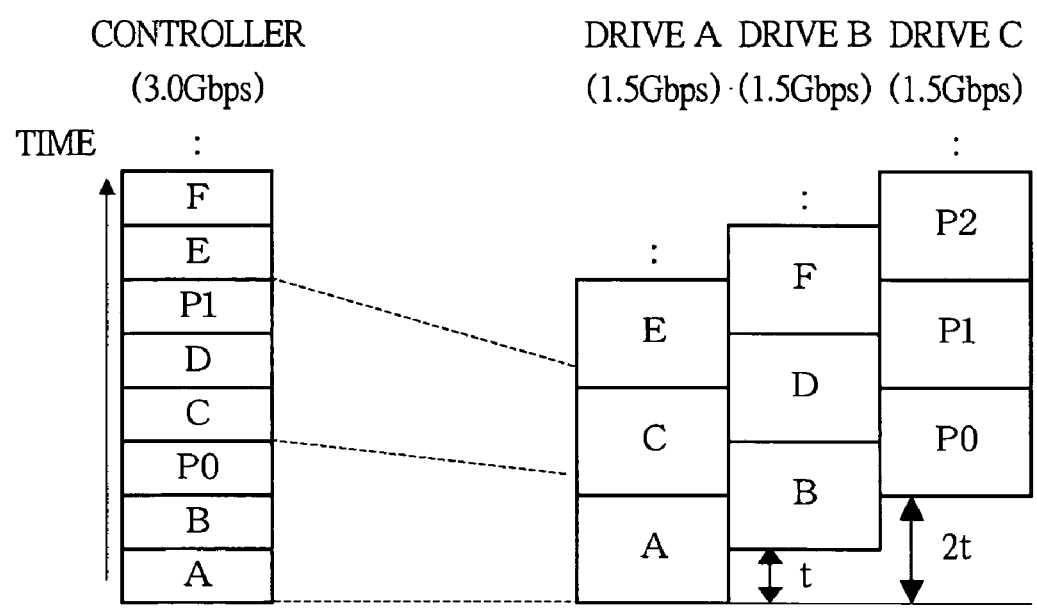
Figure 17A:
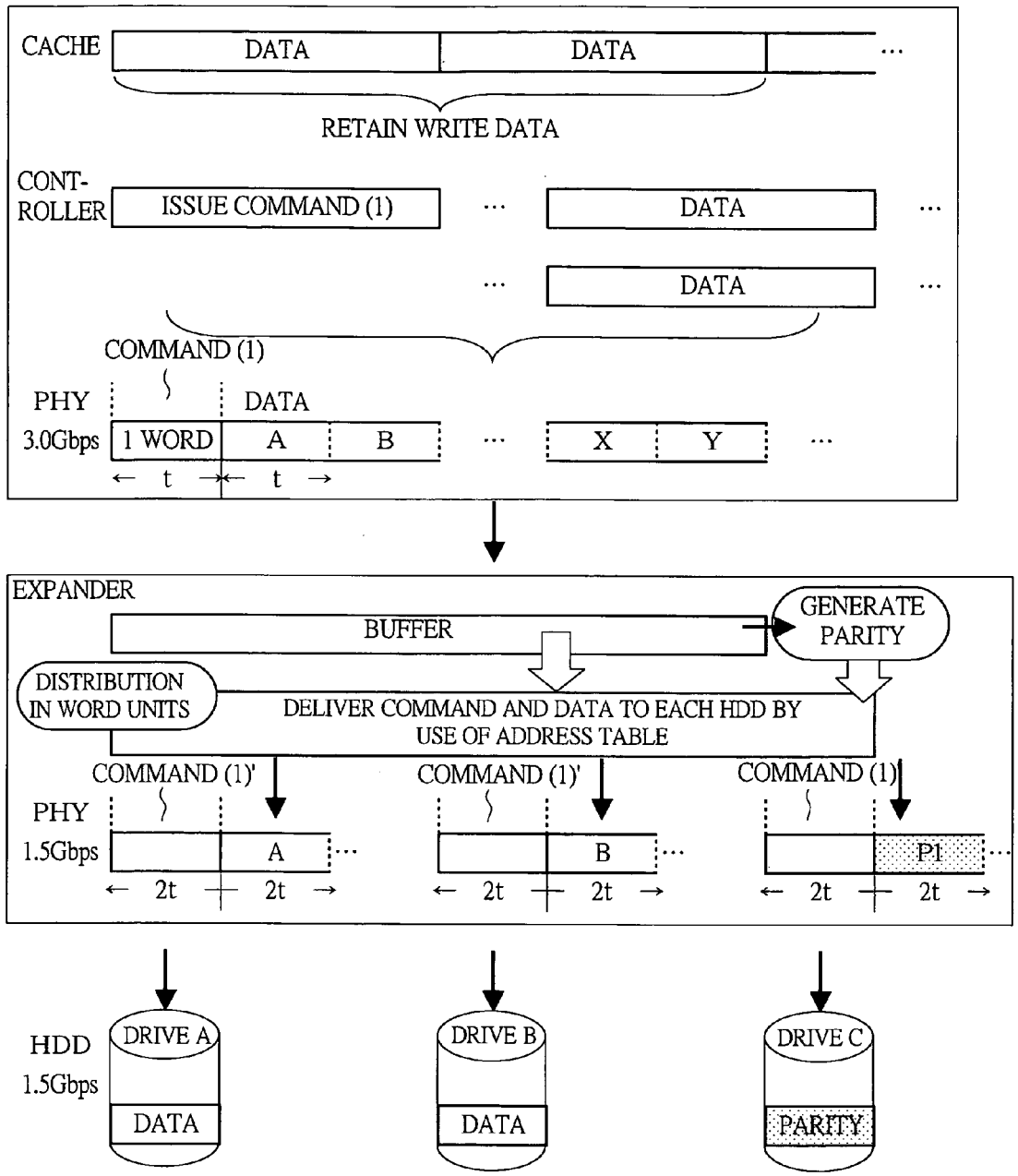
Figure 17B:
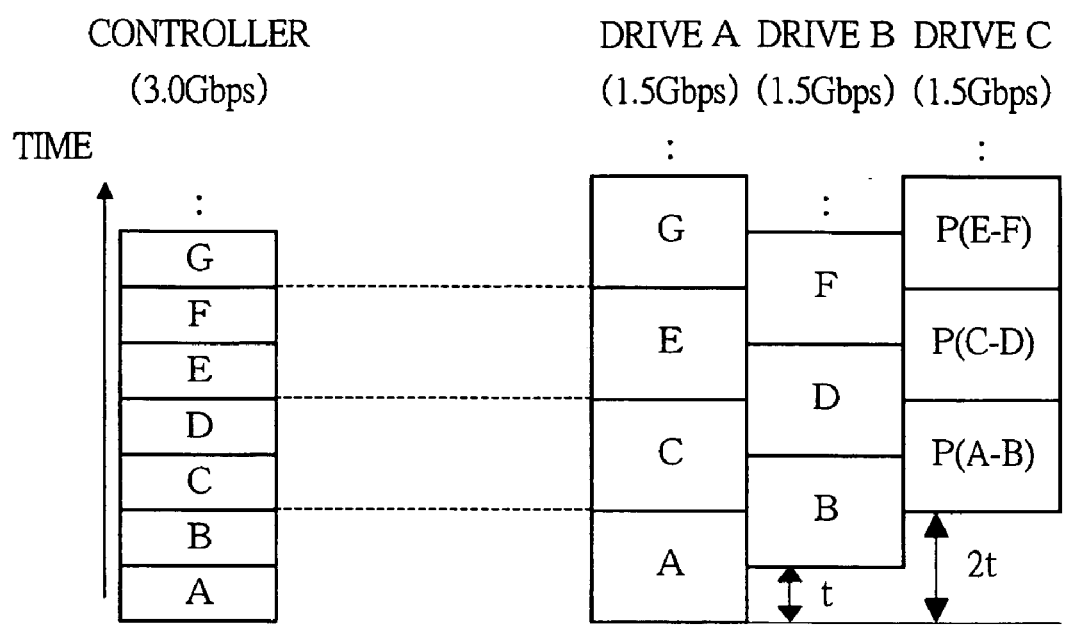
Figure 18:
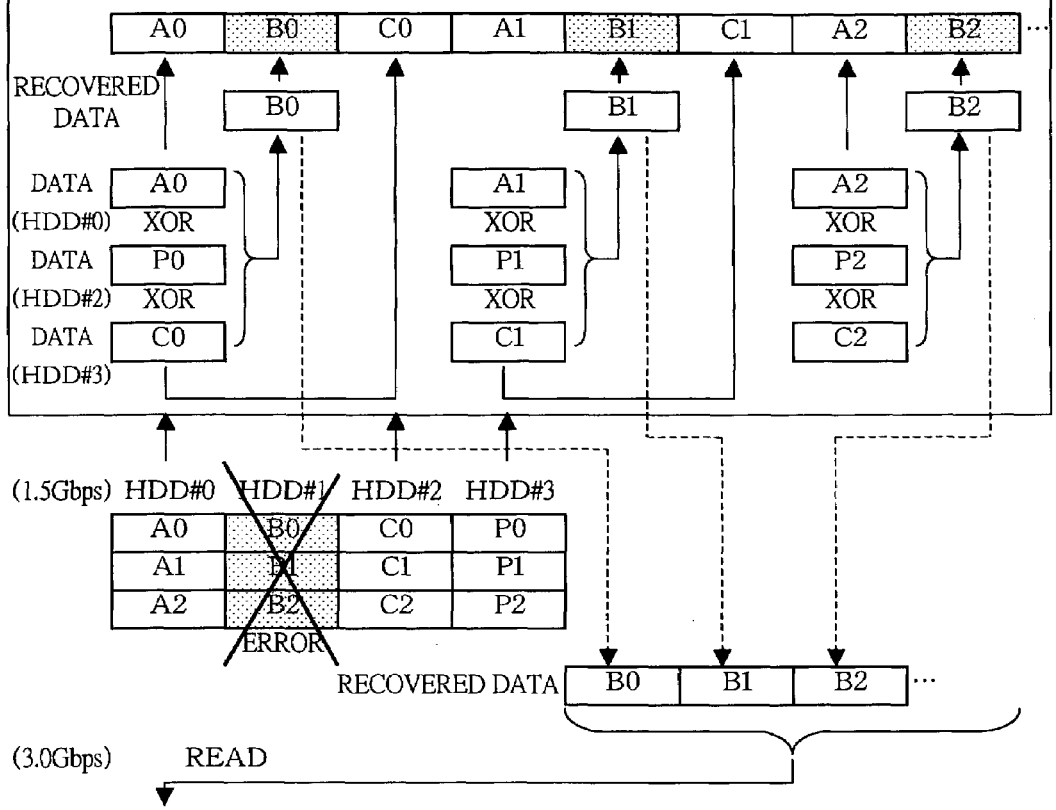
Figure 19A:
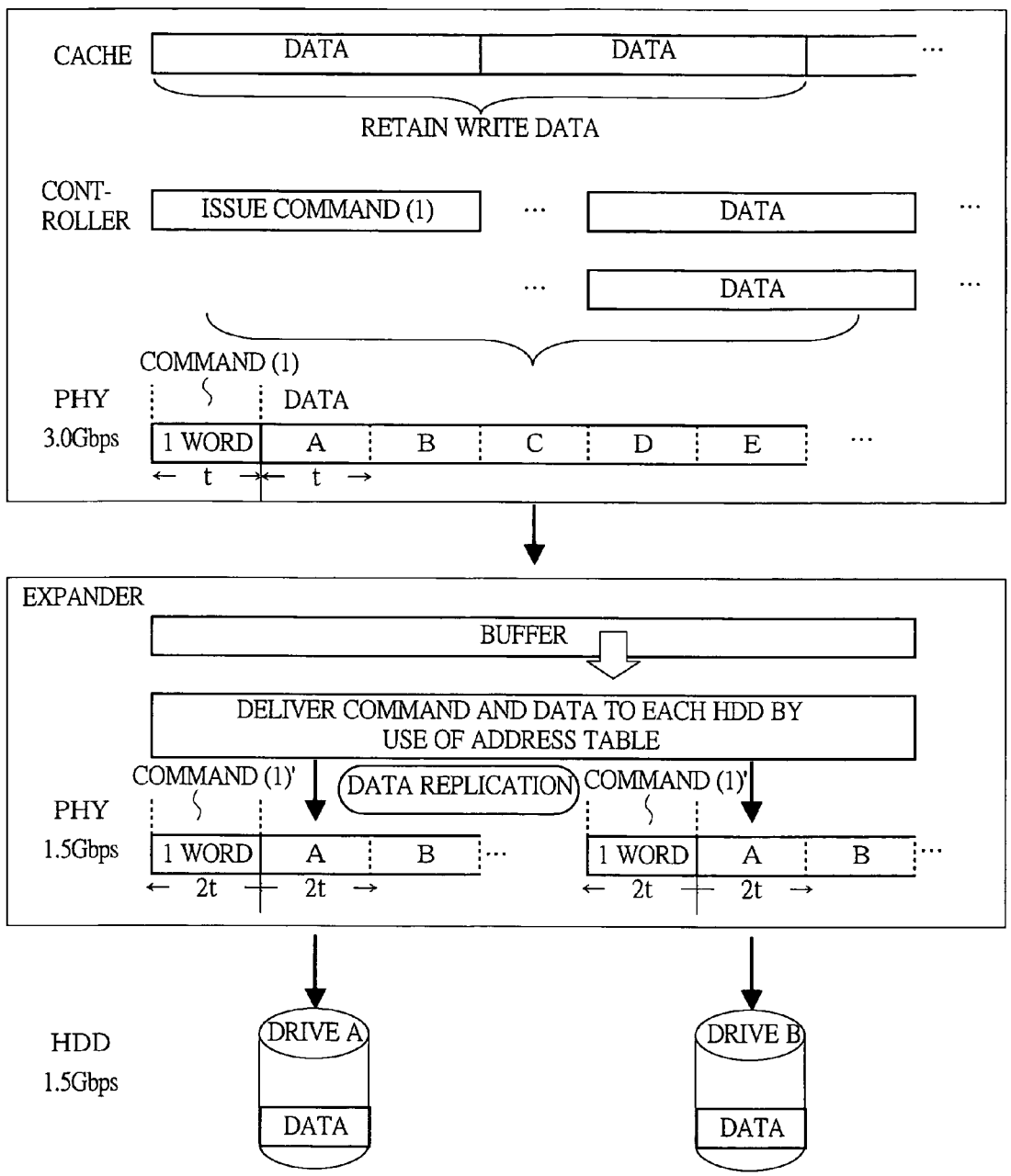
Figure 19B:
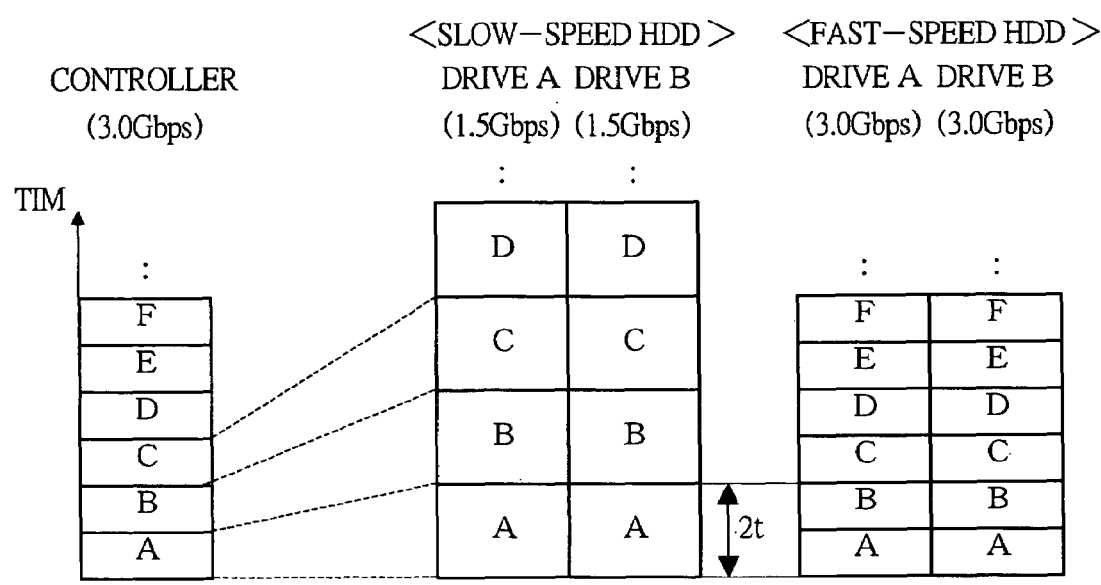
Figure 20:
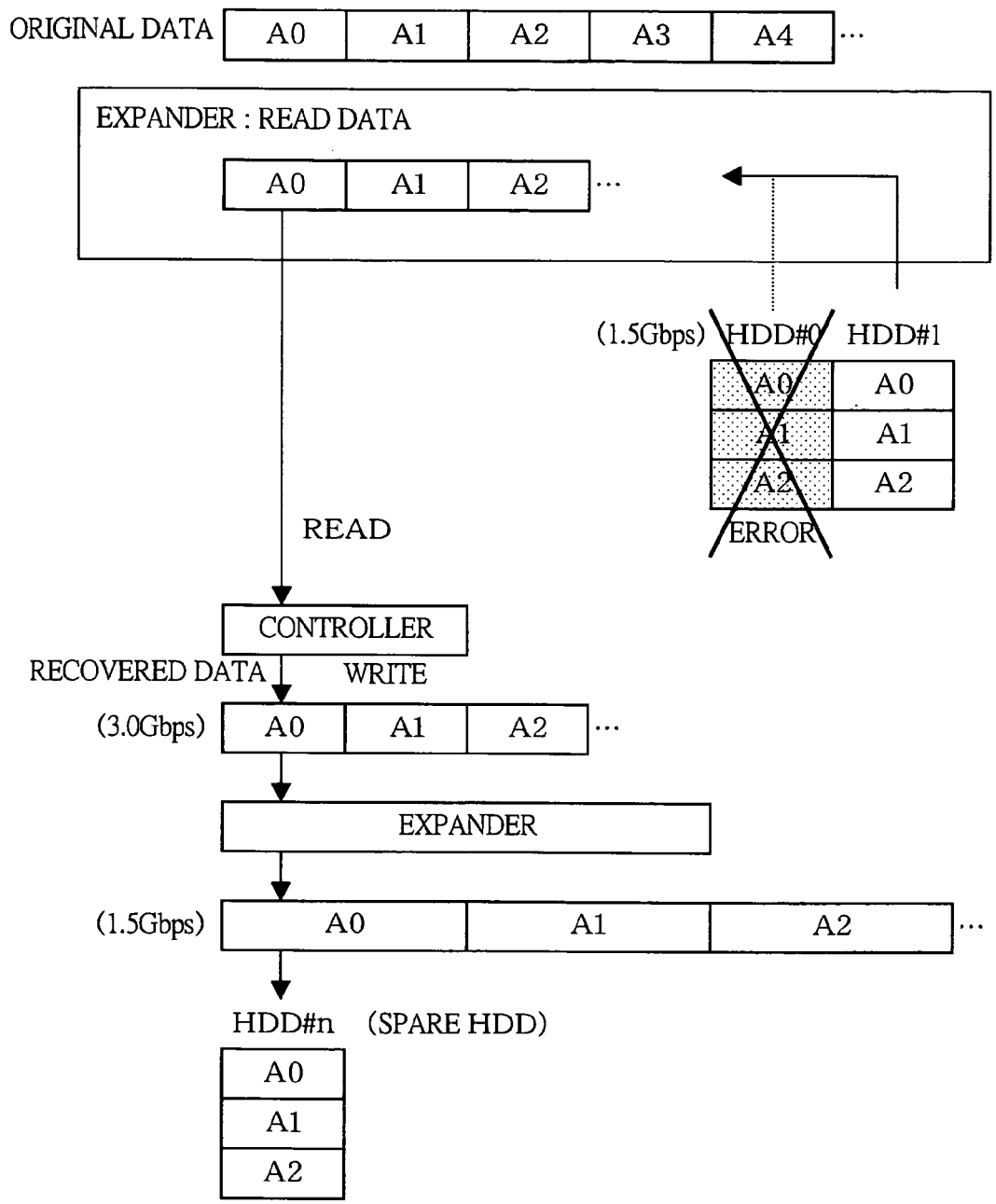
Figure 21B:
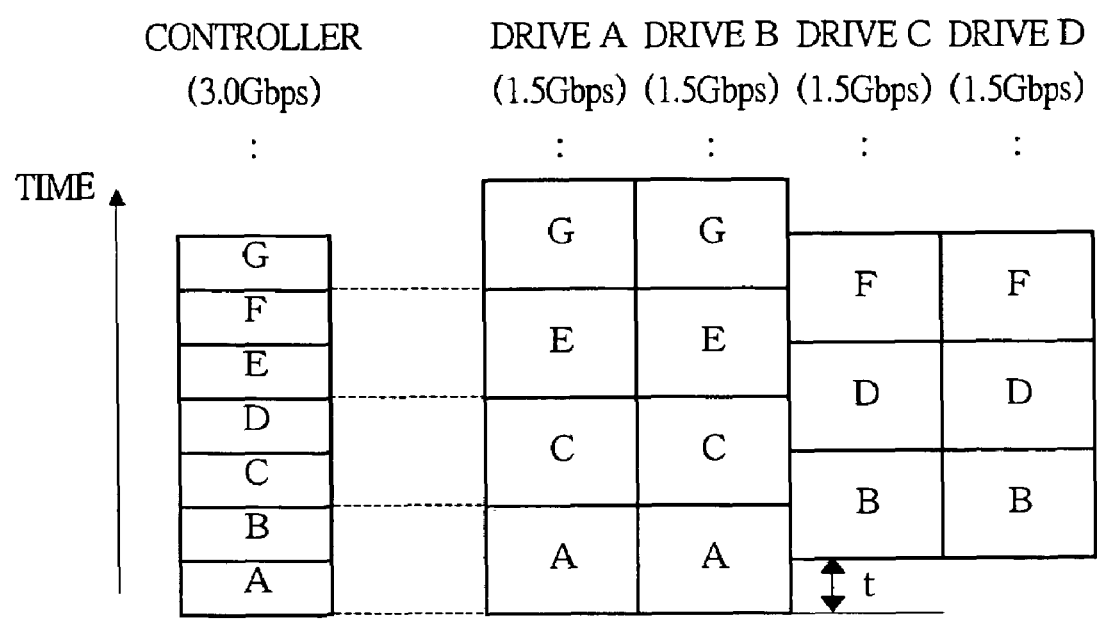
Figure 22:
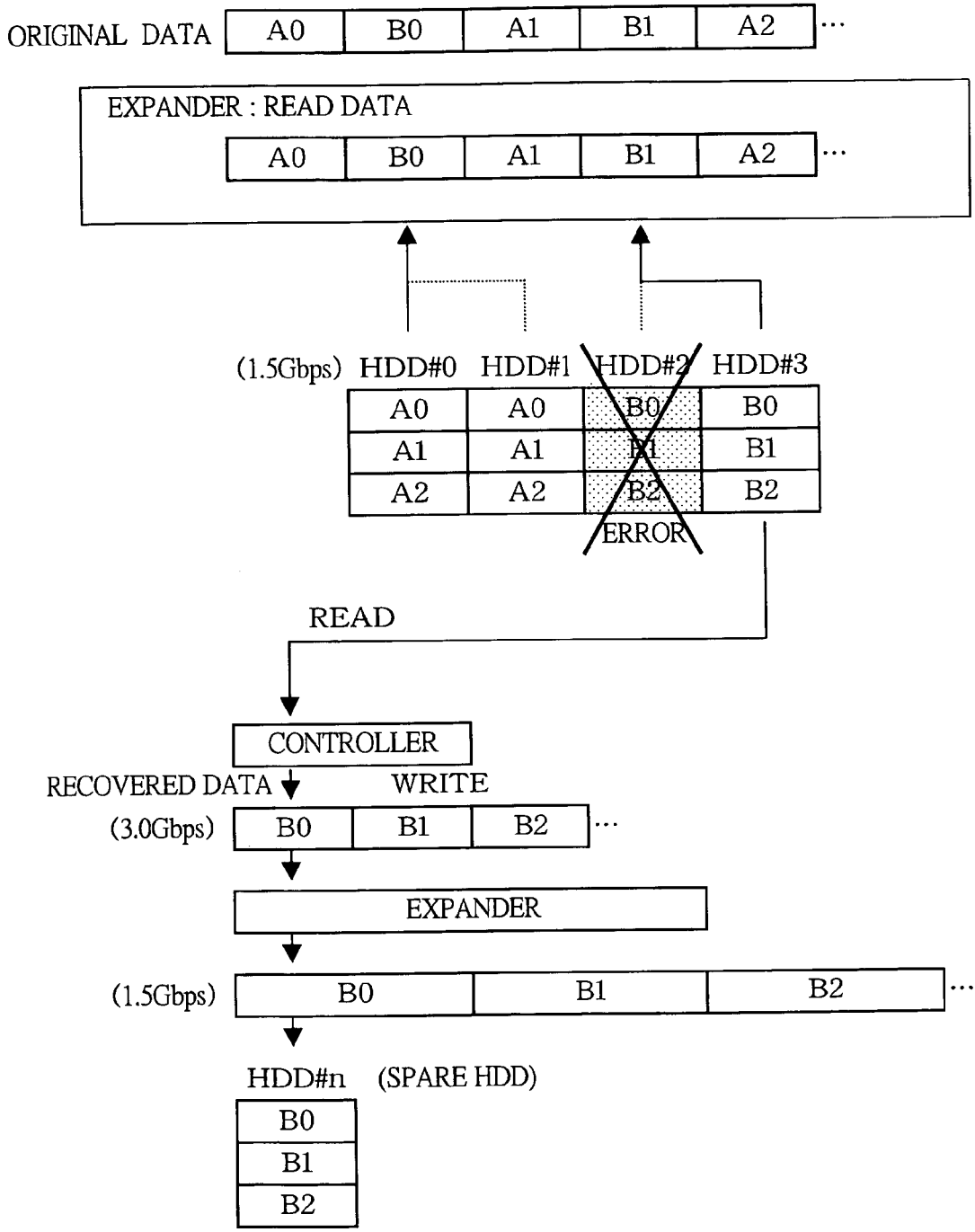
Figure 23A:
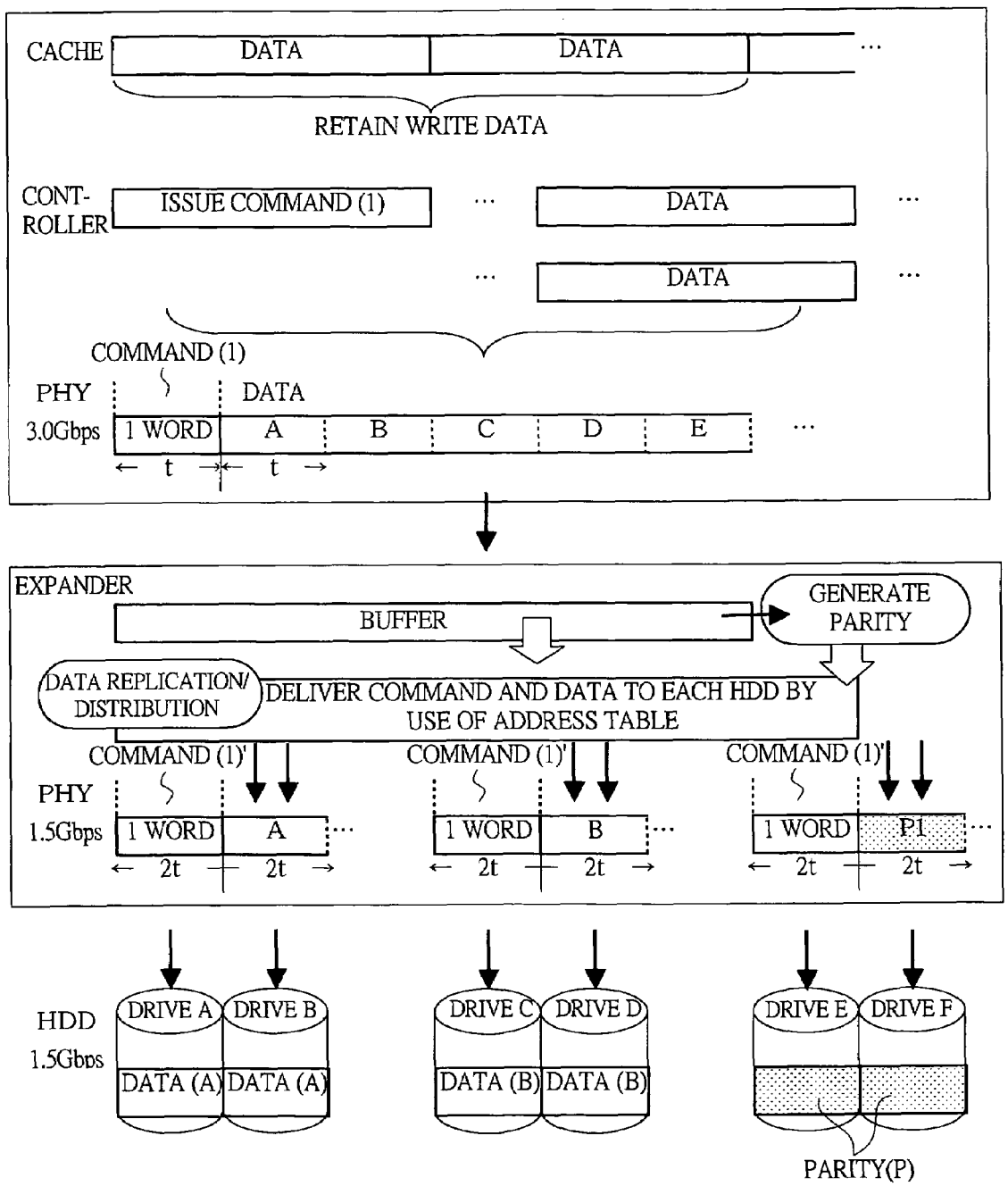
Figure 23B:
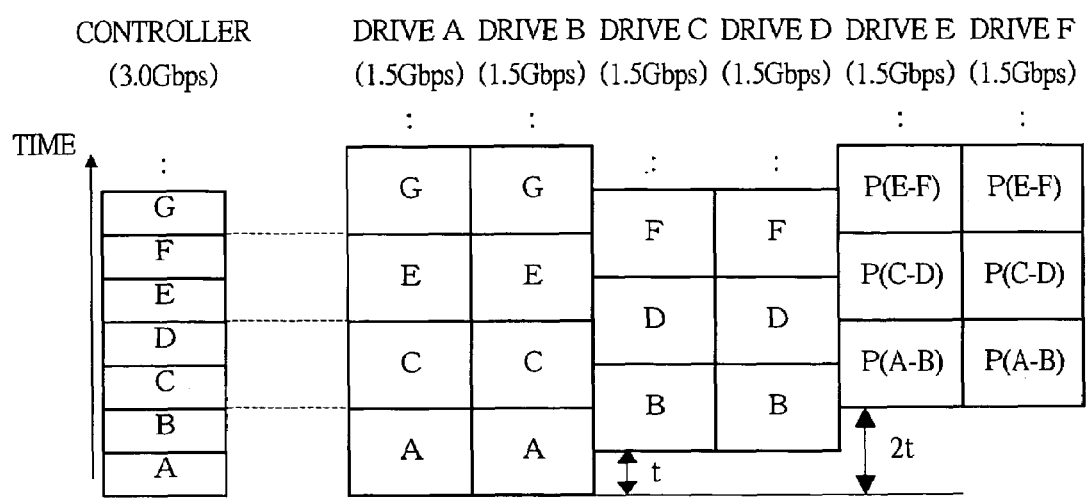
Figure 24A:
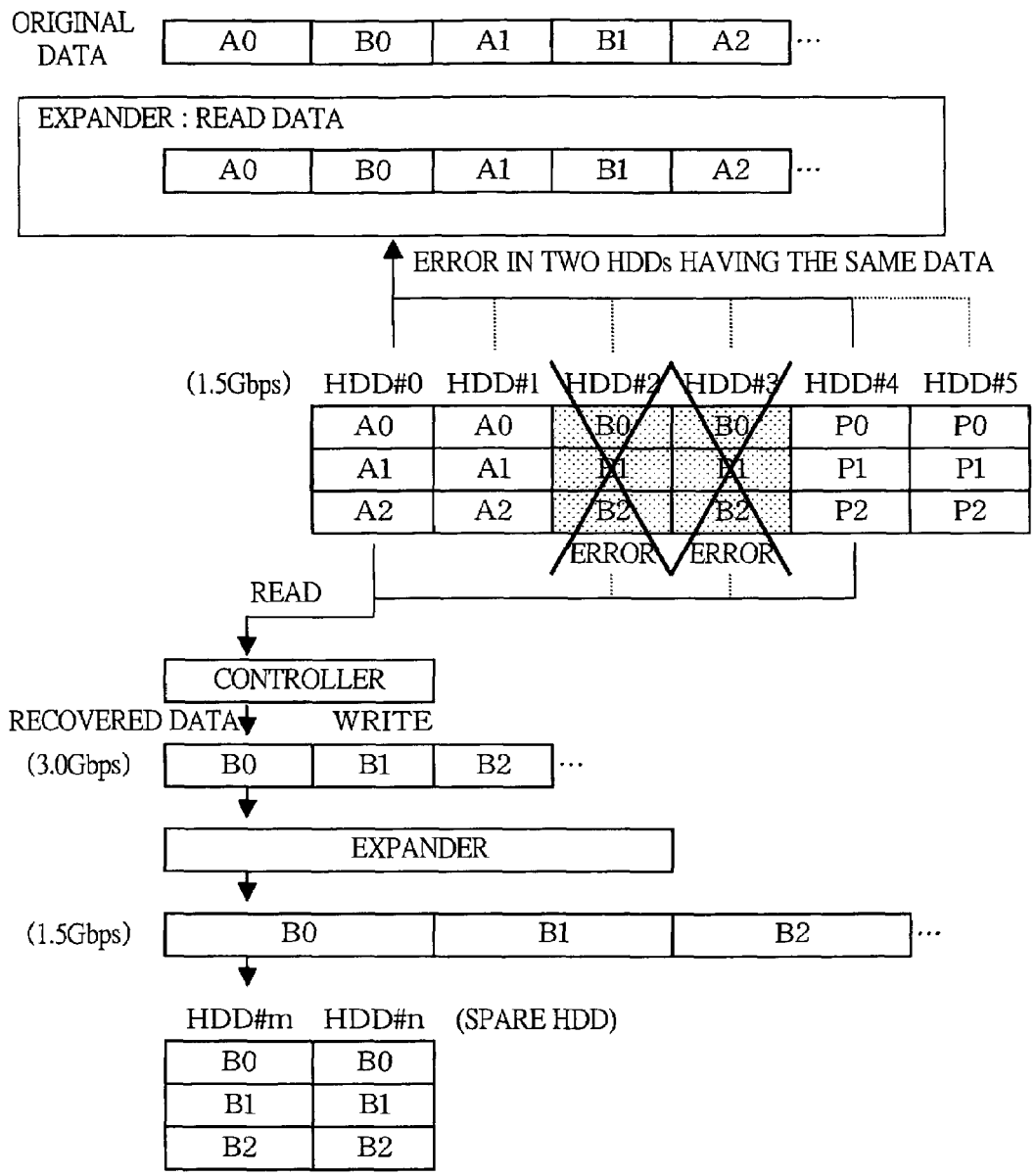
Figure 24B:
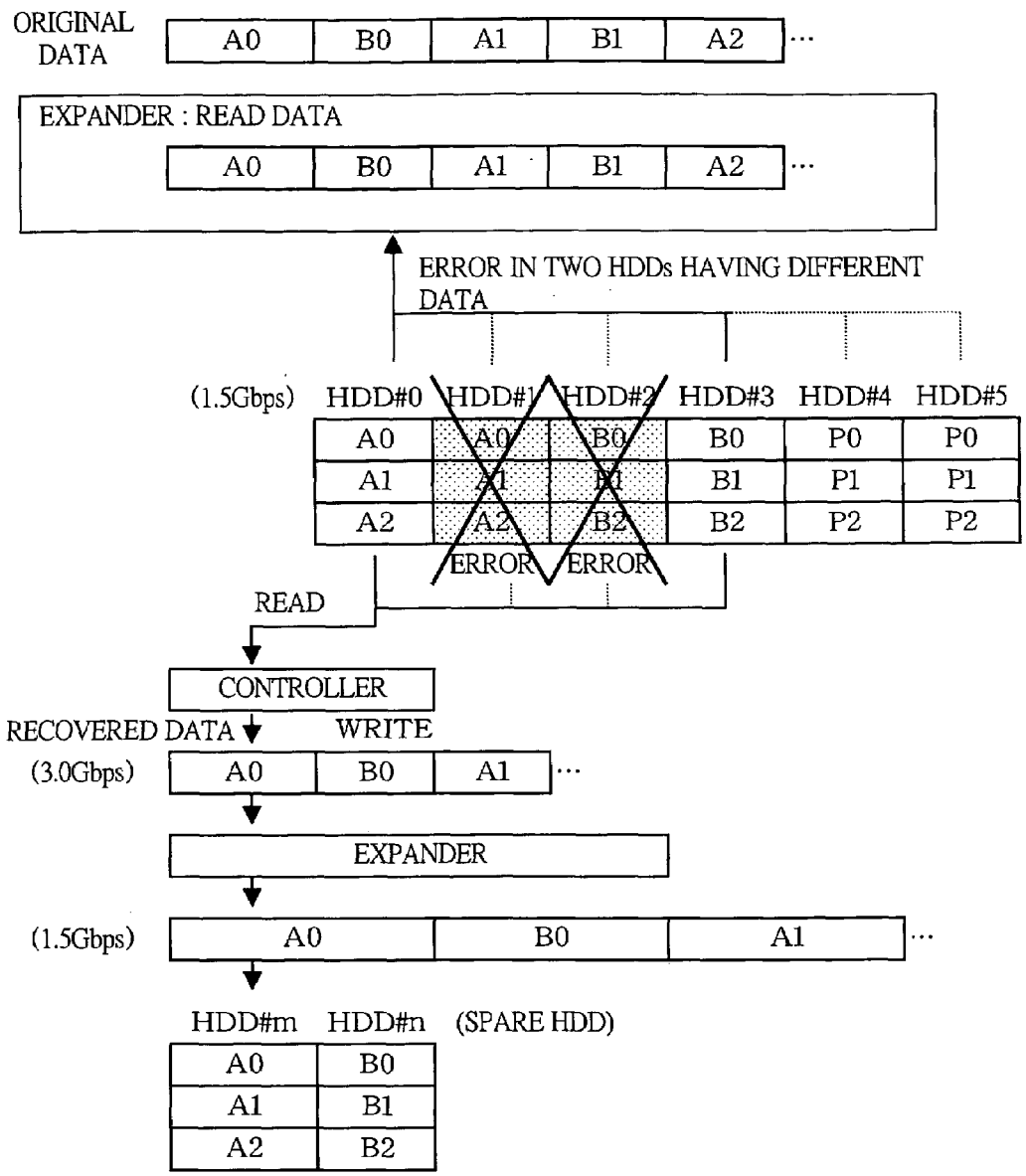
Figure 25A:
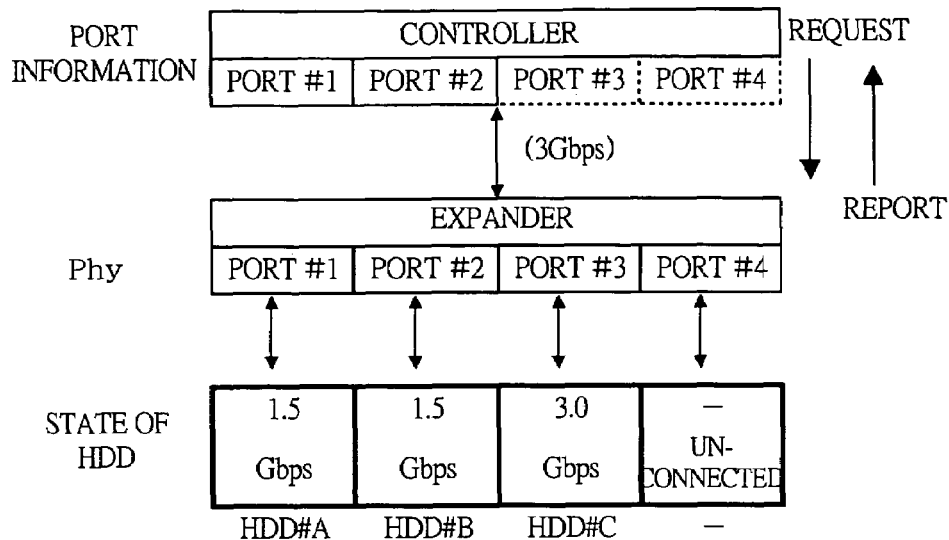
Figure 25B:
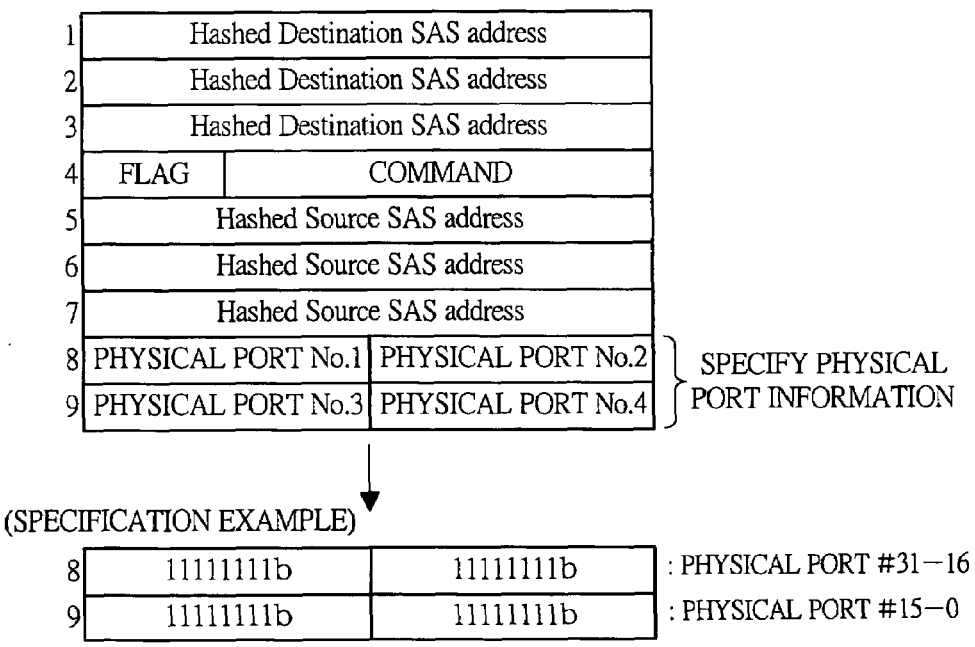
Figure 27A:
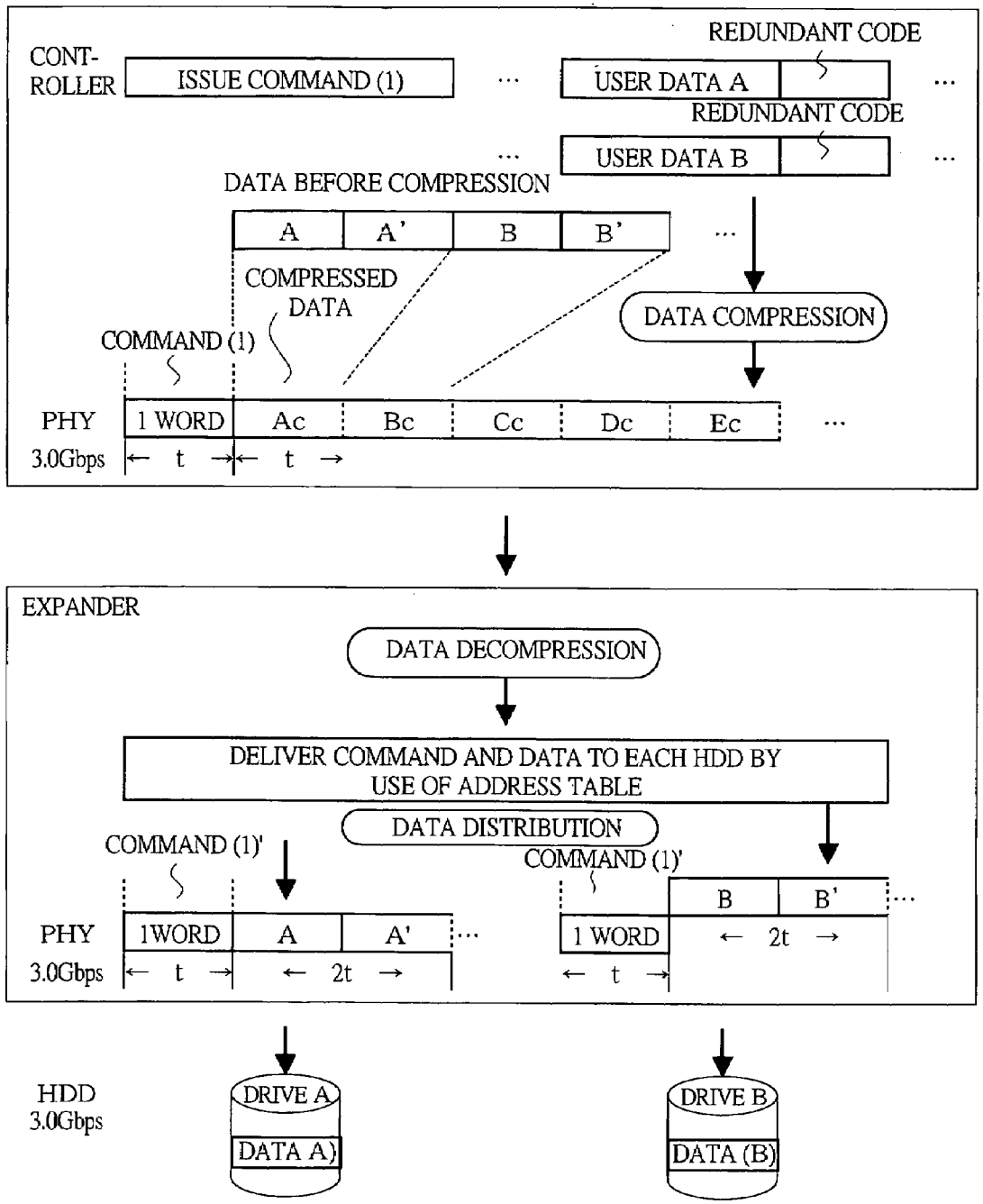
Figure 27B:
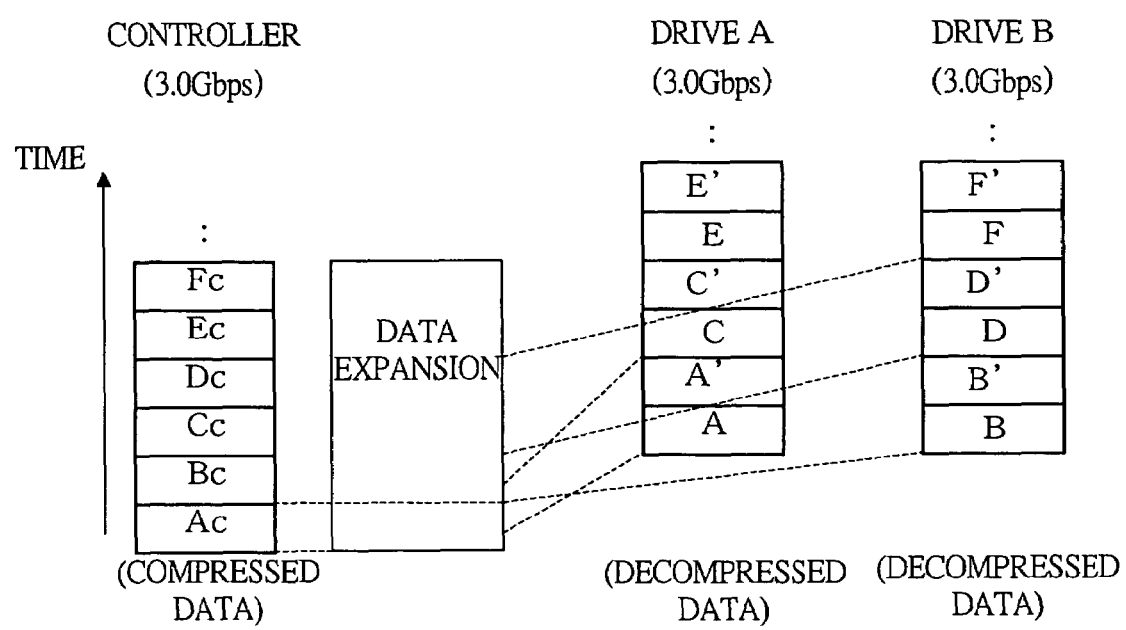
Figure 28:
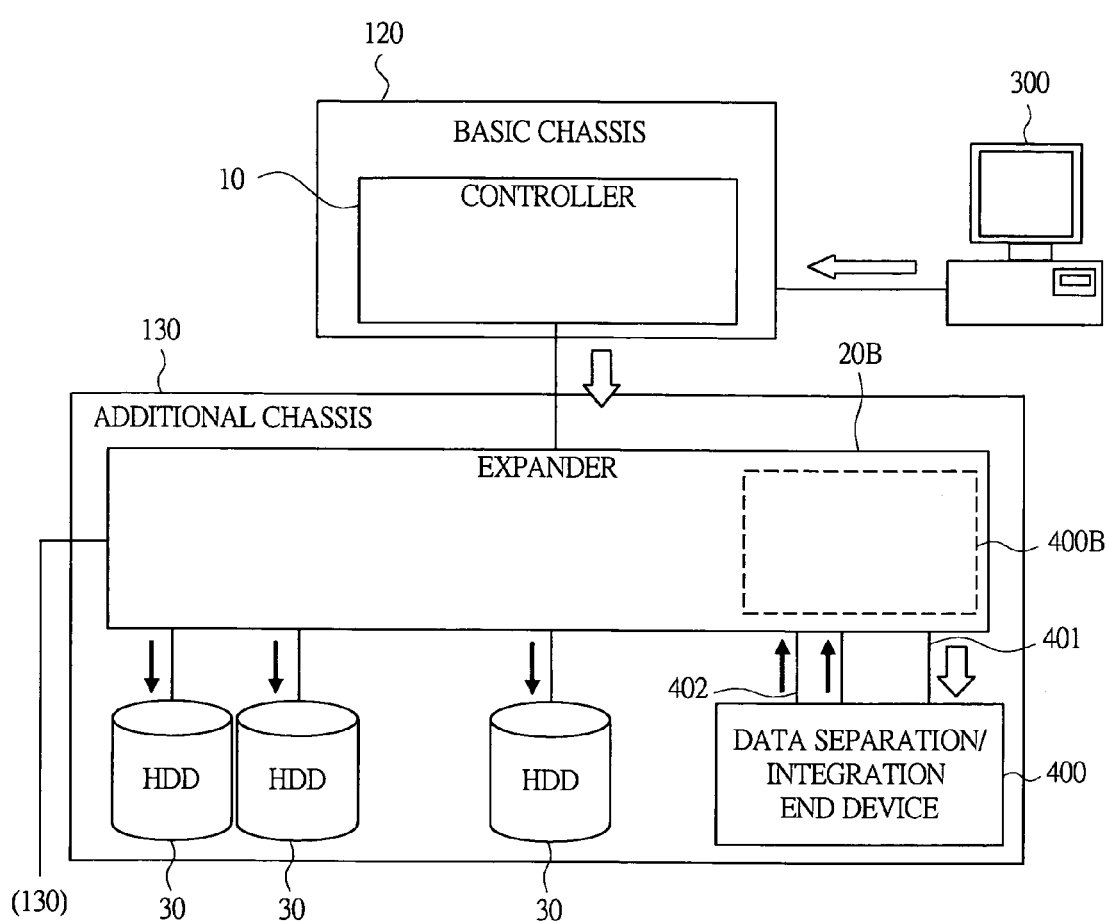
Figure 29:
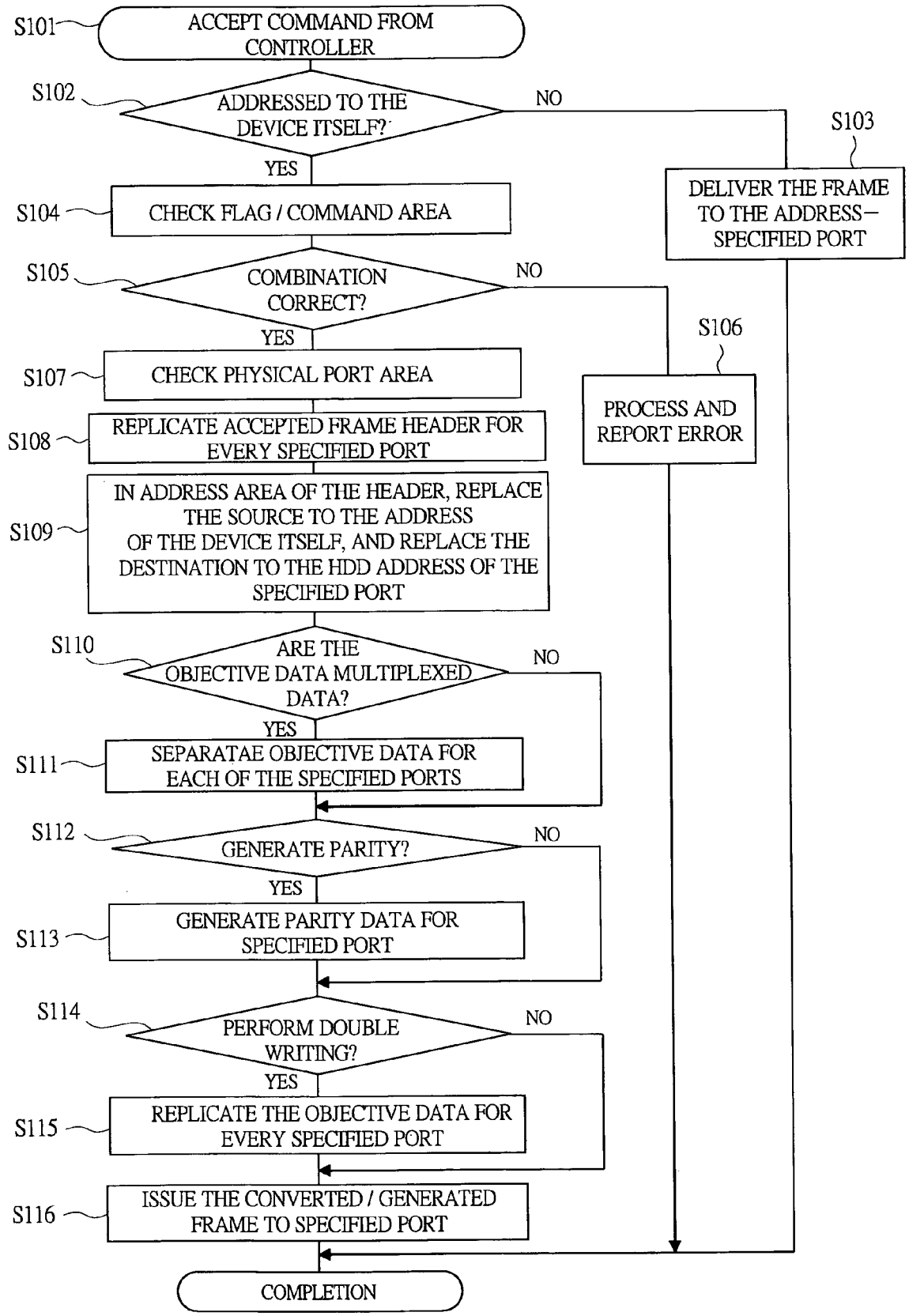
Figure 30:
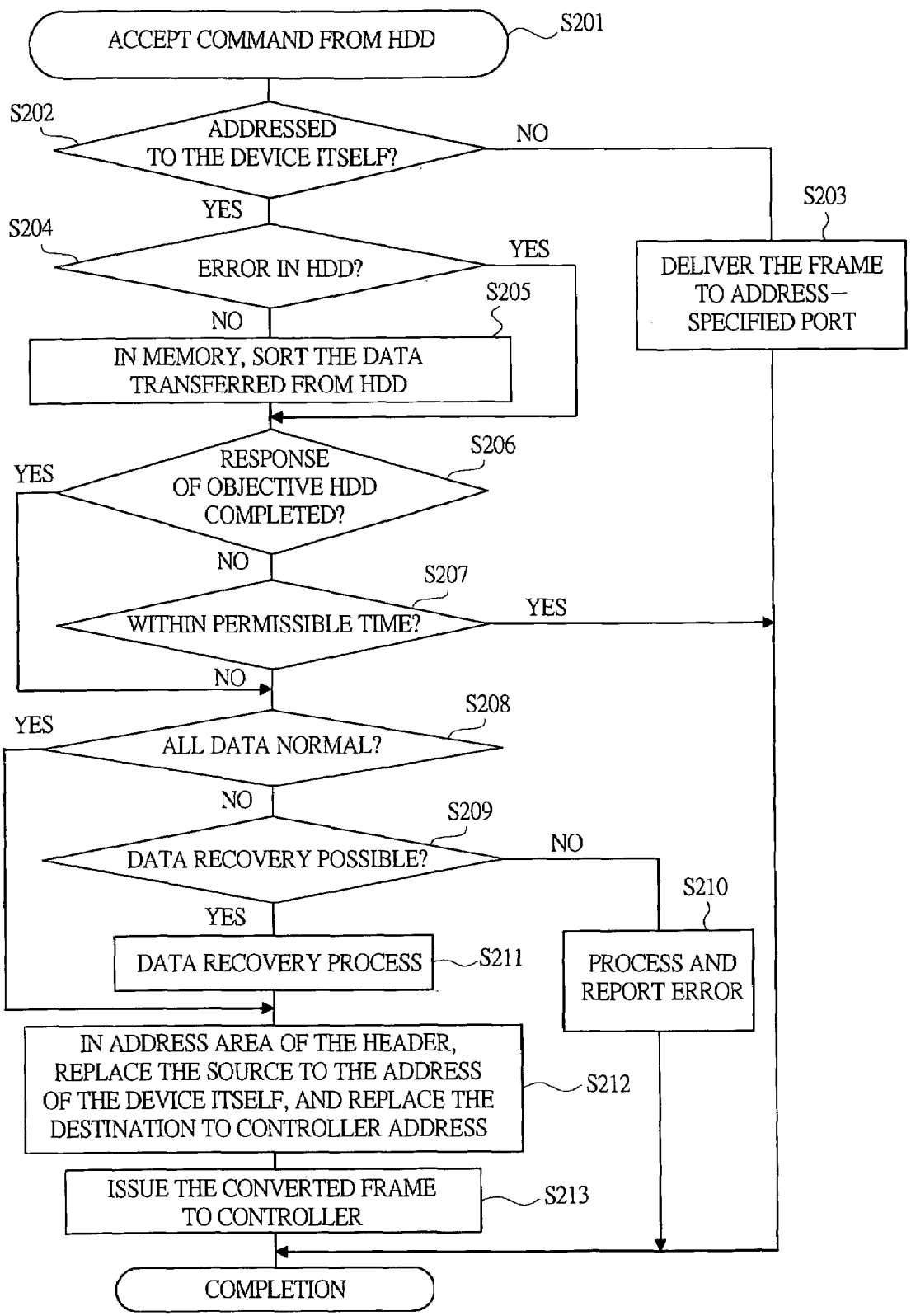

FIG. 6 includes diagrams showing an SSP frame of SAS and a SAS address format;

FIG. 7 is a diagram showing a format example of a particular command which is employed in the embodiments of the present invention;

FIG. 8 is an explanatory diagram representing a process model of a preceding art of the present invention, wherein ALIGN primitive is inserted in accordance with the SAS standard in a configuration of a disk array apparatus to which SAS is simply applied;

FIG. 9 is an explanatory diagram representing a model of a particular process (multiplex transfer) in the disk array apparatus of a first embodiment of the present invention;

FIG. 10A is an explanatory diagrams representing a model of a particular process in a disk array apparatus of a second embodiment of the present invention;

FIG. 10B is an explanatory diagrams representing a model of a particular process in a disk array apparatus of a second embodiment of the present invention;

FIG. 11A is an explanatory diagrams representing a setting in a case in which the particular operation of the second embodiment of the present invention is applied in an actual RAID system;

FIG. 11B is an explanatory diagrams representing a setting in a case in which the particular operation of the second embodiment of the present invention is applied in an actual RAID system;

FIG. 12 is an explanatory diagram representing a process of a case in which the particular operation of the second embodiment of the present invention is applied to a data copy operation performed in the disk array apparatus;

FIG. 13A is an explanatory diagrams representing a model of a particular process in a disk array apparatus of a third embodiment of the present invention;

FIG. 13B is an explanatory diagrams representing a model of a particular process in a disk array apparatus of a third embodiment of the present invention;

FIG. 14A represents an example of processing procedure in a case in which the particular operation of the third embodiment of the present invention is applied to a RAID system;

FIG. 14B represents an example of processing procedure in a case in which the particular operation of the third embodiment of the present invention is applied to a RAID system;

FIG. 15 shows a setting screen for RAID groups which correspond to the particular operation of the third embodiment;

FIG. 16A is an explanatory diagrams representing a model of a particular process in a disk array apparatus of a fourth embodiment of the present invention;

FIG. 16B is an explanatory diagrams representing a model of a particular process in a disk array apparatus of a fourth embodiment of the present invention;

FIG. 17A is an explanatory diagrams representing a model of a particular process in a disk array apparatus of a fifth embodiment of the present invention;

FIG. 17B is an explanatory diagrams representing a model of a particular process in a disk array apparatus of a fifth embodiment of the present invention;

FIG. 18 is an explanatory diagram of automatic data recovery employing parity, and data recovery to a spare HDD, etc. upon read, in relation to a particular process performed in the disk array apparatus of the fifth embodiment of the present invention;

FIG. 19A is an explanatory diagrams representing a model of a particular process in a disk array apparatus of a sixth embodiment of the present invention;

FIG. 19B is an explanatory diagrams representing a model of a particular process in a disk array apparatus of a sixth embodiment of the present invention;

FIG. 20 is an explanatory diagram of automatic data recovery employing multiplex writing and data recovery to a spare HDD, etc. upon read, in relation to a particular process performed in the disk array apparatus of the sixth embodiment of the present invention;

FIG. 21A is an explanatory diagram representing a model of a particular process in a disk array apparatus of a seventh embodiment of the present invention;

FIG. 21B is an explanatory diagram representing a model of a particular process in a disk array apparatus of a seventh embodiment of the present invention;

FIG. 22 is an explanatory diagram of automatic data recovery and data recovery to a spare HDD, etc. upon read, in relation to a particular process performed in the disk array apparatus of the seventh embodiment of the present invention;

FIG. 23A is an explanatory diagram representing a model of a particular process in a disk array apparatus of an eighth embodiment of the present invention;

FIG. 23B is an explanatory diagram representing a model of a particular process in a disk array apparatus of an eighth embodiment of the present invention;

FIG. 24A is an explanatory diagram of automatic data recovery and data recovery to a spare HDD, etc. upon read, in relation to a particular process performed in the disk array apparatus of the eighth embodiment of the present invention;

FIG. 24B is an explanatory diagram of automatic data recovery and data recovery to a spare HDD, etc. upon read, in relation to a particular process performed in the disk array apparatus of the eighth embodiment of the present invention;

FIG. 25A is an explanatory diagram representing a model of a process performed by an HDD information reporting function which is provided in a disk array apparatus of a ninth embodiment of the present invention;

FIG. 25B is an explanatory diagram representing a model of a process performed by an HDD information reporting function which is provided in a disk array apparatus of a ninth embodiment of the present invention;

FIG. 26 is a table showing, in the ninth embodiment of the present invention, regarding the combination of the state of two HDDs, the relation between availability of automatic data recovery by an expander, corresponding embodiments, and operations executed by the expander;

FIG. 27A is an explanatory diagram representing a model of a particular process in a disk array apparatus of a tenth embodiment of the present invention;

FIG. 27B is an explanatory diagram representing a model of a particular process in a disk array apparatus of a tenth embodiment of the present invention;

FIG. 28 is a block diagram representing a configuration of a disk array apparatus of an eleventh embodiment of the present invention;

FIG. 29 is a flow chart showing a procedure in a case where, as an operation of the expander, data are transferred to HDDs based on the command from the controller in accordance with the process performed in the disk array apparatus of the embodiments of the present invention; and FIG. 30 is a flow chart showing a procedure in a case where, as an operation of the expander, data are transferred from HDDs based on the command from the controller in accordance with the process performed in the disk array apparatus of the embodiments of the present invention.

DESCRIPTION OF THE PREFERRED EMBODIMENTS

Embodiments of the present invention will next be described in detail based on drawings.

First Embodiment

A disk array apparatus of a first embodiment of the present invention will be described. A hardware configuration commonly employed in embodiments of the present invention will be explained first, and then characteristic processes, etc. which are performed on the hardware will be explained.

<Hardware Configuration>

Figure 1A:
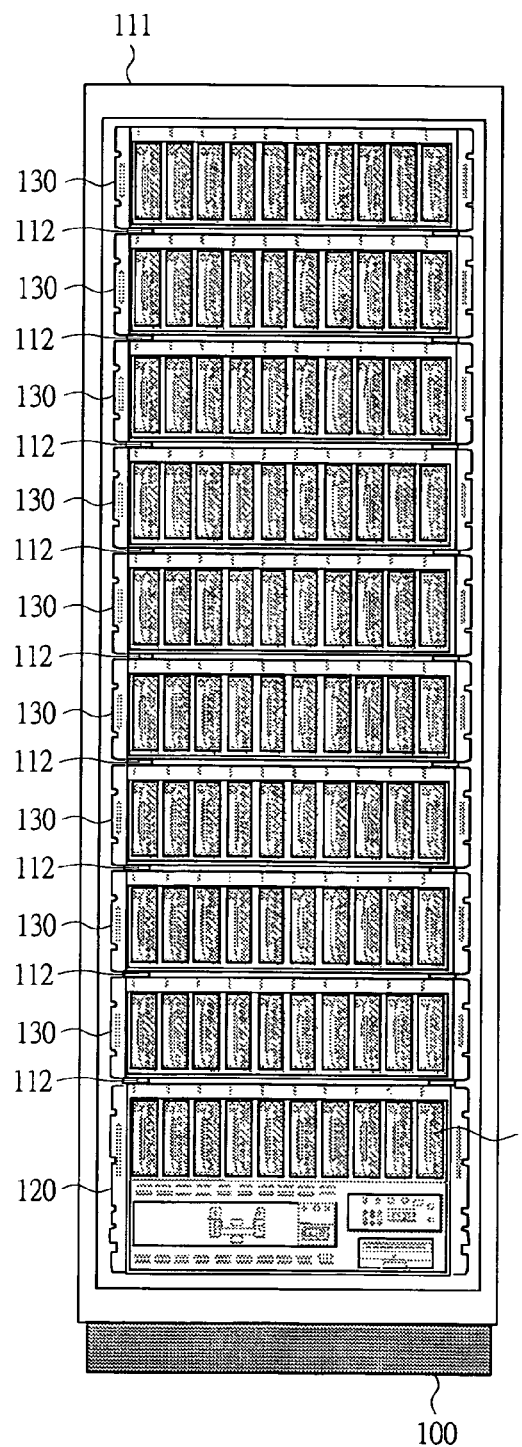
FIG. 1A is the drawing showing the external appearance of the hardware configuration of a disk array apparatus of an embodiment which is commonly employed in disk array apparatus of embodiments of the present invention.
Figure 1B:
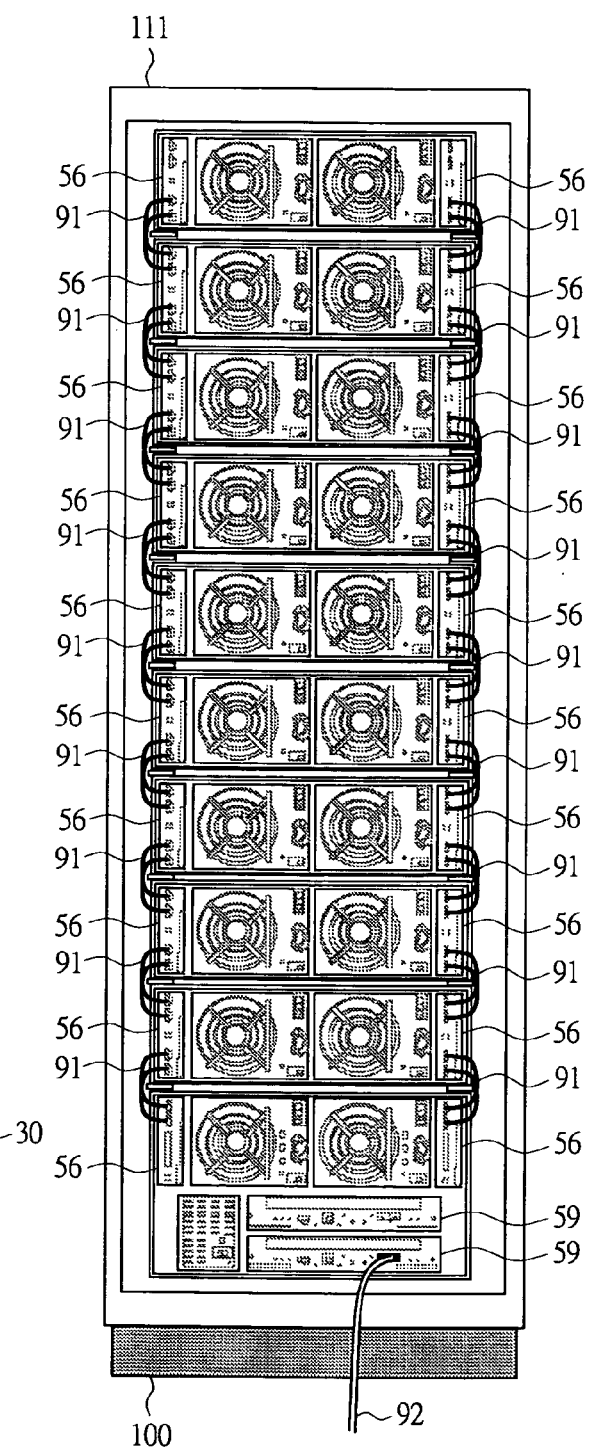
FIG. 1B is the drawing showing the external appearance of the hardware configuration of a disk array apparatus of an embodiment which is commonly employed in disk array apparatus of embodiments of the present invention.

FIGS. 1A and 1B are the drawings showing the external appearance of the hardware configuration of a disk array apparatus which is commonly employed in disk array apparatus of embodiments of the present invention. FIG. 1A shows the front of the device, and FIG. 1B shows the rear of the device. The present disk array apparatus 100 has a configuration in which a rack frame 111 serves as a base, mount frames 112 are formed over a plurality of blocks in the vertical direction inside the rack frame 111, and a basic chassis 120 (disk-array-control housing) and additional chassis 130 (HDD housing) are attached along the mount frames 112 in a manner that they can be pulled out. In the present apparatus 100, one basic chassis 120 is attached to the lowest block, and a plurality of additional chassis 130 can be attached to upper blocks. Each of the chassis is equipped with boards (circuit boards) and units for providing various functions of the present apparatus 100. A basic chassis 120 is a chassis for housing therein a controller board 59, etc. for forming a controller 10 of the disk array apparatus. The additional chassis 130 is a chassis for housing HDDs 30, and may be added in accordance with needs.

In the configuration of the present apparatus 100, an expander (20), which is described later, is applied to each of the connection unit between the basic chassis 120 and the additional chassis 130 and the connection unit between additional chassis 130, that is, the expander (20) is applied to the unit of a power supply controller board (56). A disk array apparatus having scalability can be formed by employing expanders in the above described manner.

In the front of the device, there provided space to which a plurality of units of the basic chassis 120 and the additional chassis 130 loaded with HDDs 30 can be attached in a row. The HDDs 30 can be attached and detached in respective attached positions. In addition, in the front of the basic chassis, a battery unit serving as a backup power supply, a display panel for displaying the state of the device, a flexible disk drive for loading programs, etc. are provided.

In the rear of the device, power supply controller boards 56 and power supply units, etc. are provided on the basic chassis 120 and the additional chassis 130. In the rear of the basic chassis, controller boards 59, a cooling fan unit, etc. are provided.

A backboard is provided in each of the chassis for connecting the members, and each of the boards, units, a plurality of HDDs 30, etc. are connected to the backboard. The members communicate with one another via the wirings of the backboard.

The controller board 59 controls data storing to the HDDs 30 based on the instructions from a data processing device 300 which serves as a host. On the controller board 59, an interface for communicating with the host, a cache memory, a shared memory, an interface for communicating with HDDs 30, a circuit having a function such as for the control by a RAID system and for monitoring the state of HDDs 30, etc. are mounted. The functions such as communication interface and cache memory may be mounted on another board which is separated from the controller board. In the configuration, two controller boards 59 are redundantly attached in order to ensure the security regarding the control of the HDDs 30 in the basic chassis 120.

In the interface provided in the controller for communicating with the host, a SAN (Storage Area Network) formed by the Fibre Channel protocol, a LAN (Local Area Network) formed by a protocol such as Ethernet (registered trademark), or a connection adopting a predetermined standard such as SCSI is provided as a external connector for the connection with the host. The disk array apparatus is connected with the data processing device 300 via a communication cable connected to the external connector.

The power supply controller board 56 connects the chassis and performs, for example, control of a system such as for power supply among chassis and control of HDDs 30. External SAS cables 91 are connected to the connectors provided at the power supply controller boards 56, and the power supply controller boards 56 are connected with one another by the external SAS cables 91. The power supply controller board 56 is connected with a communication path which performs communication by a built-in SAS expander with a protocol such as SAS and SATA, so as to be able to communicate with the plurality of HDDs 30 in each of the chassis. On the power supply controller board 56, in addition to the circuit forming the SAS expander, a circuit which performs, for example, monitoring of the state of an AC/DC power supply, monitoring of the state of the HDDs 30, and control of power supply to the HDDs 30, are mounted. The various functions such as power supply controlling function provided in the power supply controller board 56 may be provided in the controller board 59.

The power supply unit is equipped with an AC/DC power supply, etc., and supplies DC electricity to each of the members in the chassis such as the HDDs 30 and the boards. The power supply unit is connected with the power supply controller board 56 and supplies power to each of the HDDs 30 according to the signals from the power supply controller board 56. In the configuration, two power supply controller boards 56 and two power supply units are redundantly attached to each of the chassis in order to ensure the security regarding the power supply to the chassis.

As the HDD 30 which is attached and connected to the chassis, there may be employed a 2.5-inch magnetic disk and a 3.5-inch magnetic disk having communication interfaces different from each other, in addition, having different I/O performances, power consumptions, and lengths of life. The 2.5-inch magnetic disk has inferior I/O performance and shorter life compare with the 3.5-inch magnetic disk, however, has an advantage in terms of the small power consumption.

<System Configuration (1)>

Figure 2:
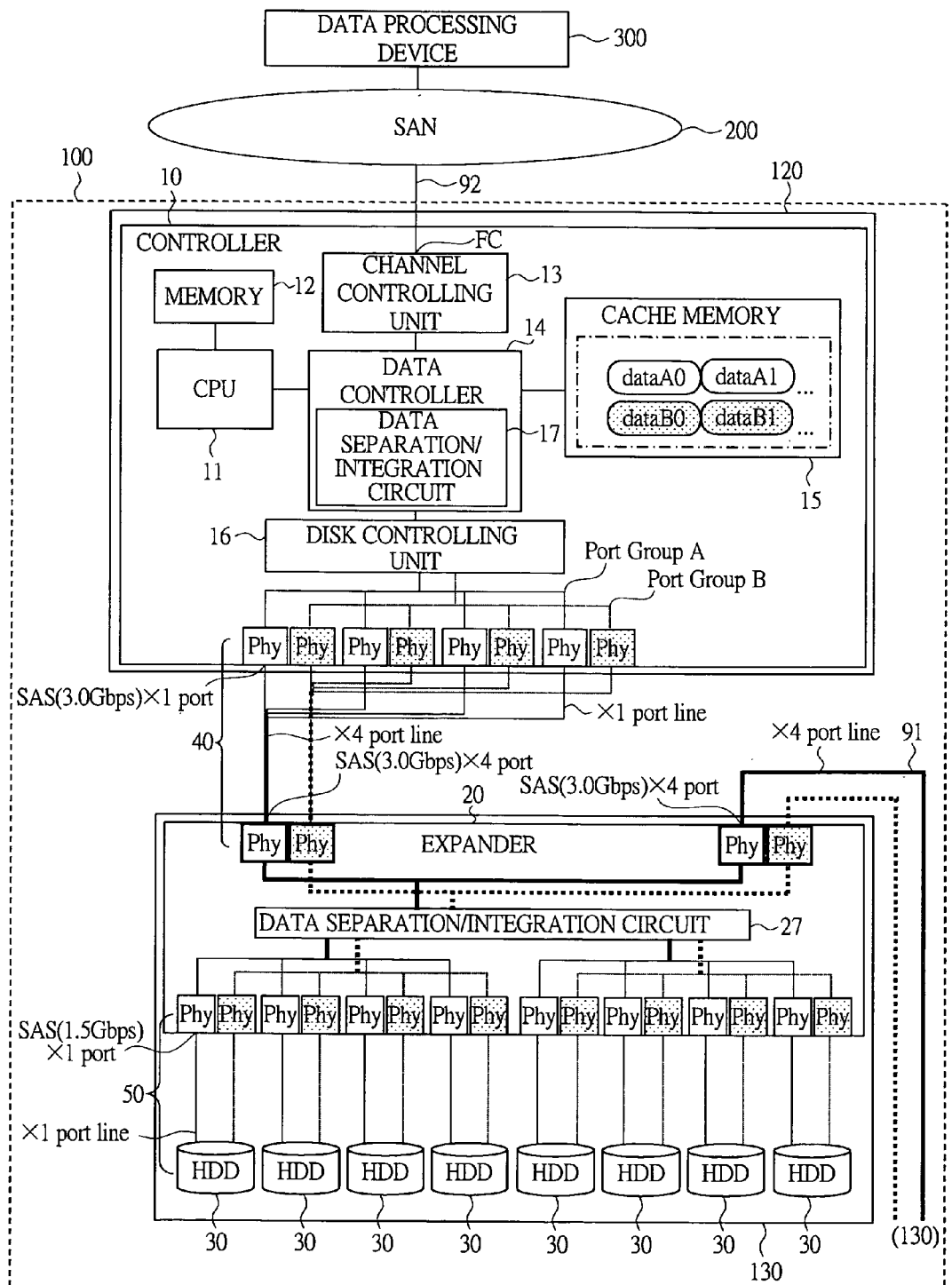
FIG. 2 is a functional block diagram of the entire system configuration relating to the disk array apparatus of the embodiment.

FIG. 2 is a functional block diagram of the entire system configuration relating to the disk array apparatus 100. In the entire computer system configured by including the disk array 100, the disk array apparatus 100 and the data processing device 300 serving as the host thereof are connected by an FC (Fibre Channel) interface via a SAN (Storage Area Network) 200. The connection with the host side is not limited to the SAN 200 and FC, and may be connected by others. The disk array apparatus 100 has a controller 10, an expander 20, HDDs 30, and connection units such as a bus and physical port for connecting these members. A SAS physical link (40) between the controller 10 and the expander 20 has a rate of 3.0 Gbps. SAS physical links (50) between the expander 20 and the HDDs 30 have a rate of 1.5 Gbps.

The data processing device 300 is, for example, a personal computer used by a user, a workstation, or a mainframe computer. The data processing device 300 includes a program for utilizing the disk array apparatus 100, and a communication interface which corresponds to FC for communicating with the disk array apparatus 100. The data processing device 300 issues a command to the disk array apparatus 100, for example, for performing read or write of data on the storage area provided at the HDDs 30. The disk array apparatus 100 processes read, write, etc. of data based on the accepted instruction given from the data processing device 300.

The disk array apparatus 100 has a function for performing communication in accordance with SAS in the communication connection between the controller 10 and the HDDs 30 via the expander 20. The controller 10 and the HDDs 30 serve as SAS end devices. The SAS expander devices are applied to the power supply controller boards 56 which serve as connection units between the basic chassis 120 and the additional chassis 130 and between a plurality of additional chassis 130. In the disk array apparatus 100, the performance thereof is enhanced by connecting a plurality of additional chassis 130 including expanders 20 in accordance with needs.

A controller 10 is mounted on, for example, the controller board 59 in the basic chassis 120. In the diagram, the controller 10 and the HDDs 30 are separately shown in different chassis so as to be easily understood. The controller 10 has a plurality of physical ports (PHY) connected with the expander 20-side by physical links (40).

The expander 20 mutually connects the controller 10 and the plurality of HDDs 30 so as to relay data transfer, and performs particular operations such as multiplex transfer. The expander 20 is a device formed by mounting the SAS expander device and functions characteristic in the present embodiment on the part of the disk controlling unit of the power supply controller board 56 in each of the chassis. The diagram shows a configuration in which the SAS expander device is mounted on the disk controlling unit in each of the additional chassis 130; however the connection configuration between the controller 10, the expander 20, and the HDDs 30 is not limited to the present configuration. The expander 20 has a plurality of physical ports (PHY) for connecting with the controller 10-side and another expander 20-side in another additional chassis 130 via physical links (40), and for connecting with the HDD 30-side via physical links (50). Connections by the communication interface based on SAS are provided between the controller 10, the expander 20, and the HDDs 30, and between the plurality of the expanders 20 so as to make them mutually communicatable.

The HDD 30 is a HDD corresponding to SAS (SAS-HDD), or a HDD corresponding to SATA (SATA-HDD). In a case of a slow xfer rated SAS-HDD, the xfer rate at the SAS physical links (50) between the expander 20 and the HDDs 30 is, for example, 1.5 Gbps which is slower than the rate at the controller 10-side. In a case of a fast SAS-HDD, the rate at the SAS physical links (50) between the expander 20 and the HDDs 30 is, for example, 3.0 Gbps which is the same speed as the rate at the controller 10-side. The HDDs 30 have unillustrated physical ports corresponding to the physical ports of the expander 20-side, and perform read/write of data in units such as blocks or sectors on the disks based on the command or the data received via the physical links (50). Addresses unique in the system, SAS addresses particularly in a case of SAS-HDDs, are given to the HDDs. Meanwhile, the SAS protocol is employed in the communication with the SAS-HDDs, and the SATA protocol is employed in the communication with the SATA-HDDs.

The SAS system also has connectivity with SATA devices, and the expander 20 corresponds to any of the connections with SAS-HDDs and SATA-HDDs. The SAS protocol includes the physical layer, the link layer, the port layer, and the transport layer. A SAS port includes the layers. A physical port (denoted by "Phy" in the diagram) includes the physical layer and the link layer. The transport layer performs, for example, a process in which commands, data, status, etc. are encapsulated in a SAS frame and assigned to the port layer. The port layer performs a packet (frame) transfer process after the physical port for transmitting the packet (frame) is selected and the connection is established. The link layer controls the physical layer for the connection management. The physical layer includes the hardware for transmitting signals to a port line (bus).

The controller 10 has a CPU 11, a memory 12, a channel controlling unit 13, a data controller 14, a cache memory 15, a disk controlling unit 16, and a plurality of physical ports (Phy). The controller 10 is identified by a SAS address (controller address). Also, for example, the channel controlling unit 13 and the disk controlling unit 16 may be a plural.

The CPU 11 executes control programs by using the memory 12, and realizes various functions of the controller 10. The channel controlling unit 13 is a communication processing unit which is connected to the SAN 200 and provides a communication function (FC interface) in accordance with the FC protocol. The channel controlling unit 13 communicates with, for example, another communication processing unit at the host-side and another disk array apparatus. The channel controlling unit 13 is connected to the data controller 14 and performs read/write of data on the cache memory 15.

The data controller 14 is an LSI having a data separation/integration circuit 17. The data controller 14 is connected to the CPU 11, the channel controlling unit 13, the cache memory 15, and the disk controlling unit 16, and performs data communication and data processing among the members. The data controller 14 performs read/write of processing data, particularly transfer data with the host, on the cache memory 15.

The cache memory 15 is employed for storing processing data such as user data and commands, and particularly the transfer data relating to multiplex transfer functions are temporarily retained therein. For example, when normal access is performed, corresponding to the data input/output requests from the host such as read and write, the channel controlling unit 13 stores write data, etc. in the cache memory 15 via the data controller 14. The disk controlling unit 16 performs input/output processes on the cache memory 15 via the data controller 14 corresponding to the commands according to the instructions from a CPU 11.

The disk controlling unit 16 is connected with the data controller 14 and the plurality of physical ports via bus, and performs processing data input/output on the expander 20 and the HDDs 30. The disk controlling unit 16 performs read/write of data on the cache memory 15 via the data controller 14. The disk controlling unit 16 has a communication function according to SAS.

The data separation/integration circuit 17 performs data separation/integration processes relating to, for example, the multiplex transfer functions. The data separation/integration circuit 17 performs a process of integrating the transfer data given from the host-side in accordance with the type of the particular operation, and separating the transfer data given from the expander 20-side. The processes performed by the data separation/integration circuit 17 will be described later.

In the controller 10 and the expander 20, port groups are formed by a plurality of physical ports. In the example configuration, two port groups A and B are formed from eight physical ports. In the diagram, the busses included in the port group A are indicated by solid lines, and the bus included in the port group B are indicated by dotted lines. The physical ports of the controller 10-side corresponds to the physical ports of the expander 20-side in the port groups. In the connection between the controller 10 and the HDDs 30, data transfer or the like can be performed by use of the physical ports and the port groups. When a failure occurs in a data path, another physical port may be selected for switching. A multiplex transfer, etc. can be performed by use of one port line (bus) between the physical ports.

The expander 20 has a data separation/integration circuit 27, in addition to a function as a disk controlling unit for controlling the HDDs 30. The expander 20 is connected to the disk controlling unit 16 in the controller 10-side, the HDDs 30 which are attached and connected in the additional chassis 130, and another expander 20, each of them are connected by the SAS physical links (40 and 50) via the physical ports and bus. For example, the expander 20 has physical ports corresponding to the two paths of port groups A and B. In the diagram, among the physical ports provided at the expander 20 for communicating with the controller 10-side, four physical ports corresponding to the port group are collectively represented by one member. In the physical links, a thin line represents one port line (bus), and a bold line collectively represents four port lines. The physical links connecting between expanders 20 has a rate of, for example, 3.0 Gbps as well as the controller 10-side. All of the plurality of HDDs 30 in the additional chassis 130 is connected to the expander 20 via the port lines (bus) and the two paths of port groups provided at the expander 20. Each of the HDDs 30 is connected to two physical ports corresponding to the two paths of port groups.

The number of the physical ports and the number of connectable HDDs, etc. are not limited to that of the present configuration and may be increased or decreased. In the embodiments, in the communication connections between the controller 10, the expander 20, and the HDDs 30, a combination of physical link rates of fast 3.0 Gbps (controller 10-side) and slow 1.5 Gbps (HDD 30-side) is described as a basic combination. However, the combination is not limited to this, and other rates may also employed, for example, a combination of 6.0 Gbps and 3.0 Gbps, or a combination further including 1.5 Gbps may be employed.

<System Configuration (2)>

Figure 3:
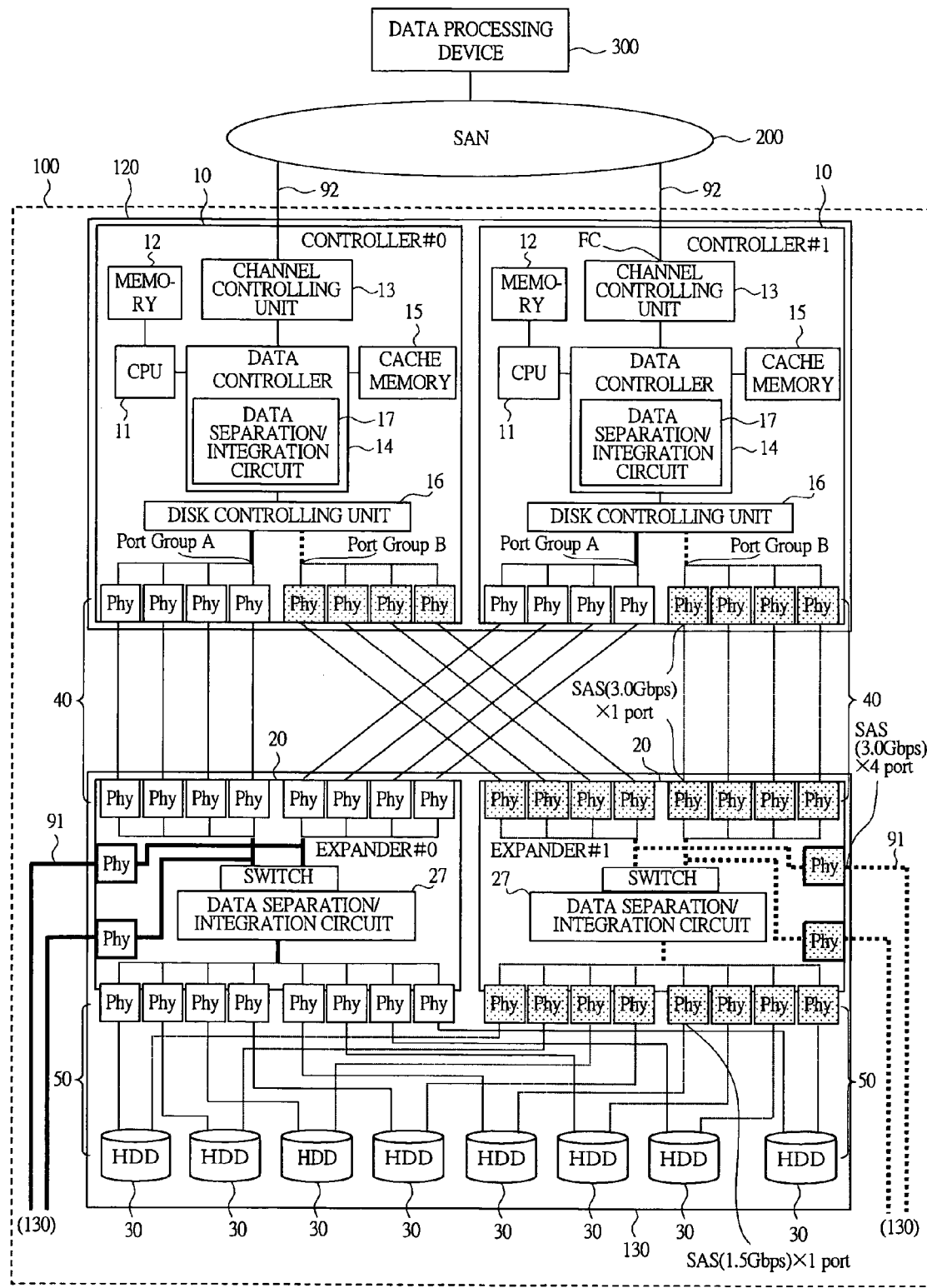
FIG. 3 is a functional block diagram of entirety of another system configuration relating to the disk array apparatus of the embodiment.

FIG. 3 is a functional block diagram of another system configuration relating to the disk array apparatus 100. In the present configuration, the members on the data path through the host to the HDDs 30, such as the controller 10 and expander 20 are doubled. When, for example, a failure occurs in one path, failover which switches to the other path and continues the process, or load balancing can be performed. The members provided in the controllers 10 and the expanders 20 are approximately the same as those in the above described system configuration. In the present configuration, multiplex transfer functions, etc. can also be executed in the same manner.

Each of the controllers 10 and the expanders 20 is equipped with a plurality of physical ports and corresponds to the two paths of port groups A and B. The physical ports are connected in combinations so as to obtain redundancy between the controller 10, the expander 20, and the HDDs 30. Each of two controllers #0 and #1 is connected in the basic chassis 120. Each of the controllers 10 is connected to the SAN 200 at the channel controlling unit 13. In each of the controllers 10, two port groups A and B are connected to the disk controlling unit 16. In the additional chassis 130, two expanders #0 and #1 are connected. Each of the expanders 20 is connected to the both controllers 10. That is, the port group A of the controller #0 and the port group A of the controller #1 are connected to the expander #0. The port group B of the controller #0 and the port group B of the controller #1 are connected to the expander #1. Even when connection failure occurs in one of the port groups, processes can be continued by switching to the connection of the other port group. All of the plurality of HDDs 30 in the additional chassis 130 is connected to each of the expander 20 via the bus and through the plurality of physical ports provided at the expander 20. Also, the expander 20 has two paths of physical ports for connecting with another expander 20 in another additional chassis 130, and these four physical ports and these four port lines are collectively represented by one member in the diagram.

The expander 20 has a switch for switching the paths among the physical ports in the expander 20, which is switched depending on the data transfer destination.

<Connection Between the Controller and the Expander>

Figure 4:
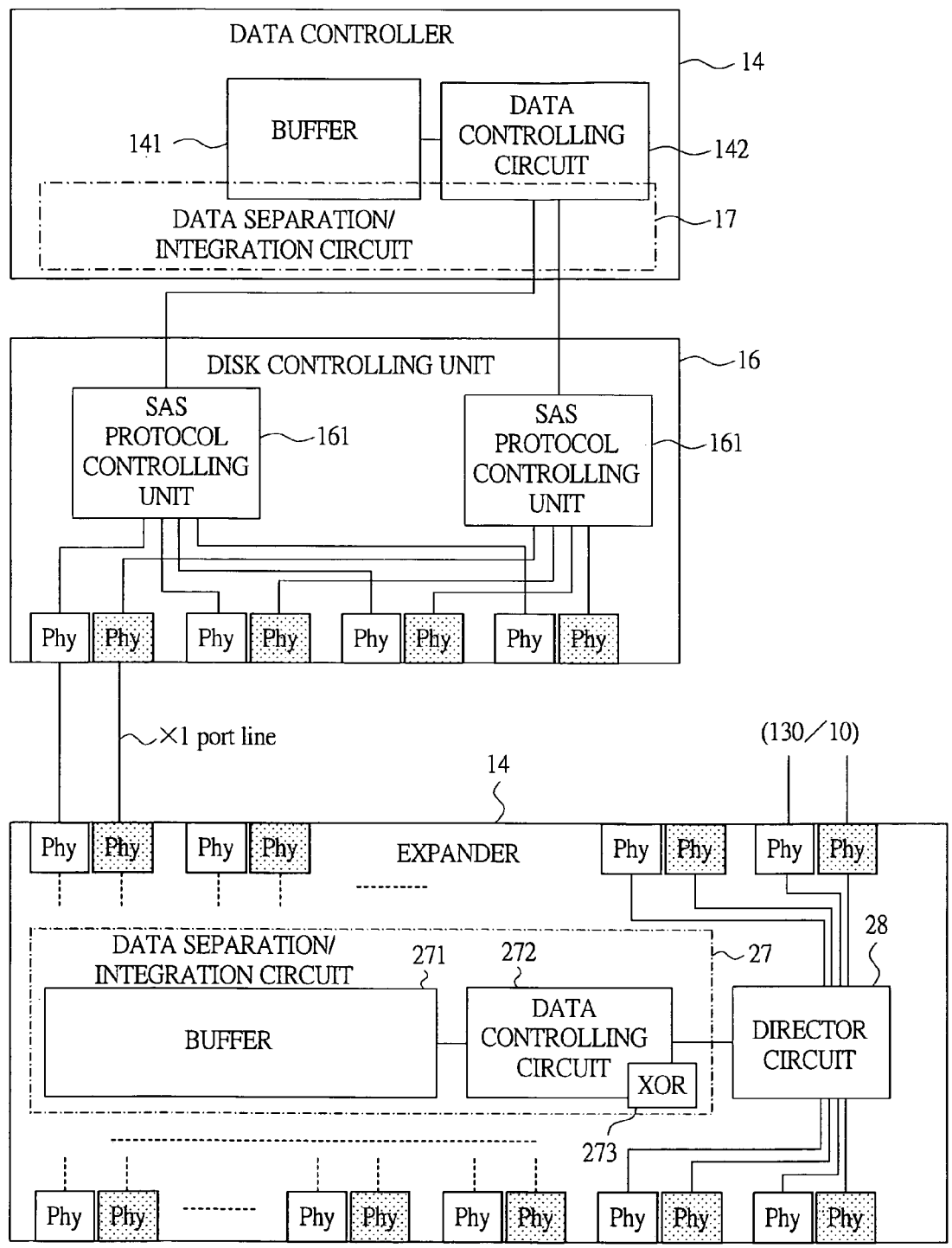
FIG. 4 is a more detailed functional block diagram of the connection between a controller and an expander in the disk array apparatus of the embodiment.

FIG. 4 is a more detailed functional block diagram of the connection between the controller 10 and the expander 20 in the disk array apparatus 100. Particularly, the configurations of the data controller 14, the disk controlling unit 16, and the expander 20 is shown.

The data controller 14 in the controller 10 has a buffer 141 and a data controlling circuit 142. The data separation/integration circuit 17 is configured by the functions of the buffer 141 and the data controlling circuit 142. The data controlling circuit 142 performs data processing such as data separation/integration while buffering the data in the buffer 141.

The disk controlling unit 16 in the controller 10 has SAS protocol controlling units 161 corresponding to the two paths of port groups A and B, and a plurality of physical ports. The SAS protocol controlling units 161 are connected to the data controlling circuit 142 and the port groups by bus, and performs processes in accordance with the SAS protocol.

The expander 20 has a data separation/integration circuit 27, a director circuit 28, and a plurality of physical ports. The data separation/integration circuit 27 has a buffer 271 and a data controlling circuit 272 including an XOR circuit 273. The physical ports provided at the expander 20 are connected via the director circuit 28 by bus. The expander is connected to another controller (redundant controller) 10 or another expander 20 of another additional chassis 130 via the physical ports of the expander 20.

The director circuit 28 switches the paths among the physical ports in the expander 20. In a case of a normal access wherein a particular operation such as multiplex transfer is not performed, there selected a path which directly connects the physical port at one side to the physical port at the other side via the director circuit 28, not via the data separation/integration circuit 27. In a case of an access in which a particular operation such as multiplex transfer is performed, there selected a path which connects the physical port at one side to the data separation/integration circuit 27, via the director circuit 28, where data processing is performed, and connected to the physical port at the other side.

The data separation/integration circuit 27 performs processes corresponding to the controller 10-side for the particular operations. The data controlling circuit 272 performs data processing such as data separation/integration while buffering the data to the buffer 271. When, for example, a process employing parity is performed, the data controlling circuit 272 performs the process by utilizing the XOR circuit 273.

<Particular Processes>

Figure 5:
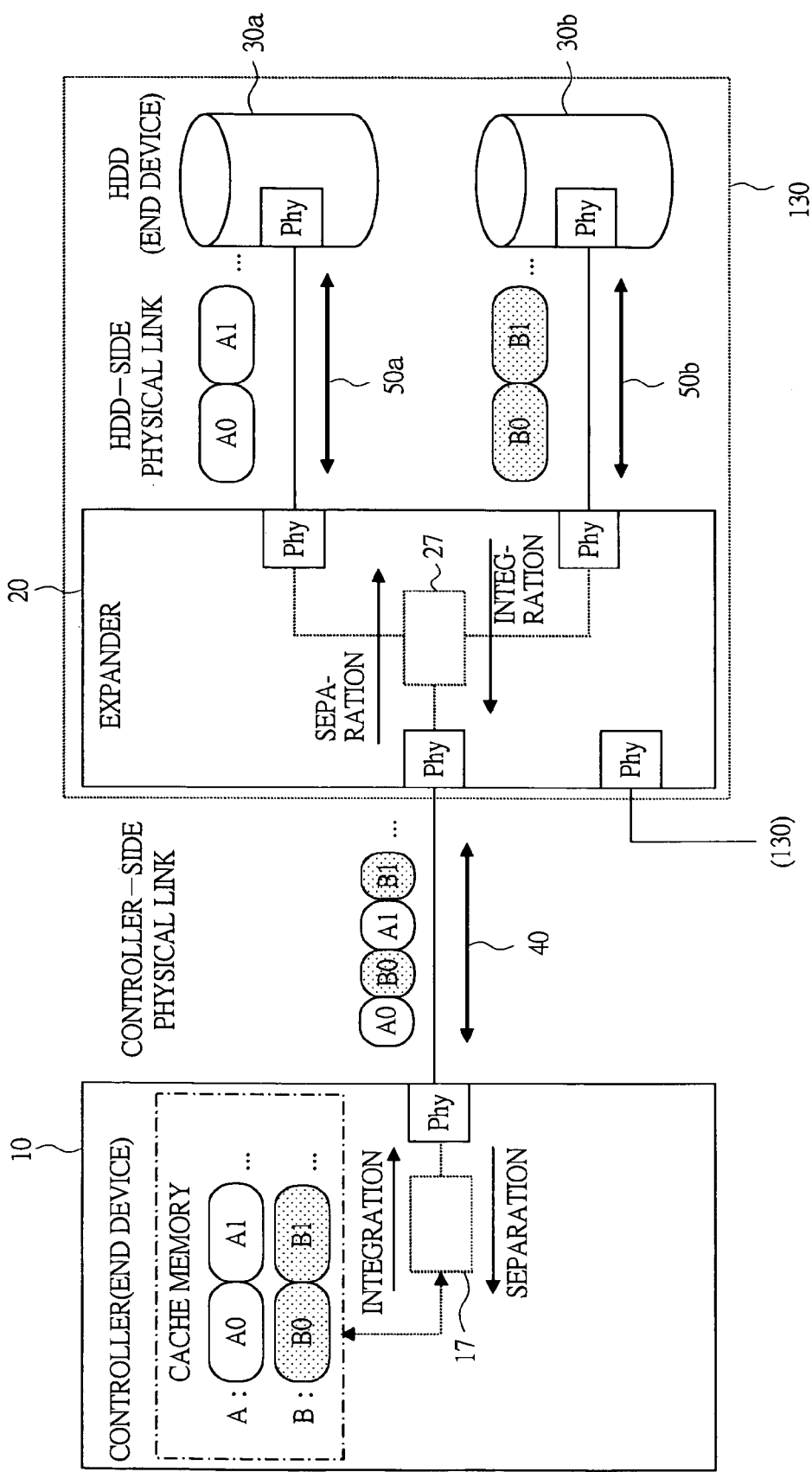
FIG. 5 is an explanatory diagram illustrating the general outline of a typical process of particular processes performed in a disk array apparatus in the embodiments of the present invention.

FIG. 5 is an explanatory diagram illustrating the general outline of a typical process of particular processes (multiplex transfer) performed in a disk array apparatus in the embodiments of the present invention. The typical process illustrated in the diagram corresponds to the process of the second embodiment which is specifically described later. In the diagram, particularly, a case of duplex transfer is illustrated, however further multiplexing is performed in the same manner.

The expander 20 exists in the connection between the controller 10 and the HDDs 30 serving as the end devices, and in the data paths thereof; and the particular operations are executed through the processes at the expander 20. In the data paths between the controller 10 and the HDDs 30, a physical link 40 between the controller 10 and the expander 20, and physical links 50 (50a and 50b) between the expander 20 and the HDDs 30 are provided. In the present configuration, SAS-HDDs are employed as the HDDs 30 having a slow-speed physical link rate (1.5 Gbps) compare with the physical link rate (3.0 Gbps) of the controller 10-side.

A multiplex transfer is performed as a particular operation by data separation/integration processes at the controller 10 and the expander 20. In the multiplex transfer, the data to be transferred via the plurality of HDD-side physical links 50 are employed as the object, and multiplexed and transferred via the controller-side physical link 40. Particularly in a duplex transfer, the data to be transferred via the HDD-side physical links 50 corresponding to the two HDDs 30 are duplex and transferred via the controller-side physical link 40.

In the diagram, two HDDs 30, a SAS-HDD #A (30a) and a SAS-HDD #B (30b), are provided as an example of a set (group) of HDDs 30 which are employed as the multiplex objects. Data A {A0, A1, . . . } to be inputted to or output from the HDD 30a are transferred via the physical link 50a between the expander 20 and the HDD 30a, for example, by a read operation from the HDD 30. In the same manner, data B {B0, B1, . . . } to be inputted to or outputted from the HDD 30b are transferred via the physical link 50b between the expander 20 and the HDD 30b. Herein, A0, B0 or the like are the data per one-word (dword) units.

The controller 10 multiplexes and transfers the data to be transferred in parallel to the two HDDs 30a and 30b in a predetermined data size such as that in a word (dword) unit via the fast-speed side physical link 40. In the multiplex data, the data (A and B) in a plurality of paths are arranged alternately per word units. For example, multiplex data {A0, B0, A1, B1, . . . } are transferred via the physical link 40.

When write operation to the HDDs 30 is performed, the controller 10 integrates the two paths of data A and B which are to be transferred to the two HDDs 30 by the data separation/integration circuit 17, and transfers the data as duplex data via the physical link 40. The expander 20 separates the duplex data received from the controller 10-side via the physical link 40, by the data separation/integration circuit 27, and transfers the data in parallel via the slow-speed side two physical links 50.

Similarly, in the direction from the HDDs 30 to the controller 10, the expander 20 integrates the two paths of data A and B received from the HDD 30-side via the slow-speed side two physical links 50, by the data separation/integration circuit 27, and transfers it as duplex data via the fast-speed side physical link 40. The controller 10 separates the duplex data received from the expander 20-side via the fast-speed side physical link 40, by the data separation/integration circuit 17, and obtains the data as two paths of data A and B from the two HDDs 30.

In the present processing example, one-word unit of data are drawn from the head of the data A and B which are transferred at approximately the same timing via the slow-speed side two physical links 50a and 50b, and two units thereof are integrated and alternately arranged. As a result, the duplex data assumes a data sequence such as {A0, B0, A1, B1, . . . }. In the multiplex transfer, the timing for transferring data in parallel from a plurality of HDDs 30 does not have to be the completely same timing.

The rate of the fast-speed side physical link 40 is double rate of the slow-speed side. Therefore, the data transfer process via the two physical links 50a and 50b is balanced with that of the physical link 40 by the duplex transfer via the physical link 40. ALIGN insertion is not performed for controlling the rate of physical links, accordingly, the data transfer efficiency and the bus efficiency in the connection between the controller 10 and the HDDs 30 and in the data paths are improved.

<Command>

An example of a command employed for data communication or control-information communication between the controller 10 and the expander 20 will be explained. When a particular operation such as multiplex transfer is performed, the controller 10 transmits a command (hereinafter, referred to as a particular command) according to SAS to the expander 20, and the expander 20 interprets the accepted command and executes corresponding particular operations. In the embodiments, when a particular operation is performed, an expander address is employed for the access to the HDDs 30. The expander address is the information which uniquely identifies the expander 20 in the system. When the particular operation is performed, the controller 10 transmits a particular command to the objective expander 20 by employing the expander address as the destination address. An SSP (Serial SCSI Protocol) command according to SAS is utilized as the particular command. When the expander 20 accepts the particular command from the controller 10, the expander 20 executes the particular operation when the address is addressed to the expander 20. When the accepted command is addressed to another expander 20, the expander 20 transfers the command to this another expander 20 via a physical link. The controller 10 directly performs a normal access to the expander 20 and the HDDs 30 in accordance with the SAS protocol without employing the expander address.

The expander 20 basically does not perform command conversion nor a command processing such as that executed by the controller 10, and performs the following conversion operations. First, the expander 20 performs command replication and SAS address conversion. The command replication is a process for transmitting commands to HDDs 30 serving as a plurality of transfer destinations (targets), and commands to be transmitted to the HDDs 30-side are created by replicating the particular command received from the controller 10-side. The SAS address conversion is a process for converting the expander address in the accepted command to SAS addresses (HDD addresses) of HDDs 30 which are transfer destinations, while referencing an address table included in the expander 20.

Secondly, the expander 20 performs data manipulations (replication/separation/integration/XOR) relating to the multiplex transfer, and conversion of the data lengths. The data manipulations are, for example, replication of transfer data for transferring data to the plurality of HDDs 30, separation of multiplex data, integration of multiple pieces data, and an XOR operation process for a parity process.

Thirdly, the expander 20 performs monitoring of the execution time and management of error code data. The monitoring of the execution time manages such that the required process is completed within the processing time limit set for each command. The management of error code data is a process of, for example, generating an error code corresponding to, e.g., an error which occurs in data read from the HDDs 30, saving the code in a memory, and reporting to the controller 10-side.

<Whole Processing Procedure>

The whole processing procedure in the disk array apparatus 100 will be explained. Processes are performed basically in accordance with the following procedures (1) to (4). The disk array apparatus 100 can selectively execute a normal access or a particular operation based on the decision or the setting of the controller 10.

Procedure (1): Upon start-up of the disk array apparatus 100, the expander 20 performs rate negotiations (negotiations) with each of the connected HDDs 30 and the controller 10. As a result of the rate negotiations, the data-transfer speeds (physical link rates) of the respective physical links (40 and 50) are assured. For example, the physical link 40 is determined to have a rate of 3.0 Gbps, and the physical links 50 are determined to have a rate of 1.5 Gbps. It must be noted that the rate negotiations are the processes different from rate matching for controlling rates among the physical links. By the process including the rate negotiations, an address table for interconnection among the members is created in the expander 20. The connection configurations between the physical ports provided at the expander 20 and the controller 10, the HDDs 30, and another expander 20 are mapped in the address table. The address table is updated in accordance with changes in the connection configurations.

Procedure (2): The controller 10 examines the speed information of each of the HDDs 30 by normal accesses. According to the examination, actual data-transfer speed in each of the physical links is recognized.

Procedure (3): The controller 10 calculates the ratio of the rates of the controller 10-side and the HDDs 30-side, and according to the calculated ratio, determines the attribute of the process such as the type of the particular operation to be executed, the formation degree of a set (group) of the HDDs 30 which are employed as the object of a multiplex transfer, and the degree of multiplex. The controller 10 determines to perform a multiplexing up to the ratio of the rates calculated as described above. For example, when the combination of the physical link rates in the connection between the controller 10 and two HDDs 30 is 3.0 Gbps and 1.5 Gbps, the controller determines to perform duplex transfer while employing the two HDDs 30 as the objects, since the rate of one side is two times that of the other one. Alternatively, for example, when the rates of the controller 10-side and the HDDs 30-side are at the same speed, the controller determines to perform a normal access to the HDDs 30. The object of the multiplex transfer may be in HDD units or in data units.

Procedure (4): The controller 10 gives instructions of a particular operation such as multiplex transfer to be executed, to the expander 20 by a particular command. The particular command is issued by, for example, processing the SAS-address specifying area in an existing SSP frame header shown in FIG. 6. The instructions of the particular operation are written in the SAS address specifying area. The expander 20 interprets the particular command and realizes various types of operations. In the command transmission between the expander 20 and the HDDs 30, normal SAS addresses (hashed) which have been converted by the address table included in the expander are employed.

FIG. 6 shows an SSP frame of SAS and a SAS address format. The SAS address specifying area (9 bytes) in the byte fields 1 to 9 in the SSP frame header (24 bytes) has a destination SAS address area (Hashed Destination SAS address Fields), a source SAS address area (Hashed Source SAS address Fields), and reserve areas (Reserved Fields). The SAS address format has 8 bytes of a SAS address, however, the SSP frame has data (24-bit hash) shortened by a hash process.

The particular command can be issued, for example, by setting values in the reserved areas and employing a private SAS address which is unique and valid only in the present system, in the SAS address specifying area. For example, some of the SAS addresses (for example, 24-bit hash "000000 h") that are not practically used in a normal access, can be employed as a particular command based on the SAS standard. SAS addresses and hash processes are described in, for example, section 4.2.2 of the above described Non-Patent Document.

FIG. 7 is a format example of the particular command which is employed in the embodiments. In this case, the SAS address specifying area in the above described SSP command frame has been processed to be a particular command area. For example, the attribute of the process of the particular operation and the physical ports are specified by use of the reserved areas in the SAS address specifying area. The particular operation and the related processes include multiplex transfer, double writing, parity process, information reporting, data compression/decompression, and the combinations thereof, those described in the embodiments. Any of these processes can be specified by the particular command.

The above described destination SAS address areas are in the byte fields 1 to 3 in the particular command, and the areas are used for specifying the expander address. The source SAS address areas are in the byte fields 5 to 7. The 2-bit flag area in the byte field 4 is used for specifying the mode or pattern of the particular operation. The 6-bit command area in the byte field 4 is used for specifying the operation such as read/write. The physical port specifying areas in the byte fields 8 to 9 are used for specifying physical ports serving as the employed object in the physical links 50 between the expander 20 and the HDDs 30. For example, four physical port information (physical port No. 1 to No. 4) can be specified by use of 4×4 bits in the format. The physical port information is specified by, for example, physical port numbers or physical port areas.

The controller 10 specifies various types of particular operations by use of the flag area and the command area. In relation to the use of the flag area, a flag example is shown in the right side of the diagram. For example, when the flag value is "00", a duplex transfer process is specified. In the same manner, mode or pattern of the process is specified, for example, "01" specifies 4× transfer process, "10" specifies double writing process, and "11" specifies both of duplex transfer and double-writing process. For example, several combinations of particular operations are set as patterns and used.

In relation to the use of the command area, for example, the value thereof can specify a process such as internal data copy (second embodiment), automatic parity generation upon write (fifth embodiment), automatic data recovery by parity upon read (fifth embodiment), data recovery by parity toward a spare HDD (spare disk) (fifth embodiment), automatic data recovery by a mirror HDD upon read (sixth embodiment, and seventh embodiment), data recovery by the mirror HDD to the spare HDD (sixth embodiment and seventh embodiment), and inquiry of the usable physical port combination (ninth embodiment).

<A Case in which ALIGN Primitive is Inserted>

FIG. 8 is an explanatory diagram representing, for comparison with the embodiments of the present invention, a process model of a preceding technology of the present invention, wherein ALIGN primitive is inserted in accordance with the SAS standard in a configuration of a disk array to which SAS is simply applied. The diagram shows the flow of a process and data (command and objective data to be stored) between a controller, an expander, and HDDs. Particularly, the diagram shows a case in which data-write is performed on the HDDs {drive A and drive B} in the disk array apparatus corresponding to a write instruction from a data processing device serving as a host.

In the preceding technology, SAS is applied to the disk array apparatus as the interface for data transfer between the controller and HDDs, the expander is connected via physical links, and data transfer for, e.g., read/write of data is performed in accordance with the SAS standard in the connections between the controller, the expander, and the HDDs, and in the data paths thereof. In a conceivable case, a plurality of HDDs corresponding to SAS (SAS-HDD) is connected to the expander in a physical link rate slower than the physical link rate between the controller and the expander. The configuration shown in the diagram is an example of a case in which the physical link rate between the controller and the expander is 3.0 Gbps, and the physical link rate between the expander and the HDDs is 1.5 Gbps, wherein the rate of the one side is two times rate of the other side.

In the configuration to which SAS is simply applied as described above, when the HDD-side physical link rate is slower than that of the controller-side physical link, ALIGN primitive is inserted in the SAS upon data transfer in the connection between the controller and the HDDs. In a normal access, ALIGN primitive is inserted to transfer data in the controller-side physical link of the fast-speed-side by, for example, rate matching between the physical links in accordance with the SAS standard.

In FIG. 8, the controller temporarily retains the data given from a host or HDDs, in a cache memory. For example, the diagram shows a state in which write data {data A (data for drive A)} and data B (data for drive B)} for the two HDDs {drive A and drive B} accepted from the host is temporarily retained in the cache memory without modification.

The controller issues a command for every one of the HDDs which is employed as the target. The controller sequentially issues a write command and data A to the drive A, and a write command and data B to the drive B. Herein, when the controller-side physical link rate is different from the target-HDD-side physical link rate, the controller inserts ALIGN primitive to every one-word transfer data (for example, the above described write command and the write data), and transfers the data via the controller-side physical link. The word (dword) is a data processing unit in SAS. As a result of the ALIGN primitive insertion, the rate (connection rate) in the connection between the controller and the HDDs is adjusted. That is, the connection rate is obtained by adjusting the rate of the controller-side physical link of the fast-speed-side to the rate of the HDD-side physical link of the slow-speed-side. For example, the rate of one side is two times rate of the other side in the present configuration, accordingly, ALIGN corresponding to one word is inserted to one word of transfer data. The controller transmits the write command and the write data to the expander-side physical port. Hereinafter, the transfer-processing time corresponding to data of one-word unit is referred to as t. In the controller-side physical link, the data corresponding to two words including the ALIGN primitive are transferred in a transfer-processing time of 2 t.

The expander performs relay and delivery of the command and the data, from the controller to the HDDs. The expander sequentially receives the transfer data via the controller-side physical link, performs address conversion by a SAS address table included in the expander, and transmits the transfer data (write command and write data) to each of the target HDDs {drive A and drive B} via physical ports corresponding to them. Herein, the expander transfers the data from which the ALIGN primitive is removed, via the slow-speed-side physical links. In the data transfer, processing time of 2 t is required for the data of one-word unit. The expander sequentially transfers the write command and the data A to the drive A, and sequentially transfers the write command and the data B to the drive B. Each of the HDDs stores the write data in the disk based on the received write command.

When the host reads data from the HDDs, the flow of the process of the above described write process is reversed. That is, the expander inserts ALIGN primitive to the data read from the HDDs and transfers the data to the controller-side. The controller removes the ALIGN primitive from the data transferred from the expander and provide the data to the host.

As described above, when ALIGN insertion is performed in the connection between the controller and the HDDs, accordingly the data transfer efficiency is lowered at the controller-side physical link. For example, in the present configuration, the rate of the controller-side physical link is adjusted to that of the HDD-side and lowered from 3.0 Gbps to 1.5 Gbps.

<Multiplex Transfer>

FIG. 9 is an explanatory diagram representing a model of a particular process (multiplex transfer) in the disk array apparatus of the first embodiment. The diagram shows the flow of the process and the data (command and the objective data to be stored) between the controller 10, the expander 20, and the HDDs 30. The rate of the controller-side physical link 40 is 3.0 Gbps, and the rate of the HDD-side physical links 50 is 1.5 Gbps, that is, the rate of one side is two times rate of the other side. The diagram shows a case in which data-write is performed on, particularly, two HDDs 30 {drive A and drive B} in the disk array apparatus, corresponding to a write instruction given from the data processing device 300 which serves as a host.

In the first embodiment, as a particular operation, the transfer data for the plurality (particularly, two) of HDDs 30 are employed as the object and multiplexed and transferred via the controller-side physical link 40 without inserting the above described ALIGN primitive, and the data is distributed via the plurality of HDD-side physical links 50, that is, a parallel data transfer is performed. Particularly, the HDDs 30 which are connected to the expander 20 and have the same physical link rate between them, are employed as the object of the multiplex transfer. In the multiplex transfer of the first embodiment, data in a single or a plurality of system(s) are simply transferred sequentially via the controller-side physical link 40. In relation to the particular operation, the controller 10 does not perform special data manipulations, and the expander 20 performs, as a data manipulation, a data separation/integration process for distributing the data to the plurality (two) of HDDs 30. Particularly, the expander 20 separates and distributes the data in stripe units, to the plurality (two) of HDDs 30. The diagram particularly shows a case in which the two HDDs 30 are coupled and duplex transfer is performed by employing the couple as the object, and this case corresponds to a RAID system wherein data are subjected to striping (division), and the data are stored in the couple of HDDs 30.

In FIG. 9, when the host requests write, the controller 10 (particularly, the channel controlling unit 13 and the data controller 14) temporarily retains the write data {data A and data B} given from the host, in the cache memory 15 without modification. For example, the data A and the data B are the striping data for each of the HDDs 30.

In relation to the write data (A and B) for the two HDDs 30 which are employed as the objects of the duplex transfer, the controller 10 (particularly, the data controller 14) does not issue write commands to each of the HDDs 30, but issues a write command as a particular command instructing duplex transfer, to the expander 20. The particular command serves as a replication source for creating write commands issued to each of the target HDDs 30. The controller 10 issues the particular command by specifying the expander address as the destination thereof. The controller 10 sequentially transfers the particular command, and the data A and B to the expander 20 via the physical port of the physical link 40. For example, when the data A consists of n word(s), the transfer-processing time thereof is nt. Meanwhile, although the command consists of a plurality of words, it is shown in one-word size abbreviation in the diagram for simplification.

Based on the particular command given from the controller 10-side, the expander 20 performs the particular operation in the connection between the controller 10 and the HDDs 30. The expander 20 sequentially receives the particular command and the data A and B from the controller 10-side. Herein, the expander 20 performs buffering of the particular command and the data A and B with the buffer. Through the process in the data separation/integration circuit 27, the expander 20 replicates the particular command, performs conversion of the addresses such as the destinations by use of the address table which is included in the expander 20, and transmits the write command and write data to each of the target HDDs 30. The expander 20 replicates the particular command, and changes the destination address thereof into the SAS addresses of the target HDDs by the above described address conversion, as a result, the write commands corresponding to the HDDs 30 are created. The expander 20 transfers the write commands and the write data to the HDDs 30 via the two HDD-side physical links 50. In the HDD-side physical links 50, the transfer-processing time of 2 t is required for one-word unit of data. Each of the HDDs 30 stores the write data in the disk based on the write command received via the HDD-side physical links 50.

When the host reads data from the HDDs 30, the flow of the process upon the above described write is reversed. That is, the expander 20 reads the data, in parallel and in stripe unit, from the two HDDs 30 which are the objects of duplex transfer, integrates the read data through a process in the data separation/integration circuit 27, and transfers the data as multiplex data via the controller-side physical link 40. The controller 10 separates the transfer data given from the expander 20, by the data separation/integration circuit 17, and provides the data to the host.

As shown in the diagram, in the above described particular operation, when the expander 20 transmits the commands and the data to each of the HDDs 30, the expander can execute transferring the command to drive B at the same time as transferring command to the drive A, by virtue of the above described particular command replication. However, in the expander 20, the data B does not reach thereto from the controller 10-side until the time (nt) passes and the transfer of the data A to the drive A is completed. Therefore, the execution of the data transfer process to the drive B is kept waiting.

In the present configuration, since the rate of the controller 10-side is faster than that of the HDDs 30-side, a buffer having relatively large capacity for temporarily storing data in the expander 20, is required. However, the time occupying the bus in the controller-side physical link 40 becomes ½ (half) of that of the preceding art in a simple comparison, therefore, the traffic is reduced and the processing efficiency is improved. This happens not only upon write but also upon read. The traffic can be reduced in a case where the controller 10 executes the data verifying or a read-and-throw-away operation with the disks, at the same time as the corresponding operation which is performed in accordance with the requests by a command of the host. Therefore, the execution performance of the host requests can be significantly improved compare with the preceding art. The above described read-and-throw-away operation is an operation in which the controller 10 reads and checks data from the HDDs 30, and does not deliver the data to the host.

Second Embodiment

Next, FIGS. 10A and 10B are explanatory diagrams representing a model of a particular process in a disk array apparatus of a second embodiment. FIG. 10A shows the flow of the process and the data between the controller 10, the expander 20, and the HDDs 30. FIG. 10B shows the relation between input/output data and time in the controller 10 and the HDDs 30. The rate of the controller-side physical link 40 is 3.0 Gbps, and the rate of the HDD-side physical links 50 is 1.5 Gbps, therefore the rate of one side is two times rate of the other side. The diagram shows a case in which data-write is performed on the HDDs 30 {drive A and drive B} in the disk array apparatus, corresponding to a write instruction given from a host.

The second embodiment is a modification of the first embodiment wherein, as a particular operation, there performed multiplex transfer corresponding to the RAID system which employs the plurality (particularly, two) of HDDs 30 in a set. The transfer data are multiplexed and transferred via the controller-side physical link 40. The plurality of HDDs 30 which are connected to the expander 20 and have the same physical link rate between them, are employed as the object of the multiplex transfer, and the expander 20 distributes the data to the plurality of HDD-side physical links 50 in one-word units. In the multiplex transfer of the second embodiment, the data is simply transmitted sequentially via the controller-side physical link 40. In relation to the particular operation, the controller 10 does not perform special data manipulations, and the expander 20 performs, as a data manipulation, data distribution to the plurality (two) of HDDs 30 in word units. The diagram particularly shows a case in which duplex transfer is performed, and a process corresponding to the RAID system wherein the two HDDs 30 at the slow-speed-side are coupled and the data are distributed and stored.

In FIG. 10A, upon write request, the controller 10 temporarily retains, in the cache memory 15, the write data given from the host without modification. The write data are alternately distributed and stored in one-word units in the set of HDDs 30 which serves as the write destination, and the data are not particularly limited as the data belonging to either one of the HDDs 30.

In relation to the write data which are employed as the objects of the multiplexing (doubling), the controller 10 issues a particular command instructing multiplex transfer, to the expander 20. The particular command serves as a replication source for creating write commands which are to be delivered to the plurality of HDDs 30. The controller 10 issues the particular command by specifying the expander address as the destination thereof. The controller 10 specifies, in the physical port areas in the particular command, the physical port number, etc. of those employed as the objects of the multiplex transfer. The controller 10 sequentially transfers the particular command, and the multiplex data to the expander 20 via the physical link 40 of the fast-side. In the diagram, the multiplex data are represented by a data sequence consisting of one-word units {A, B, C, D, E, F, G, H, . . . , X, Y, . . . }.

The expander 20 receives the particular command and the multiplex data sequentially from the controller 10-side, and separates the multiplex data by the data separation/integration circuit 27. The expander 20 replicates the particular command, performs address conversion by use of the address table, and delivers the write command and the write data which have been separated in one-word units, to each of the HDDs 30 which are employed as the targets. The expander 20 distributes the data via the specified physical ports, in accordance with the physical port information included in the particular command. The expander 20 transfers the write commands and the separated write data to the HDDs 30 via the plurality (two) of slow-side physical links 50. For example, the command data and the write data {A, C, . . . } are sequentially transmitted to the drive A, and the command data and the write data {B, D, . . . } are sequentially transmitted to the drive B. Each of the HDDs 30 stores the separated write data in the disk based on the received write command.

When the host reads data from the HDDs 30, the flow of the process upon the above described write is reversed. That is, the expander 20 reads the data, in word units, from the plurality (two) of HDDs 30 which are the objects of multiplex transfer, integrates the read data, and transfers the data as multiplex data to the controller 10-side. The controller 10 separates the transfer data given from the expander 20, and provides the data for the host.

As shown in FIG. 10B, in the relation between the input/output data and time, when the data in word units {A, B, C, D, . . . } are sequentially transmitted from the controller 10-side to the expander 20, the data {A, C, E, G, . . . } are correspondingly stored in the drive A and the data {B, D, F, H, . . . } are correspondingly stored in the drive B both at the substantially same timing except the transfer delay time t.

The second embodiment is different from the first embodiment in that the process waiting time (above described nt) accompanied with the data transfer to the HDDs 30 are not necessary, so that the efficiency is improved. There attained a relation wherein "the data transfer speed of the controller side (3.0 Gbps)=the data transfer speed of the drive A side (1.5 Gbps)+the data transfer speed of the drive B side (1.5 Gbps)", and a buffer for controlling the speed is not required, in principle. Therefore, the configuration can be formed with the minimum components required, which is advantageous. When the rates in the side of the plurality of HDDs 30 which are employed as the objects are different from each other, a buffer or the like for controlling the speed is required to be provided in the expander 20. Not only the read/write data but also commands to the HDDs 30 may be subjected to separation/integration and multiplex transfer in a process of the present second embodiment.

Also, not only the duplex transfer employing the combination of the physical link rate of 3.0 Gbps and 1.5 Gbps, but also, for example, 4× transfer to four HDDs 30 having the HDDs 30-side rate of 1.5 Gbps when the rate of the controller 10-side is 6.0 Gbps, can be performed in the same manner. In this case, four physical ports are specified in the physical port specifying areas in the particular command, as the object of the 4× transfer.

The particular process in the second embodiment can be applied to all RAID types, particularly, can be applied to the RAID levels of {0, 3, 4, 5}. When the process is applied to each of the RAID levels, the respective load on the controller is {medium, small, medium, medium}. The load is particularly small in RAID 3. When duplex transfer is performed in the second embodiment with a slow rate (1.5 Gbps) of the HDDs 30-side, the performance ratio in comparison with the preceding art (configuration in which ALIGN is inserted) is 1.0 (the same performance) when simply compared with a case having fast HDDs (3.0 Gbps), and 2.0 (two times of performance) when simply compared with a case having the same speed of HDDs (1.5 Gbps). Similarly, when 4× transfer is performed in the second embodiment with a slow rate of the HDDs 30-side, the performance ratio against the preceding art is 1.0 when compared with the case having fast HDDs, and 4.0 when compared with the case having the same speed of HDDs.

Next, FIGS. 11A and 11B are explanatory diagrams representing a setting in a case in which the particular operation of the second embodiment is applied in an actual RAID system. FIG. 11A shows a RAID group which corresponds to the particular operations of the second embodiment. FIG. 11B shows a setting screen and a setting example of the RAID groups.

As shown in the upper side of FIG. 11A, in the disk array apparatus, first, a plurality, for example two, of the physical HDDs 30 are simply combined, and a virtual HDD having a multiplied (doubled) capacity and data-transfer speed is created (provided) by the physical HDD set (group). The number of HDDs in the physical HDD set which forms the virtual HDD is determined by the system configuration such as physical link rate ratio between the controller 10-side and the HDD 30-side. In accordance with needs, a plurality of virtual HDDs is created. Then, as shown in the low-speed side, a RAID group is formed over at least one created virtual HDD(s). For example, one RAID group is set over a plurality of virtual HDDs {#0 to #n}. The setting method employing the virtual HDD can be applied to all the RAID levels. The processing form employing the setting method described above is simple, therefore a circuit-addition is required only in the expander 20-side, and therefore a small-scale circuit can be realized. Meanwhile, no particular data manipulation is required at the controller 10-side, and merely the management of the data position and the objective HDDs 30 are required to be performed by means of software.

In FIG. 11B, a user of the disk array apparatus performs setting of the RAID group, etc. by performing input operation on software which is provided in the data processing device 300 or a maintenance device or the like that are connected to the disk array apparatus. The upper side shows an example in which physical HDD sets are formed by the plurality of physical HDDs 30 which are connected to the expander 20. The low-speed-side shows an example in which virtual HDDs are formed corresponding to the configuration of physical HDD sets. The setting procedure of the RAID group, etc. is as the following. First, from the plurality of usable HDDs 30, the user selects a plurality of arbitrary HDDs 30 in accordance with, for example, the physical link rate ratio, and assigns them to virtual HDDs. For example, a set of physical HDDs #0 and #1 forms one virtual HDD #0. Similarly, the procedure for forming a virtual HDD is repeated in accordance with needs to form a plurality of virtual HDDs. For example, arbitrary HDDs are employed from the physical HDDs #0 to #11 and similarly aligned to the virtual HDDs, and six virtual HDDs #0 to #5 are formed in total. Next, already formed virtual HDDs are arbitrary grouped and a RAID group is set over them.

Alternatively, arbitrary HDD among the already formed virtual HDDs is aligned to a spare (spare HDD). For example, five virtual HDDs #0 to #4 are employed and a RAID group is formed over them, and one virtual HDD #5 is aligned to a spare HDD. Next, the RAID group set by the above procedure is aligned to, for example, a logical unit (LU) or logical volume. For example, the RAID group over the virtual HDDs #0 to #4 is aligned to a logical unit with the RAID level set to RAID 5 and LU number set to LU0.

The disk array apparatus executes the particular operation of the second embodiment by employing the RAID group created by the above described setting as the object. The process example of multiplex transfer to the drive A and B shown in FIG. 10, corresponds to a process with one virtual HDD. For example, when the controller 10-side physical link rate is 6.0 Gbps, four HDDs having the HDDs 30-side physical link rate of 1.5 Gbps are grouped and a virtual HDD is formed. For example in a case in which the number of the HDDs for forming the RAID group is odd, the last one HDD 30 which cannot form a physical HDD set for serving as the virtual HDD is subjected to, for example, a processing mode in which the process is performed in a conventional method or alternatively, mixing with dummy data is performed so as to form a virtual HDD. In this case, the effect is lower than the above described performance improving effects.

FIG. 12 is an explanatory diagram representing a process of a case in which the particular operation of the second embodiment is applied to a data copy operation performed in the disk array apparatus. The particular operation of the second embodiment can be employed in a data copy operation (hereinafter, referred to as internal data copy) performed for data backup or the like in the disk array apparatus without mediation of the host.

When internal data copy is executed, the controller 10 reads multiple units of data (for example A to D) which are the copy source data, from the HDD group (for example, HDD group A) having the copy source data, via the expander 20 by employing the multiplex transfer. Then, the controller 10 writes the read multiple units of data (A to D) to the HDD group (for example, HDD group B) for storing the copy destination data, via the expander 20 by employing the multiplex transfer. The copy data is subjected to the multiplex transfer via the controller-side physical link 40, and distributed via the plurality of HDD-side physical links 50. Accordingly, speed-up is realized in each of the read/write operations and also in the internal data copy.

The process employing the particular process of the second embodiment in the internal data copy can be applied in the RAID level of {0, 1, 3, 4, 5, 0+1, 3+1, 4+1, 5+1}. When the particular process is applied to each of the RAID levels, the load on the controller 10 is small. When the rate of the HDDs 30-side is slow and internal data copy is performed by employing the duplex transfer in the second embodiment, the performance ratio against the preceding art is 1.0 when compared with a case having fast HDDs, and 2.0 when compared with a case having the same speed of HDDs.

Third Embodiment

Next, FIGS. 13A and 13B are the explanatory diagrams representing a model of a particular process in a disk array apparatus of a third embodiment. FIG. 13A shows the flow of the process and the data between the controller 10, the expander 20, and the HDDs 30. FIG. 13B shows the relation between input/output data and time in the controller 10 and the HDDs 30. The rate of the controller-side physical link 40 is 3.0 Gbps, and the rate of the HDD-side physical links 50 is 1.5 Gbps, therefore the rate of one side is two times rate of the other side. The diagram shows a case in which data-write is performed on the HDDs 30 {drive A and drive B} in the disk array apparatus, corresponding to a write instruction given from the host.

The third embodiment is based on the second embodiment, and, as a particular operation, a plurality paths of data are subjected to aligning, rearrangement, or the like in advance in the controller 10-side. Accordingly, formation and control of RAID is performed per sets of physical HDDs 30. The multiplex transfer is performed with a set of arbitrary HDDs 30 in the same RAID group. The transfer data is multiplexed and transferred via the controller-side physical link 40. In the multiplex transfer of the third embodiment, aligned data are transmitted via the controller-side physical link 40. The expander 20 performs distribution via the plurality of HDD-side physical links 50 in one-word units. In relation to the particular operation, the controller 10 performs, as a data operation, data aligning corresponding to the RAID configuration, and the expander 20 performs, as a data operation, data distribution to the plurality (two) of HDDs 30 per word units. The diagram particularly shows a case in which duplex transfer is performed.

In FIG. 13A, upon a write request, the controller 10 temporarily retains the write data {data A and data B} which have been given from the host, in the cache memory 15 without modification. The destination of write of the data A is the drive A, and the destination of write of the data B is the drive B. The data sequences of the data A and B in word units are respectively, {A0, A1, . . . , An} and {B0, B1, . . . , Bn}.

In respect to the plural (two) units of write data (A and B) which are employed as the objects of the multiplex (2×) transfer, the controller 10 sorts the data A and B, by the data separation/integration circuit 17, based on word unit in accordance with the configuration of the RAID group of the objective HDDs 30. The aligned data have a sequence of {A0, B0, A1, B1, . . . , An, Bn}. In the same manner as the embodiments described above, the controller 10 issues a particular command to the expander 20 for instructing multiplex transfer. The controller 10 sequentially transfers the particular command and the multiplex data to the expander 20 via the fast-side physical link 40. The multiplex data are the aligned data having a sequence of {A0, B0, A1, B1, . . . , An, Bn, . . . }.

The expander 20 receives the particular command and the multiplex data sequentially from the controller 10-side, and separates the multiplex data by the data separation/integration circuit 27. The expander 20 replicates the particular command, performs address conversion by use of the address table, and transmits the write command and the write data which have been separated into one-word units to each of the target HDDs 30. The expander 20 transfers the write commands and the separated write data to the HDDs 30 via the plurality (two) of slow-side physical links 50. Upon the distribution at the expander 20, since the transfer data have already been aligned in the controller 10-side, the data can be sequentially transferred via the specified physical ports without modification. The data A is transferred to the drive A, and the data B is transferred to the drive B. Each of the HDDs 30 stores the separated write data in the disk based on the received write command.

When the host reads data from the HDDs 30, the flow of the process described above for write is reversed. That is, the expander 20 reads, the data in word units from the two HDDs 30 corresponding to the RAID group which is the object of multiplex transfer, and integrates and transfers the data to the controller 10-side. The controller 10 sorts the data transferred from the expander 20 and provides the data to the host.

As shown in FIG. 13B, in the relation between the input/output data and time, for example, when the aligned data {A0, B0, A1, B1, . . . } are sequentially transmitted from the controller 10-side, the data {A0, A1, . . . } are correspondingly stored in the drive A at the same timing as the transmission if the transfer delay time can be ignored. At the timing delayed only by time t from the transmission process to the drive A, the data {B0, B1, . . . } can be correspondingly stored in the drive B.

In the third embodiment, the RAID configuration can be formed by a unit of one physical HDD 30 without employing the above described virtual HDD, and minute adjustments can be made. As compensation, circuit-addition is required also in the controller 10-side in terms of hardware. The process of the third embodiment can be employed when double writing such as that of RAID 1 is performed, however, more efficient method will be described in a sixth embodiment.

Next, a case in which the particular operation of the third embodiment is applied in an actual RAID system will be described. In this case, at the beginning, the plurality of HDDs 30 is assigned so as to correspond to the RAID group, and the controller 10 executes multiplex transfer with a set formed by arbitrary two HDDs. This process is suitable for methods {RAID 4, 5, and 0} that handle a lot of small-size data.

FIG. 14A represents an example of processing procedure in a case in which the particular operation of the third embodiment is applied to RAID 5. Five HDDs #0 to #4 are provided as the HDDs 30 and are forming a RAID group. The HDD #4 is the position where parity is to be stored. First, a write request for the position of the HDD #0 is generated from the host-side (procedure 1). The controller 10 reads the corresponding data from a set of HDDs #1 and #2 by employing the multiplex transfer (procedure 2), and subsequently, reads the corresponding data alone from the HDD #3 (procedure 3). Next, the controller 10 generates new parity (data P) by XOR operation of each of the data read from the HDDs #1 to #3 and the pre-write data to be written in the HDD #0 (procedure 4). Next, the controller 10 writes the pre-write data and the data P to a set of the HDDs #0 (data write position) and #4 (parity write position) by employing the multiplex transfer. The write of the data and the parity is completed by the above described procedure.

FIG. 14B represents a processing example in a case in which the particular operation of the third embodiment is applied to RAID 0. Five HDDs #0 to #4 are provided as the HDDs 30 and are forming a RAID group. First, a write request across the HDD #0 and #1 is generated from the host-side (procedure 1). The controller 10 reads the corresponding data from a set of HDDs #1 and #2 by employing the multiplex transfer (procedure 2). Next, the controller 10 merges the data read from the HDD #0 and #1 and the data for write for the HDD #0 and #1 (procedure 3). Next, the controller 10 writes the merged data to a set of the HDD #0 and #1 by employing the multiplex transfer (procedure 4). The write of the data is completed by the above described procedure. Meanwhile, when the data size of the write object is smaller than a stripe size, the multiplex transfer is not employed and direct write to each of the HDDs 30 is performed.

FIG. 15 shows a setting screen for RAID groups corresponding to the particular operation of the third embodiment. In the disk array apparatus, RAID groups are created by arbitrarily forming groups by the plurality of usable physical HDDs 30. A necessary number of RAID groups are created. Then, assigning to LU or the like is performed with the set RAID groups. For example, a RAID group is formed by a set of HDDs #0 to #5, the RAID level thereof is set to RAID 5, and the LU number is set to LU0. Meanwhile, another RAID group is formed by a set of HDDs #6 to #11, the RAID level thereof is set to RAID 0, and the LU number is set to LU1.

In the third embodiment, when RAID control is performed based on the above described settings, the multiplex transfer process which is executed in accordance with the RAID control is an automatic process in the disk array apparatus, therefore, operations by the user is same as that in a normal usage.

Fourth Embodiment

Next, FIGS. 16A and 16B are the explanatory diagrams representing a model of a particular process in a disk array apparatus of a fourth embodiment. FIG. 16A shows the flow of the process and the data between the controller 10, the expander 20, and the HDDs 30. FIG. 16B shows the relation between input/output data and time in the controller 10 and the HDDs 30. The xfer rate of the controller-side physical link 40 is 3.0 Gbps, and the rate of the HDD-side physical links 50 is 1.5 Gbps, that is, the rate of one side is two times rate of the other side. The diagram shows a case in which data-write is performed on three HDDs 30 {drive A, drive B, and drive C} in the disk array apparatus, in accordance with a write instruction given from a host.

The fourth embodiment is an application of the second embodiment and modification of the third embodiment, and is same as the third embodiment in that the configuration can be formed per one HDD 30 and minute adjustments can be made. In the fourth embodiment, as a particular operation, multiplex transfer is performed with a set of at least three HDDs 30 in a method specialized for RAID 3, and a parity process such as a parity insertion process is performed in predetermined intervals although data aligning in the controller 10-side is not performed. The transfer data including parity data is multiplexed and transferred via the controller-side physical link 40. In the multiplex transfer of the fourth embodiment, the data with parity is sequentially transmitted via the controller-side physical link 40. The expander 20 distributes the data in one-word units over the three or more HDD-side physical links 50. In relation to the particular operation, the controller 10 performs, as a data operation, a parity process (e.g., generation/insertion of parity upon write, and verify/automatic data recovery by use of parity data and removing parity upon read), and the expander 20 performs, as a data manipulation, distribution of data over the three or more HDDs 30 per word units. The diagram particularly shows a case in which 3× transfer is performed by employing "two HDDs for storing data+one HDD for storing parity" as the objects, and the data and the parity are distributed and stored in a set of three HDDs 30 that are forming the slow-speed-side RAID group.

In FIG. 16A, upon a write request, the controller 10 temporarily retains the write data which has been given from the host, in the cache memory 15 without modification. The write data is distributed and recorded in the set of HDDs 30 which serves as the write destination, and the data is not particularly limited as the data that belonging to any of the HDDs 30.

In relation to the write data which are employed as the multiplex object, the controller 10 performs parity generation/insertion process in accordance with the configuration of the objective RAID group through the process of the data separation/integration circuit 17. For example, the data sequence of the objective write data in word units is {A, B, C, D, . . . }. Corresponding to the RAID 3-control of the three HDDs 30, for example, the controller 10 performs calculation for generating and inserting parity to two words (data A and B) at an interval of one word (P0).

In the same manner as the above described embodiments, the controller 10 issues a particular command to the expander 20 for instructing multiplex transfer. The controller 10 sequentially transfers the particular command and the multiplex data to the expander 20 via the fast-side physical link 40. The multiplex data is the data with parity, and for example, have a sequence of {A, B, P0, C, D, P1, E, F, P2, . . . }.

The expander 20 receives the particular command and the multiplex data sequentially from the controller 10-side, and separates the multiplex data by the data separation/integration circuit 27. The expander 20 receives the particular command and the data with parity, which have been given from the controller 10-side via the physical ports, at the buffer for controlling the speed. The expander 20 replicates the particular command, performs address conversion by use of the address table, and transmits the write command and the write data which have been separated into one-word units, to each of the target HDDs 30. The expander 20 transfers the write command and the separated write data to the HDDs 30 via the three slow-side physical links 50. Upon distribution at the expander 20, corresponding to the distribution, since the transfer data have already been subjected to a parity process in the controller 10-side, the data can be transferred via the specified physical ports without modification. For example, the data (non-parity data) are transferred to the drives A and B which are for storing data, and the parity data are transferred to the drive C which is for storing parity, respectively. Each of the HDDs 30 stores the separated write data in the disk based on the received write command.

When the host reads data from the HDDs 30, the flow of the process upon the above described write is reversed. That is, the expander 20 reads the data in word units from the three or more HDDs 30 that corresponding to the RAID group which is the object of multiplex transfer, and integrates and transfers the data to the controller 10-side. The controller 10 performs, with the data transferred from the expander 20, verify/automatic data recovery, a parity removing process, etc. by use of the parity data, and provides the data to the host.

For example, in an automatic data recovery process employing parity data upon read, when failure data are present in an HDD 30 in the RAID group, the controller 10 recovers the data by performing an XOR operation process by use of the data in another HDD in the RAID group. Meanwhile, for example in an automatic data recovery process which employs parity data and is performed toward a spare HDD, when failure data are present in an HDD 30 in the RAID group, similarly, the controller 10 recovers the data by employing other data in the RAID group, and writes the recovered data to the spare HDD via the expander 20.

As shown in FIG. 16B, in the relation between the input/output data and time, when the above described data {A, B, P0, C, D, P1, . . . } are sequentially transmitted from the controller 10-side to the expander 20, the data {A, C, E, . . . } are correspondingly stored in the drive A at the same timing if the transfer delay time can be ignored. At the timing delayed from the process by the time t, the data {B, D, F, . . . } are correspondingly stored in the drive B. At the timing delayed by the time t in addition to that, the parity data {P0, P1, P2, . . . } are correspondingly stored in the drive C.

In the fourth embodiment, parity generation is performed in the controller 10-side, therefore the degree of freedom in selection of RAID groups, etc. is high. In addition, the circuit design of the expander 20 is comparatively simplified. Besides, although the load on the controller 10 is reduced, the sum of the rates of the side of three or more HDDs 30 becomes larger than the rate of the controller 10-side, therefore the above described buffer for controlling the speed is required to be provided. From the view point of the data transfer efficiency, when it is configured such that the rate of the controller 10-side and the sum of the rates of the HDDs 30-side have the same speed by, for example, multiplying the paths in the controller-side physical link 40, the capacity of the buffer for controlling the speed is reduced, which is desirable. Also, 4× transfer, etc. can be performed in the same manner when "three HDDs for storing data+one HDD for storing parity" are employed as the objects. Also, it may be configured such that an HDD corresponding to fast rate of 3.0 Gbps is mixed as the HDD 30 (drive C) for storing the parity data.

Fifth Embodiment

Next, FIGS. 17A and 17B are explanatory diagrams showing a model of particular process at the disc array device in a fifth embodiment. FIG. 17A shows a process and a flow of a data among a controller 10, an expander 20, and a HDD 30. FIG. 17B shows a relation between input/output data and time in the controller 10 and each HDD 30. A rate of a controller-side physical link 40 is 3.0 Gbps, and a rate of a HDD-side physical link 50 is 1.5 Gbps, and this is the case where a ratio of rate is double. Further, FIG. 17B shows the case where, in response to a write instruction from a host, a write of the data for three HDDs 30 {drives A, B, and C} are performed in the disc array device.

The fifth embodiment is an application of the second embodiment and is a modification of the fourth embodiment, and is such that the parity process at the controller 10 side in the fourth embodiment is performed at the expander 20 side. In the fifth embodiment, as a particular operation, not less than three HDDs 30 forming the same RAID group are made into a set so as to perform a multiplex transfer, and the parity process is performed at the expander 20. Transfer data is multiplexed and transferred by the controller-side physical link 40. The multiplex transfer in the fifth embodiment is simply to send the data in order in the controller-side physical link 40. Distribution is performed for one-word unit by the expander 20 in not less than three HDDs-side physical links 50. With respect to the particular operation, the controller 10 does not perform any special data operation, and the expander 20 performs a parity process (parity generation and insertion and the like upon writing) as the data operation, and performs the distribution of the data to not less than three HDDs 30. The present diagrams show the case where a duplex transfer is performed particularly in the controller-side physical link 40, and the transfer is performed in parallel to three HDDs 30 by a HDD-side physical link 50, and three slow-side HDDs 30 are made into a set so as to distribute the data and the parity to be stored.

In FIG. 17A, at write request time, the controller 10 temporarily holds a write data from a host in its state as it is in a cache memory 15. The write data is distributed and registered in the set of the HDD 30, which is a write destination, and the data of which HDD 30 it should be is not particularly decided. The controller 10, with respect to the write data which is taken as a multiplex object, similarly to the above descried embodiment, issues a particular command for instructing a multiplex transfer to the expander 20. The controller 10 transfers the particular command and the multiplex data in order to the expander 20 by the fast-side physical link 40. With respect to the multiplex data, the data sequence of one-word unit is shown as {A, B, C, D, . . . }.

The expander 20 receives the particular command and the multiplex data in order from the controller 10 in a buffer for controlling the speed, and performs separation of the multiplex data by a data separation/integration circuit 27. The expander 20 duplicates the particular command, and performs an address conversion by an address table, and delivers a write command and the write data separated by one-word unit to each HDD 30 which becomes a target. At this time, with respect to the write data, the expander 20 performs a parity generation and an insertion process corresponding to the formation of a RAID group of the target by the data separation/integration circuit 27. The expander 20, for example, performs a calculation for forming and inserting the parity at the intervals of one word (P (A-B)), for example, for two words (data A and B) corresponding to the control of the RAID 3 for three HDDs 30.

The expander 20 transfers the write command and the separated write data to the HDD 30 by three slow-side physical links 50. For example, the data (non-parity data) is transferred to drives A and B for data storage, and the parity data is transferred to the device C for the parity storage, respectively. Each HDD 30 stores the separated write data in a disc based on a received write command.

At the read time of the data for the HDD from the host, the process flow is reversed with the flow upon writing. That is, the expander 20 reads the data from three HDDs 30 corresponding to the RAID group which is the multiplex object by the word unit and subjects it to the parity process, and integrates and transfers it to the controller 10 side. The controller 10 takes the transfer data from the expander 20 as a data for the host. In the fifth embodiment, the expander 20 mainly performs an automatic data restoration and the like at the read time.

As shown in FIG. 17B, with regard to the relation between input/output and time, when the word unit data {A, B, C, D, . . . } is transmitted from the controller 10 side to the expander 20, the data is stored in the drive A as corresponding data {A, C, E, G, . . . } at the same timing as the transmission except for a transfer delay time. The transferred data is stored in the drive B as corresponding data {B, D, F, . . . } at the delayed timing of this process and time t. Further, the transferred data is stored in the drive C as corresponding parity data {P(A-B), P(C-D), P(E-F), . . . } at the further delayed time t.

In the fifth embodiment, in the case of the number of HDD and a configurational example of the rate shown in FIG. 17, [the rate (3.0 Gbps) of the controller side]=a total sum of the rates of the HDD (1.5 Gbps+1.5 Gbps)]. In case of performing the mulplixing transfer corresponding to a RAID 3, since no particular data operation is performed in the controller 10 side, a load of the controller 10 is small. Further, when combined with the system (the third embodiment) for performing the data operation in the controller 10 side, a RAID 4 can be realized.

Further, by addition of the parity distribution function to a plurality of HDDs 30 in the expander 20 side or by addition of the function to issue the particular command while the designated order of the write object HDD 30 is changed by physical port designation every time the parity disc is changed by the controller 10 side, through the process becomes complicated by that much, a RAID 5 can also be realized. However, the degree of freedom of setting regarding the number of HDD within the RAID group is not much high. With respect to this setting, a mode of selecting and using a setting from several patterns according to the configuration and the like is taken. Although a useable pattern is limited, since optimization is easy, it becomes fast.

With respect to the fifth embodiment, the case of performing the process corresponding to the RAID 4 and the RAID 5 by the combination with the data operation in the controller 10 side will be described. The case where HDD #0 to #3 of a slow rate (1.5 Gbps) are connected by corresponding to four physical ports #0 to #3 carried by the expander 20 will be taken as an example. Assuming that the data A, B, C are available as object data for the HDD 30. The sequence of the word unit of the data A, B, C is taken as {A0, A1, A2, . . . }, {B0, B1, B2, . . . } and {C0, C1, C2, . . . }, respectively.

The controller 10, at the write request time, transmits the particular command including a physical port number which is a transfer destination to the expander 20 connected to the HDD group (HDD #0 to #3) of the target. That is, the controller 10 transmits the write command including an expander address as the destination and the designation of the physical port numbers #0 to #3 of the expander 20 as physical port information to the fast-side physical link 40. The controller 10 sorts and transfers the write data A, B, C for the HDD group of the target similarly to {A0, B0, C0, A1, B1, C1, A2, B2, C2, . . . } to the physical link 40. In this aligning, each data is alternately aligned by a striping unit (word unit).

The expander 20, with respect to the transfer data from the controller 10 side, distributes the data (for example, A0, B0, and C0) to the physical port for each HDD 30 according to the designated order of the physical port in the accepted command. The expander 20 transfers the parity data (for example, P(A0-C0)) formed from the transfer data to the HDD 30 (parity disc) to be connected to the physical port designated finally by the accepted command.

At the time of transferring the data to the HDD 30 by the expander 20, provided that the physical port designated order which is a transfer object for every data (A, B, and C) of each system is not changed, and that the physical port designated order is changed (shifted) for every striping unit of the data of each system by the RAID 4 system, a recording by the RAID 5 system is made possible. As a process example in the case of the RAID 5, at an initial timing, the data (A0, B0, C0 and P(A0-C0)) is distributed and written by corresponding to four HDDs 30 (#0, #1, #2, #3). At the next timing, by designated shift of the physical port, the data (P(A1-C1), A1, B1, and C1) is distributed and written by corresponding to the HDD (#0 to #3). Similarly, in the next timing, the data (C2, P(PA-C2), A2 and B2) is distributed and written.

According to the RAID control of the fifth embodiment, since the data is required to be written in all the HDD 30 forming the RAID group, the process such as making the striping size small and reading a data once and overwriting a new data on it, and after that, writing back it with respect to the portion where the remainder is left in the RAID group is required. Further, in case it is the RAID 3 system, a data sort is not required by the controller 10, which can be easily realized by making the physical repot designated order in the command constant.

Further, in the fifth embodiment, the parity is formed at the expander 20 side, so that [the rate (3.0 Gbps) at the controller side<a sum (1.5 Gbps×3=4.5 Gbps) of the rate at the HDD side]. Hence, even in case the HDD 30 of the same speed (3.0 Gpbs) as the rate of the controller side is used as the HDD 30 (the HDD drives A to C) forming the RAID group, the effect of the upgrade of the performance can be obtained.

With respect to the fifth embodiment, an automatic data recovery using the parity at the read time will be described. FIG. 18 is an explanatory diagram for the automatic data recovery using the parity at the read time and a data recovery to a spare HDD and the like. At the data read time, since the position of the parity disc (region in which the parity data is stored) is defined clearly by a command to the expander 20 from the controller 10, even in a state of a trouble happening to one set of HDD 30 in the RAID group, the data recovered within the expander 20 can be delivered to the controller 10 as a read data. For this data recovery, two types of usage method are available: the recovery of the read request data from the host and the recovery of a copy back data to the HDD 30 such as a spare HDD, a replaced HDD and the like. The copy back is a process in which the data of the HDD 30 in a troubled state due to breakdown and the like as well as the HDD30 as a replaced object is moved to other HDD 30, and after that, the data is returned to the HDD 30 such as the spare HDD, the replaced HDD and the like. The controller 10 executes only the read/write of the data, and therefore, its load is very small.

For example, the sequence of original data (object data to be read) is taken as {A0, B0, C0, A1, B1, C1, A2, B2, C2, ... }. By the process upon writing, the data is distributed and stored similarly to {A0, B0, C0, P0} for the HDD 30 (#0 to #3) forming the RAID group. In the case of the RAID 4, the data A {A0, A1, A2, ... } is stored in the HDD#0. Each data B, C, and P (parity data) are similarly stored in other HDD #1 to #3 also.

In the case of the read request from the host, the particular command (read command) is issued from the controller 10 to the expander 20. The expander 20 interprets the accepted command and reads the data in parallel from the HDD #0 to #3. At this time, for example, suppose that the HDD #1 is in a troubled state and the data B (B0, B1, B2, ... ) is in error. The expander 20 uses the data of the HDD (#0, #2 and #3) which are not in the troubled state, and performs a XOR operation, thereby restoring the data B (B0, B1, B2, ... }, which are, for example, [A0 xor C0 xor P0=B0]. The expander 20 puts together the restored data (data B) and the read data to make it normal original data, and transfers it to the controller 10, and the controller 10 transmits it to the host as a response.

Further, in case of restoring a copy back data, the controller 10 reads the data (data B {B0, B1, B2, ... }) restored by the expander 20, and writes it to one set of HDD #n such as the spare HDD, the replaced HDD and the like as a copy back data. Since the write destination of the copy back data is one set of HDD #n, the write is performed by normal access. In this case, since the rate at the controller 10 side is larger than the rate at the HDD 30 side, for example, issuing intervals of the command are adjusted at the controller 10 side so as to perform the transfer process adapted to the performance of the HDD 30 side. The adjustment at the controller 10 side makes it easy to divide the energy to spare for the host request process.

The particular process in the fifth embodiment is applicable to {3, 4, and 5} as a RAID level. The load of the controller 10 by the parity process upon writing becomes {small, medium, medium}. In case of performing a 4× transfer in the present embodiment where the rate of the HDD 30 is slow (1.5 Gbps) and [three HDDs for data storage+one HDD for parity storage] is taken as the object, a performance ratio compared to a conventional art is 0.75 compared to the case where the HDD is fast, and is about 2.67 compared to the case where the HDD is at the same speed. Further, the load of the controller 10 in the parity process at the read time becomes very small when adapted to each RAID level. Further, in case of performing the automatic data recovery by the parity at the read time by the 4× transfer, the performance ratio compared to the conventional art is 3.0 compared to the case where the HDD is fast, and is 6.0 compared to the case where the HDD is fast. Further, in case of performing the data recovery to the spare HDD (one set), a normal access is made, and the performance ratio compared to the conventional art is 0.5 compared to the case where the HDD is fast, and is 1.0 compared to the case where the HDD is at the same speed.

Sixth Embodiment

Next, FIGS. 19A and 19B are explanatory diagrams showing a model of particular process at the disc array device in a sixth embodiment. FIG. 19A shows a process and a flow of a data among a controller 10, an expander 20, and a HDD 30. FIG. 19B shows a relation between input/output data and time in the controller 10 and each HDD 30. A rate of a controller-side physical link 40 is 3.0 Gbps, and a rate of a HDD-side physical link 50 is 1.5 Gbps, and this is the case where a ratio of rate is double. Further, FIG. 19B shows the case where, in response to a write instruction from a host, a write of the data for two HDD 30 (drives A and B) is performed in the disc array device.

In the sixth embodiment, as a particular operation, a plurality of HDDs 30 (particularly two sets) are made into a set, and a multiplex writing (double writing) of the same data is performed on it, respectively. By the command issued once from the controller 10, the same data is written in a plurality of HDDs 30 by the expander 20. Not less than two arbitrary HDDs 30 within the same RAID group are made into a set to be an object of the multiplex writing, and a data distribution for the multiplex writing is performed by a plurality of slow-side physical links 50. A plurality of HDDs 30, in which the rate of the physical link connected to the expander 20 becomes the same, are taken as the multiplex object. The multiplex writing is performed in a plurality of HDDs-side physical links 40, for example, by one-word unit by the expander 20. The multiplex transfer in the second embodiment is simply to transmit the data in order in the controller-side physical link 40. With respect to the particular operation, the controller 10 does not perform any particular data operation, and the expander 20 performs the data duplication for the multiplex writing to a plurality(two sets) of HDD 30 as the data operation. The present diagrams particularly show the case where two HDD 30 are made into a set to perform the double writing.

In FIG. 19A, at write request, the controller 10 temporarily holds a write data from a host in its state as it is in a cache memory 15. The controller 10, with respect to the write data taken as a double writing object, issues a particular command for instructing the double writing to the expander 20. The controller 10 transfers the particular command and the multiplex data in order to the expander 20 by the fast-side physical link 40. In the present diagrams, with respect to the double writing data, the data sequence of one-word unit is shown as {A, B, C, D, ... }.

The expander 20 receives the particular command and the write data in order from the controller 10 side in a buffer for controlling the speed, and performs a data separation for the double writing by a data separation/integration circuit 27. The expander 20 duplicates an accepted command and a write data for a necessary volume. The expander 20 performs an address conversion by an address table, and distributes the write command and the write data of one-word unit to each HDD 30 taken as the target by two slow-side physical links 50. For example, the command data and the write data {A, B, C, D, . . . } are transmitted in order to the drives A and B, respectively. Each HDD 30 stores the write data in the disc based on the received write data.

At the read time of the data for the HDD 30 from the host, the process flow is reversed with the flow upon writing. That is, the expander 20 reads the data from two HDD 30 taken as the objects of the double writing, and transfers a normal read data to the controller 10 side. The controller 10 takes the transfer data from the expander 20 as a data for the host.

As shown in FIG. 19B, with regard to the relation between input/output and time, when the data {A, B, C, D, . . . } of the word unit is sequentially transmitted from the controller 10 side to the expander 20, the data is stored in the drives A and B respectively as the corresponding data {A, B, C, D, . . . } at the same timing except for a transfer delay time.

In the sixth embodiment, since the RAID 1 system is automatically realized and an overhead upon writing in the RAID 1 system can be made approximately null, the load of the controller 10 is lower than when the normal RAID 1 system is formed. Since the controller 10 is only to execute the read/write of the data, its load can be made very small. Further, [the rate (3.0 Gbps) of the controller side]=a total sum of the rates (1.5 Gbps+1.5 Gbps) of the HDD side)], when compared by a data unit, since the rate of the controller side becomes larger, a buffer for controlling the speed is required for the expander 20. Alternately, a processing method for inserting an ALIGN primitive in the controller 10 side for adjusting the rate may be adopted. In this case, though the buffer provided in the expander 20 can be made small, a data transfer efficiency of the controller 10 side is lowered. Further, the HDD 30 of the fast rate (3.0 Gbps) can be used as the HDD 30 of the multiplex writing object by corresponding to the controller 10 side. In case the controller side 10 and the HDD 30 side become the same speed, the buffer provided in the expander 20 can be made the smallest minimum.

Further, since two HDD 30 taken as the objects of the double writing become the discs of totally identical value, in the case where which side of the disc is involved is to be reliably determined when a redundant code (check code) for address check for every sector of the disc is attached, the following method is applicable. First, there is a method for mixing the data for each disc by using the process of the second embodiment. Alternatively, there is a method for generating a check code for every disc of the double writing object in the expander 20 side and inserting it into the data of the disc at constant intervals.

With respect to the sixth embodiment, the automatic data recovery using the double writing upon reading will be described. FIG. 20 is an explanatory diagram for the automatic data recovery and the data recovery to the spare HDD and the like by using the double writing upon reading.

At the data read time, even when the one HDD 30 in the double written HDD 30 is in a troubled state, the data of the response to the controller 10 can be transferred by the data of the other HDD 30. Since an access is gained to two HDDs 30 by the expander 20, there is no need to re-execute an access to a mirror HDD in the controller 10 side, and this results in an excellent efficiency. Further, a check by comparison of the data from two HDDs 30 in the expander 20 side is also possible. For this data recovery, two types of usage method are available: the recovery of the read request data from the host and the recovery of a copy back data to the HDD 30 such as the spare HDD, the replaced HDD and the like.

For example, the original data (read object data) is taken as A {A0, A1, A2, A3, A4, . . . }. By the double writing process upon writing, the data A is stored in two HDD 30 (#0 and #1) forming the mirror, respectively.

Upon receipt of the read request from the host, the particular command (read command) is transmitted from the controller 10 to the expander 20. The expander 20 interprets the accepted command, and reads the data in parallel from the HDD #0 and #1. At this time, for example, suppose that the HDD #0 is in a troubled state, and its data A is in error. The expander 20 takes the read data from the other HDD#1 not in a troubled state as the recovered data as it is. The expander 20 transfers the recovered data to the controller 10, and the controller 10 transmits it to the host as a response.

Further, in case of recovering the copy back data, the controller 10 reads the data (data A) recovered by the expander 20, and writes it to one HDD #n such as the spare HDD, the replaced HDD and the like as the copy back data. Since the write destination of the copy back data is one HDD #n, the write is made by the normal access. Similarly to the case of the fifth embodiment, the transfer process is performed so as to be adapted to the performance of the HDD 30 with adjustment made at the controller 10 side.

The particular process in the sixth embodiment is applicable by the RAID 1 as a RAID level. The load of the controller 10 in the replicating process upon writing becomes very small. In case the rate of the HDD 30 in the sixth embodiment is slow (1.5 Gbps) and the double writing is performed with two HDD 30 as objects, the performance ratio compared to the conventional art is 1.0 compared to the case where the HDD is fast, and is 2.0 compared to the case where the HDD is at the same speed. Further, in case of performing the automatic data recovery by the mirror HDD, the load of the controller 10 is the same as the normal access, and the performance ratio compared to the conventional art is 0.5 compared to the case where the HDD is fast, and is 1.0 compared to the case where the HDD is at the same speed.

Seventh Embodiment

Next, FIGS. 21A and 21B are explanatory diagrams showing a model of particular process at the disc array device in a seventh embodiment. FIG. 21A shows a process and a flow of a data among a controller 10, an expander 20, and a HDD 30. FIG. 21B shows a relation between input/output data and time in the controller 10 and each HDD 30. A rate of a controller-side physical link 40 is 3.0 Gbps, and a rate of a HDD-side physical link 50 is 1.5 Gbps, and this is the case where a ratio of rate is double. Further, FIG. 21B shows the case where, in response to a write instruction from a host, a write of the data for four HDD 30 (drives A, B, C, D) is performed in the disc array device.

The seventh embodiment is an embodiment combining the sixth embodiment and the second embodiment, and has the features of the respective embodiments. In the seventh embodiment, as a particular operation, a plurality of HDDs 30 are made into a set so as to separate and distribute the date, thereby performing a multiplex transfer, and at the same time, with respect to this data distributed by the multiplex transfer, a plurality (particularly two sets) of HDD 30 are made into a set so as to perform a multiplex writing. The multiplex writing in the seventh embodiment is simply to transmit the data in order in the controller-side physical link 40. With respect to the particular operation, the controller 10 does not perform any particular data operation, and the expander 20 performs the duplication of data for the multiplex writing as a data operation and the distribution of the data by a word unit to a plurality of HDDs 30. The present diagrams particularly show the case where two HDDs 30 are made into a set to perform a double writing, and further, a duplex transfer is performed for a pair of two sets each of the HDD 30.

In FIG. 21A, at write request time, the controller 10 temporarily holds a write data from a host in its state as it is in a cache memory 15. The controller 10 issues a particular command to the expander 20 with respect to the write data taken as a particular operation object. The controller 10 transfers the particular command and the write data in order to the expander 20 by the fast-side physical link 40. The present diagram shows the process object write data as a data sequence of one-word unit {A, B, C, D}.

The expander 20 receives the particular command and the write data in a buffer for controlling the speed in order from the controller 10 side, and performs a data separation corresponding to a double writing and a multiplex transfer by a data separation/integration circuit 27. The expander 20 duplicates an accepted command and the write date for a necessary volume. The expander 20 performs an address conversion by an address table, and transmits a write command and a write data by one-word unit to each HDD 30 taken as a target by four slow-side physical links 50. For example, a command data and write data {A, C, E, G, . . . } are transmitted in order to the drives A and B, respectively, and the command data and write data {B, D, F, . . . } are transmitted in order to the drives C and D, respectively. Each HDD 30 stores the received write data in a disc based on a received write command.

At the read time of the data for the HDD 30 from the host, the process flow is reversed with the flow upon writing. That is, the expander 20 reads the data from four HDDs 30 taken as the objects of the double writing and the duplex transfer, and integrates a original data and transfers it to the controller 10 sides as a multiplex data. The controller 10 takes the transfer data from the expander 20 as a data for the host.

As shown in FIG. 21B, with regard to the relation between input/output and time, when the data {A, B, C, D, . . . } of the word unit is sequentially transmitted from the controller 10 side to the expander 20, the transferred data is stored in the drives A and B as corresponding data {A, C, E, G, . . . } respectively at the same timing except for a transfer delay time, and is stored in the drives C and D as corresponding data {B, D, F . . . } respectively at the delayed timing of the process for the drives A and B and the time.

With respect to the sixth embodiment, an automatic data recovery using the double writing upon reading will be described. FIG. 22 is an explanatory diagram for the automatic data recovery and the data recovery to a spare HDD and the like upon reading.

At the data read time, even when the one HDD 30 in the double written HDD 30 is in a troubled state, the data of the response to the controller 10 can be transferred by the data of the other HDD 30. Since an access is gained to two HDD 30 by the expander 20, there is no need to re-execute an access to a mirror HDD (mirror disc) in the controller 10 side, and this results in an excellent efficiency. Further, a check by comparison of the data from two HDD 30 in the expander 20 side is also possible. For this data recovery, two types of usage method are available: the recovery of the read request data from the host and the recovery of a copy back data to the HDD 30 such as a spare HDD, a replaced HDD and the like.

For example, an original data (read object data) is taken as the data sequence {A0, B0, A1, B1, A2, B2, . . . } of one-word unit which is a multiplex data of the data A and B. By the duplex transfer and the double writing process upon writing, the data A is stored in the mirror HDD (#0 and #1), and the data B is stored in the mirror HDD (#2 and #3) for four HDD 30 (#0 to #3) forming the mirror HDD of two types.

In the case of the read request from the host, the particular command (read command) is transmitted from the controller 10 to the expander 20. The expander 20 interprets the accepted command, and reads the data in parallel from the HDD (#0 to #3). At this time, suppose that the HDD #2 is in a troubled state, and the data B is in error. The expander 20 takes the read data from the other HDD #3, which is not in a troubled state with respect to the data B, as a recovered data as it is. The expander 20 transfers the recovered data to the controller 10, and the controller 10 transmits it to the host as a response.

Further, in case of recovering the copy back data, the controller 10 reads the data (data B) recovered by the expander 20, and writes it to one HDD #n such as the spare HDD and the replaced HDD and the like. Since the write destination of the copy back data is one HDD #n, the write is made by the normal access. Similarly to the case of the fifth embodiment, the transfer process is performed so as to be adapted to the performance of the HDD 30 with the adjustment made at the controller 10 side.

The particular process of the seventh embodiment is applicable to {0+1, 3+1, 4+1, and 5+1} as a RAID level. The load of the controller 10 in the duplex transfer and the replicating process upon writing when applied to each RAID level becomes small. In case the duplex transfer and the double writing are performed with the rate of the HDD 30 being slow (1.5 Gbps) and four HDD 30 taken as objects in the present embodiment, a performance ratio compared to a conventional art is 2.0 compared to the case where the HDD is fast, and is 4.0 compared to the case where the HDD is at the same speed. Further, in case of performing the automatic data recovery at the read time, the load of the controller 10 becomes the smallest, and a performance ratio compared to a conventional art is 1.0 compared to the case where the HDD is fast, and is 2.0 compared to the case where the HDD is at the same speed. Further, in case of performing the data recovery to the spare HDD (one set), the read and the write of the recovered data are identically with the normal access, and the load of the controller 10 at each RAID level becomes small, and the performance ratio compared to the conventional art is 0.5 compared to the case where the HDD is fast, and is 2.0 compared to the case where the HDD is at the same speed.

Eighth Embodiment

Next, FIGS. 23A and 23B are explanatory diagrams showing a model of particular process at the disc array device in a fifth embodiment. FIG. 23A shows a process and a flow of a data among a controller 10, an expander 20, and a HDD 30. FIG. 23B shows a relation between input/output data and time in the controller 10 and each HDD 30. A rate of a controller-side physical link 40 is 3.0 Gbps, and a rate of a HDD-side physical link 50 is 1.5 Gbps, and this is the case where a ratio of rate is double. Further, FIG. 23B shows the case where, in response to a write instruction from a host, a write of the data for six HDDs 30 (drives A, B, C, D, E and F) is performed in the disc array device.

The eight embodiment is an embodiment combining the fifth embodiment and the sixth embodiment, and has the features of the respective embodiments. In the eighth embodiment, as a particular operation, with a plurality of HDDs 30 as the objects, a multiplex writing (particularly, double writing) shown in the sixth embodiment is performed together with a parity process shown in the fifth embodiment by the expander 20. That is, a multiplex transfer is performed with not less than six HDD 30 taken as objects where a physical link rate forming the same RAID group is the same, and a data and a parity are multiplex-written, respectively. The separation and distribution of a plurality (for example, three) of the data including the parity process are performed by the expander 20 by the slow-side physical link 50 regarding the transfer data, and at the same time, and the multiplex writing (particularly, double writing) is performed on each data distributed by a command issued once from the controller 10. The transfer data is multiplex-transferred by the controller-side physical link 40, and the distribution of the data in a plurality of the HDD-side physical links 50 is performed by the expander 20, for example, by one-word unit. The multiplex transfer in the eighth embodiment is simply to transmit the data in order in the controller-side physical link 40. With respect to the particular operation, the controller 10 does not perform any particular data operation, and the expander 20 performs the distribution of the data, the parity process and a data duplication as a data operation, and performs the distribution of the data to a total sum of not less than six HDDs. The present diagrams particularly show the case where a 3× transfer (duplex transfer+parity process) for dividing the transfer data into two portions by one-word unit by the HDD-side physical link 50 and further distributing them into three portions put together with the insertion of the parity data and the double writing of each distributed data are combined, and the data is distributed and stored by making a total of six slow-side HDD 30 into a set.

In the eighth embodiment, since the physical port used for the particular operation is required not less than six, to designate, for example, six physical ports in the physical port designated region of a particular command shown in FIG. 7, the designation is performed, for example, by using the following format. The controller 10 designates a mode to perform the [3× transfer+double writing] process by the particular command, and at the same time, by using the region of four physical port information (physical port No.) in the physical port designated region, designates three physical ports by the physical port numbers from among six physical ports taken as usage objects by the particular operation. The format is such that, by designating one physical port number, the next physical port number is also automatically designated. For example, in the case where six physical ports #0 to #5 are desired to be designated as the objects by corresponding to six drives A to F in the expander 20, the physical ports #0, #2 and #4 corresponding to three drives A, C and E are designated by the particular command. By the designation of the physical port #0, the drive B corresponding to the next physical port #1 is automatically designated. Other formats may be such as designating the number of the physical port group already set up or designating a consecutive physical port range (for example, the physical port #0 to #5) by two physical port numbers.

In FIG. 23A, at the write request, the controller 10 temporarily holds a write data from the host in its state as it is in a cache memory 15. The controller 10 issues the particular command corresponding to the designation of the process to the expander 20 with respect to the write data of the process object. The controller 10 transfers the particular command and the write data in order to the expander 20 by a fast-side physical link 40. The present diagram shows the write data of the process object as a data sequence of one-word unit {A, B, C, and D}.

The expander 20 receives the particular command and the write data in a buffer for controlling the speed in order from the controller 10 side, and performs the distribution of the data with a total of six data as a unit by separation into three data with two data and one parity data taken as a unit and by duplication of the data for the double writing of each of those data by a data separation/integration circuit 27. In the parity process, for example, a parity data P1=P (A–B) of one word is generated from the data A and B of two words by a XOR operation. The expander 20 duplicates an accepted command and the write data for a necessary amount. The expander 20 performs an address conversion by an address table, and delivers a write command and the write data of one-word unit to each HDD 30 taken as the objects by six slow-side physical links 50. For example, the command and the write data {A, C, . . . } are transmitted to the drives A and B, and the command and the write data {B, D, . . . } are transmitted to the drives C and D, and the command and the write data {P1, P2, . . . } are transmitted to the drives E and F, respectively. Each HDD 30 stores the write data in the disc based on the received write command.

At the read time of the data for the HDD 30 from the host, the process flow is reversed with the flow upon writing. That is, the expander 20 reads the data from six HDD 30 taken as the process objects, and subjects them to the parity process so as to integrate and transfer the original read data to the controller 10 side as a multiplex data. The controller 10 takes the transfer data from the expander 20 as a data for the host.

As shown in FIG. 23B, with regard to the relation between input/output data and time, when the data sequence {A, B, C, D, . . . } is transmitted in order from the controller 10 side to the expander 20 is stored in the drives A and B as the corresponding data {A, C, E, G, . . . } at the same timing for the data transmission except for a transfer delay time. The transferred data is stored in the drives C and D respectively, as the corresponding data {B, D, F, . . . } at the delayed timing of the transfer process to the drives A and B with a delay time t. Further, the data is stored in the drives E and F as the parity data {P(A-B), P(C-D), P(E-F), . . . } at the delayed timing of those process and further delay time t. With respect to the HDD 30 (drives E and F) storing the parity, the HDD 30 corresponding to the fast rate (3.0 Gbps) can be used by adapting to the controller-side physical link 40.

With respect to the eighth embodiment, an automatic data recovery upon reading will be described. FIGS. 24A and 24B are explanatory diagrams for the automatic data recovery upon reading and a data recovery to a spare HDD and the like.

At the data read time, even when two HDDs 30 among a RADI group are in a troubled state and a data read is in error, the date transfer to the controller 10 side is possible. At the controller 10 side, there is no need to process the data recovery by re-access to a mirror HDD and the parity, and this results in an excellent efficiency. For this data recovery, two types of usage method are available: the recovery of the read request data from the host and the recovery of a copy back data to the HDDs 30 such as the spare HDD, a replaced HDD and the like.

For example, an original data (read object data) is taken as the data sequence {A0, B0, A1, B1, A2, B2, ... } of one-word unit which is a multiplex data of the data A and B of two types. By a 3× transfer and the double writing process upon writing, the data A is stored in the mirror HDD (#0 and #1), and the data B is stored in the mirror HDD (#2 and #3), and a parity data P is stored in the HDD (#4 and #5) for six HDD 30 (#0 to #5) forming the mirror HDD of three paths.

As shown in FIG. 24A, in the case of the read request from the host, similarly to the seventh embodiment, the expander 20 reads the data in parallel from the HDD (#0 to #5) based on the particular command. At this time, suppose that two HDDs which are double written, for example, the HDD (#2 and #3) are in a troubled state and its data B{B0, B1, B2, ... } is in error. In this case, since the expander 20 is unable to perform the data recovery by using the mirror data with respect to the data B, it recovers the data B by a XOR operation by using the data (A and P) of other HDD 30 (#0 and #4) among the RAID group. The expander 20 transfers the normal read data adapted to the recovered data to the controller 10, and the controller 10 transfers it to the host as a response.

Further, in case of recovering the copy back data, the controller 10 reads the data (data B) recovered by the expander 20, and writes the same data as the copy back data to two HDDs (#m and #n). Since the write destination of the copy back data is two HDD 30, the write is made by the particular operation similarly to the seventh embodiment. Similarly to the case of the fifth embodiment, the transfer process is performed so as to be adapted to the performance of the HDD 30 with the adjustment made at the controller 10 side.

Further, as shown in FIG. 24B, at the data read time from the HDD (#0 to #5), suppose that not two HDD 30 which are double written, but two HDDs 30 storing a different data, for example, HDD (#1 and #2) are in a troubled state and each of the data A and B is in error. In this case, the expander 20 reads the data of each of the mirror HDD with respect to the data A and B as it is, so that the data recovery is made possible. That is, the read data (A and B) from the HDD (#0 and #3) is taken as the recovery data. The expander 20 transfers the normal read data A and B to the controller 10, and the controller 10 transmits the data to the host as a response. Further, in the case of the recovery of the copy back data, the controller 10 reads the data (data A and B) recovered by the expander 20, and writes a different data to two HDD (#m and #n) such as the spare HDD, the replaced HDD and the like as the copy back data. Since the destination of the copy back data is two HDD 30, similarly to the second embodiment, the write is made by the particular operation. Similarly to the case of the fifth embodiment, the transfer process is performed so as to be adapted to the performance of the HDD 30 side with the adjustment made at the controller 10 side. Further, even in case the parity data P is in error, similarly to the above described process, the recovery of the data is made possible by using other HDD 30 within the RAID group.

Ninth Embodiment

Next, FIGS. 25A and 25B are explanatory diagrams showing a model of a process by a HDD information reporting function comprised by a disc array device in a ninth embodiment. FIG. 25A is an explanatory diagram showing an example of the HDD information report among a controller 10, an expander 20, and HDD 30. FIG. 25B shows a designated example of a physical port by a special command in the HDD information report process.

In the ninth embodiment, to effectively realize the function carried by each of the above-described embodiment, a function (HDD information reporting function) to report HDD information regarding the HDD 30 under command of the expander 20 is provided in addition to the configuration and the function of each of the above described embodiment. The HDD information reporting function conducts research on a HDD state including a connecting state of the HDD 30 (presence or absence of the connection) and a transfer rate of the already connected HDD (physical link rate in the HDD-side physical link 50), and reports to the controller 10. When executing each of particular operations by this function, research is conducted whether or not the physical link of the designated physical port is usable or suitable for an objective operation. The recognition of the HDD information is made by a slow-side physical link 50 mainly by the expander 20. The recognized HDD information is reported to the controller side 10.

Each physical port is given a physical port number as unique recognition information within the system. According to the process conforming to a SAS protocol, when the disc array device is activated, mutual connections are established between each device, and by exchanging the ID of each device, the number and type of connected devices are determined. Even in case the connection and disconnection of the device takes place during the operation, the event is reported. The controller 10 and the expander 20 grasp a system configuration including the HDD state by the process including a rate negotiation conforming to the SAS protocol and the HDD information report process, and select and execute each of the particular operations by adapting to the system configuration.

First, the HDD information report process by the HDD information reporting function will be described. The process is executed according to the procedures (1) to (6) shown below.

Procedure (1): First, when the disc array device is activated (power on time), a data transfer rate (physical link rate) for every physical port of the HDD 30 side is recognized as a normal operation by the rate negotiation with the expander 20 and the HDD 30. This operation is an operation according to the conventional configuration. For example, as shown in FIG. 25A, in the HDD-side physical link 50, the HDD 30 (#A and #B) of 1.5 Gbps are in a connected state for the physical port #1 and #2, and the HDD 30 (#c) of 3.0 Gpbs is in a connected state for the physical port #3, and no connected state is recognized for the physical port #4.

Procedure (2): The expander 20 collects the SAS address of each HDD 30 connected to the device itself and the expander address of other connected expanders 20, and prepares an address table for a routing of the mutual connection of each portion within the device itself. This operation is also according to the conventional configuration. In the address table, for example, the addresses of the HDD 30 (#A to #C) are mapped for the physical port (#1 to #3) carried by the expander 20.

Procedure (3): The controller 10, when activated, executes a rate negotiation with the expander 20 regarding the controller-side physical link 40. This operation is also according to the conventional configuration. For example, the rate of the controller-side physical link 40 is recognized as 3.0 Gbps.

Procedure (4): The controller 10 requests the expander 20 to a report on the HDD information. The expander 20 reports on the HDD state recognized by the rate negotiation in compliance with the request from the controller 10. By this report, the controller 10 recognizes the state of each HDD-side physical link 50. This report process may be executed by a private MIB (Management Information Base) by using a SMP (Serial Management Protocol) or may be executed by the particular command issuing function.

Procedure (5): The controller 10 executes a discovery of the HDD 30 with the already connected HDD 30. This process may be executed with the HDD 30 corresponding to the physical port reported to be in a connected state taken as an object provided that the expander 20 corresponds to the report function shown in the procedure (4).

By the above described procedures, the controller 10 and the expander 20 recognize the HDD information. The controller 10 and the user, based on the recognition of the HDD information, taking into consideration also a ratio of rates with the controller-side physical link 40 and the HDD-side physical link 50, decide the particular operation taken as an executing object and its attribute of the process, and perform a setting, a command execution and the like. For example, the controller 10 recognizes by the HDD information reporting process that the rates of the HDD#A and #B are 1.5 Gbps, and taking into consideration that the rate of the controller-side physical link is 3.0 Gbps and a ratio of rate is double, performs a setting and an execution of the particular command so that the particular operation of the duplex transfer and the like is executed with this pair of HDD 30 taken as an object.

In the procedure (4), for example, in case of performing the HDD information reporting process by issuance of the particular command from the controller 10, as shown in FIG. 25B, by using bytes 8 and 9 in the SAS address region within a header of the particular command, the designating of the physical port information and the reporting thereto of the HDD information are performed. In the HDD state shown in FIG. 25A, the controller 10 designates the physical port number and the like which become check objects to the expander 20 by using the SAS address region at the request of the HDD information reporting. The controller 10, for example, designates the physical port #1 and #2 to make an enquiry as to whether or not the rate in this pair is slow (1.5 Gbps) and is usable by the particular operation. The expander 20, in compliance with the designation of the physical port from the controller 10 side, reports the corresponding HDD state. For example, the expander 20 reports that the physical port #1 and #2 are slow (1.5 Gbps) and usable.

Further, as shown in FIG. 25B, as for how to designate the physical port, each bit in the region designating the physical port information may be let correspond to the physical port. The format in the diagram is the case where one bit is let correspond to one physical portion, and the physical port #31 to #16 are let correspond to 16 bit of the bytes 8, and the physical port #15 to #0 are let correspond to 16 bit of 9 bytes. In this case, 32 pieces of physical port can be reported by one command only at a time.

As the content of the report to the controller 10 from the expander 20, it may be only about the physical port connected to the slow (1.5 Gbps) HDD 30 capable of forming a RAID group for the particular operation, and moreover, may be only about the physical port of the HDD connection unit. Further, usable physical port needs not to be reported by the bit and the like, but the numerical value capable of recognizing a rate and a state of each physical port may be reported. In case the report is made by the SMP, neither of the controller 10 nor the expander 20 performs any operation on the header of the command. The report content at this time can be arbitrary set.

Next, with respect to the ninth embodiment, a report process in the case of the HDD in a troubled state by using the HDD information reporting function in the case of the HDD being in a trouble will be described. The response to various types of the command requests from the controller 10 must be performed within a definite period of time. Hence, in the case where the one HDD 30 is put into a error state due to a trouble in the HDD group taken as the object of the particular operation, the operation becomes partially different depending on the presence or absence of the automatic data recovery function (recovery using the parity and the mirror). By using information reporting function, the report of the information when the HDD is in a trouble is performed from the expander 20 to the controller 10, and the operation corresponding to each state is performed by the expander 20.

FIG. 26 is a table, wherein the advisability of the automatic data recovery by the expander 20 for each data in relation to the combination (a to g) of two HDD 30 in a state of {drives A and B} and a correspondence between the above described corresponding embodiment and the operation executed by the expander 20 are shown. As the state of the HDD 30, there are [no response], [error report] and [normal]. The [no response] is a state where there is no response available from the HDD 30 to the command, and the [error report] is a state where a predetermined error report is made from the HDD 30 as a response.

Being common to each of the above described embodiments, the data recovery is not possible in five cases of a: [no response]-[no response], b:[no response]-[error report], c:[error report]-[error report], d:[normal]-[no response], and f:[normal]-[error report] in the combination of the states of drives A-B. In the case of the fifth to eighth embodiments, the automatic data recovery may be possible in two cases of e: [normal]-[no response] and g:[normal]-[error report] in the combination of the states of the drives A-B. Subsequently, according to each case of a to g, the expander 20 performs the report and its relative operation for the controller 10 sides by using the HDD information reporting function.

In the case of a, the expander 20 reports no response error to the controller 10 after waiting until the threshold value of the processing time. In the case of b, the expander 20 reports an error code of the drive B and the no response error to the controller 10 after waiting until the threshold value of the processing time similarly to the case of a. In the case of c, the expander reports the error codes of the drives A and B to the controller 10. In the cases of a to c, the expander 20, when reporting, mixes the error code (value showing the error content) into the transfer data and transfers. The no response error information is generated by the expander 20.

In the case of d, the expander 20 reports the normal side data and the no response error after waiting until the threshold value of the processing time. At this time, the expander 20, when transferring, mixes the data and the error code, and transfers the remainder by padding it by a dummy data. Further, the error report may be made such that the normal side data is accessed by itself alone for the controller 20. In the case of e, the expander 20 reports the recovery data at the expander 20 to the controller 10 after waiting until the threshold value of the processing time. Further, the expander 20 informs an intention of the data recovery.

In the case of f, the expander 20 reports the normal side data and the error code of the drive B to the controller 10.

At this time, similarly to the case of d, the expander 20 performs the mixing and the like of the data and the error code. In the case of g, the expander 20 reports the recovery data at the expander 20 to the controller 10, and moreover, reports the intention of the data recovery so as to hold the error code at the expander 20. In the case of g, the report of the error information at the time of the automatic data recovery may be made to the controller 10. The controller 10, when informed of the intention of the data recovery from the expander 20, conducts research on the error information (error code) to determine whether or not the error of the object HDD 30 is serious or whether or not it is temporarily. In case the automatic data recover is performed at the expander 20, since it becomes a normal sequence, no report of the error information is made to the controller 10. Hence, this error information is temporarily held in a memory at the expander 20 side, and the report (transmission) on the error information held according to the occurrence of the request from the controller 10 is made.

As described above, in the ninth embodiment, by using the HDD information reporting function, the function carried by each of the above described embodiments can be effectively performed. By the HDD information reporting function, the number of direct accesses to each HDD 30 connected to the disc array device can be reduced, thereby improving a traffic.

Tenth Embodiment

FIG. 27 shows an explanatory diagram representing a model for the particular process in the disk array apparatus according to a tenth embodiment. It illustrates processes and data flows between the controller 10, expander 20 and HDD 30. The rate of the controller-side physical link 40 is 3.0 Gbps, and that of the HDD-side physical link 50 is also 3.0 Gbps. The ratio of the rates is, therefore, one (1). It shows a state in which data are written, in particular, for two HDDs 30 (drives A and B) of the disk array apparatus in response to writing instructions from the host.

The tenth embodiment provides data compression/decompression functions between the controller 10 and the expander 20 in addition to the functions described at each embodiment. The tenth embodiment executes such a particular operation that the controller-side physical link 40 compresses transfer data for multiplex transfer for a plurality of HDDs 30 and the a plurality of HDDs-side physical links 50 expands the transfer data to distribute. The multiplex transfer in the tenth embodiment refers to the compression and transmission of data on plural paths at the controller-side physical link 40. With the particular operation, the controller 10 compresses and expands a plurality of data, and the expander 20 compresses and expands a plurality of data as data operation and distributes data to a plurality of HDDs. The controller 10 and the expander 20 further include data compression/decompression circuits in their respective data separation/integration circuits (17 and 27). The figure shows the process of duplex transfer and compression/decompression for a pair of two HDDs 30 with a high speed rate (3.0 Gbps).

In FIG. 27A, when received a request for writing, the controller 10 publishes a particular command (write command) instructing doubling transfer and compression/decompression processes of write data for two HDDs 30 that is subjected to doubling process to the expander 20. The controller 10 compresses user data and redundant code (check code) of the write data through the data compression/decompression circuit. The controller 10 sequentially transfers the particular command and compressed data to the expander 20 through the fast-side physical link 40. For example, let the sequence of original data and that of compressed data be {A, A', B, B', C, C', ... } and {Ac, Bc, Cc, ... } respectively. The data A and A' lead to the data Ac by compression. The compression ratio by data compression/decompression process is let be 50% as an example. The transfer process time is let be t in compressed data unit (Ac, and others). Where, commands are exempted from compression.

The expander 20 receives the particular command and compressed data in sequence from the controller 10, expands the received data by the data compression/decompression circuit, and distributes the data to a plurality of HDDs-side physical link 50. The expander 20 delivers write command and write data (decompression data) to each HDD 30 to be a target. In the slow-side physical link 50, decompressed two of the data corresponding to data of one compressed data unit according to rate and the compression ratio requires a transfer-processing time of 2 t. Each HDD 30 stores the write data in disk in response to the write command received.

When data are read from the instruction of the host, the flow is reverse to the writing flow. That is, the expander 20 reads data from two HDDs 30 that are subjected to doubling process, compresses and integrates each read data, and transfers the multiplexed data to the controller 10. The controller 10 expands the transfer data from the expander 20 to send them to the host.

FIG. 27B shows the relation between data and time. For example, when the sequence of the compressed data {Ac, Bc, Cc, ... } are transmitted sequentially, the data from the controller 10 {A, A', C, C', E, E', ... } and {B, B', D, D', F, F', ... } are stored in the drives A and B respectively with a delay of a decompressing process time about each compressed data at the expander 20.

In the tenth embodiment, even if the rate of the controller-side physical link 40 is equal (3.0 Gbps) to that of the HDDs-side physical link 50, the effect of improvement in performances by the multiplex transfer can be obtained. For instance, a compression ratio is 50%, as with the same process of the first embodiment, traffic can be halved at the bus of the controller-side physical link 40. For instance, a user data part in the data pattern is the same during format processing of the disk array apparatus, which produces a substantial compression effect caused by the data compression/decompression function. In consequence, the improvement of traffic at the controller 10 can reduce a formatting time for the device.

Eleventh Embodiment

FIG. 28 shows a block diagram illustrating the configuration of the disk array apparatus according to the eleventh embodiment. The disk array apparatus according to the eleventh embodiment has the basic chassis 120 and the additional chassis 130, which include the controller 10, the expander 20B, the data separation/integration end device 400, and HDD 30. The figure shows the data flow at the host's request for write among the host 300, the controller 10, the expander 20B, the data separation/integration end device 400, and HDD 30.

In the eleventh embodiment, functions for controlling processes including particular operation in each embodiment described are implemented not in the circuit of the expander 20 but in the data separation/integration end device 400 that is another end device connected to the expander 20B. Thereby the same functions can be provided. This figure shows the configuration in which, the additional chassis 130 has the data separation/integration end device 400 having functions equivalent to the data separation/integration circuit 27 is connected outboard to the expander 20B without the data separation/integration circuit 27 through a bus and others. The host, the controller 10, HDD 30, and others are connected to one another as is the case with the embodiment. The expander 20B conducts processes in response to SAS except for functions including the particular operation in the each embodiment described.

The data separation/integration end device 400 is a device such as LSI and others with software and hardware for actualizing functions including the particular operation in the each embodiment. Providing an option to connect or disconnect the data separation/integration end device 400 to the expander 20B actualizes scalability of the disk array apparatus.

When implementing the functions of the particular operation and others, the controller 10 specifies the SAS address to be set corresponding to the data separation/integration end device 400 with the physical link 40 between the expander 20B and the controller 10, publishes the particular command to transmit. Thereby, the controller 10 conducts data transfer with the data separation/integration end device 400.

The data separation/integration end device 400 has at least one or more paths 401 for communication with the controller 10. The rate of the path 401 is set to high speed (3.0 Gbps) to meet that of the controller 10 and the expander 20B. Further, the data separation/integration end device 400 has a plurality of another paths 402 for communication with the HDD 30. One of the paths 402 beside the HDD 30 may be shared with the path 401 beside the controller 10 in the configuration.

The data separation/integration end device 400 has functions of forming and holding an address table by searching SAS address of HDD 30 connected to the expander 20B connected corresponding the data separation/integration end device 400. The data separation/integration end device 400 converts the SAS address (destination SAS address) in the command transmitted to the device itself by the expander 10 to the SAS address of each HDD 30 to be targeted with the address table, and then separates and integrates the transfer data to transmit. The data separation/integration end device 400 converts the SAS address (source SAS address) of the controller 10 in the accepted command to the SAS address of device itself. The data separation/integration process in the data separation/integration end device 400 corresponds to various data manipulations such as data distribution for multiplex transfer, data replication for multiplex writing, and parity process described in the each embodiment. When transferred from the HDD 30 to the controller 10, for example, on request for reading, data is transferred in reverse flow to the above mentioned in the same manner.

If necessary, the data separation/integration end device 400 may be connected to inside the frame (400B) shown in the dotted line in the expander 20B as well as connecting it outboard to the expander 20B.

A process flow of the disk array apparatus in one embodiment according to the present invention is described below. FIGS. 29 and 30 are flow charts corresponding to processes in the disk array apparatus in each embodiment stated above, and illustrating the process flow in the disk array apparatus having functions in the each embodiment, especially, comprehensively, as one embodiment. In the device, the particular operation is implemented selectively according to states of HDD and connection rate, types of data to be processed, and setting related to the implementation of the particular operation.

FIG. 29 shows a flow chart of the operation of the expander 20, in which are illustrated the steps for transferring data (data writing and others) to the HDD 30 based on the command from the controller 10.

On accepting frames from the controller 10 via the controller-side physical link 40 (step S101), the expander 20 refers to the header of the accepted frame to confirm whether an address is destined for the device itself (expander address) (S102).

If the address is not destined for the device itself (S102-NO), the expander 20 delivers the frame to the physical port corresponding to specified address within the frame (S103) and completes the process. If the address is destined for the device itself (S102-YES), the expander 20 refers to the flag area and command area on the header of the frame for checking (S104). The expander 20 determines whether a combination of flag and command is correct (S105) through the check. If the combination is incorrect (S105-NO), the expander 20 conducts error processing and reporting to the controller 10 (S106) and ends the operation.

If the combination is correct (S105-YES), the expander 20 checks the area specified as the physical port of the header in the frame (S107). The expander 20 recognizes the specified physical port subjected to processing such as data transfer through the check. Particularly, in the particular operation, a plurality of physical ports will be the specified physical port.

The expander 20 replicates the header of the accepted frame, or the command for each specified physical port through the data separation/integration circuits 27 (A108). An original command to be transmitted to a plurality of HDDs 30 subjected to processing is formed by the replication.

The expander 20 converts the address of a plurality of frames formed by the replication at the area on the SAS address of the header (S109). The address is converted by reference to the address table. The expander 20 replaces the source address with the address destined for the device itself (expander address) in the area. At this point the reserve area is cleared. The expander 20 replaces the destination address with the HDD address corresponding to the specified physical port in the area.

The expander 20 determines whether the subject data (transfer data from the controller 10) is multiplexed data (S110). If the subject data is a multiplexed one, the data separation/integration circuits 27 separates the subject data for each the specified physical port (S111). The separation means a process according to types of the particular operation. In duplex transfer such as the first embodiment and others, for example, data are separated into two physical ports.

The expander 20 determines whether it should form automatically the data frame and parity of the subject data (S112). When the parity is formed, an XOR operation is executed based on the subject data to form it for use in the specified physical port, as described in the fifth embodiment and others (S113).

The expander 20 determines whether the subject data should be written double (multiplex writing) (S114). If a double writing is needed, the expander 20 replicates the data to be written double for each specified port (S115).

The expander 20 publishes the converted and formed frame at each process mentioned above to the specified port (S116) and ends.

FIG. 30 is a flow chart showing the operation of the expander 20 with steps for data transfer process (e.g., data reading) from HDD 30 based on the command from the controller 10.

On receipt of a frame from the HDD 30 via the HDD-side physical link 50 (S201), the expander 20 refers to the header of the frame to make sure if the destination address is the address destined for the device itself (expander address) (S202). If the address is not the address destined for the device itself (S202-NO), the expander 20 delivers the frame to the physical port on the specified address in the frame (S203) and ends the process.

If the address is the one destined for the device itself (S202-YES), the expander 20 determines whether the HDD 30 that is the sender of the frame is in error (S204). If the HDD 30 is not in error (S204-No), the expander 20 sorts the transferred data from the HDD30 on the memory (buffer) to integrate them (S205). If the HDD 30 is in error, the process is not executed.

The expander 20 determines whether the HDD 30 (including a HDD group subjected to the particular operation) has completed its response (S206). If the response has not ended (S206-NO), the expander 20 determines whether the waiting time is in the permissible time (S207). If it is in the permissible time (S207-YES), the expander 20 ends the process. If the waiting time exceeds the permissible time (S207-NO) and the HDD 30 subjected to the particular operation has already completed its response (S206-YES), the expander 20 determines whether all data from the HDD 30 are normal (S208).

If all data from the HDD 30 are normal (S208-YES), there is no need to recover the data. If the data include errors (S208-NO), the expander 20 determines whether the data can be recovered using the parity, Mirror, and others (S209). If the data cannot be recovered (S209-NO), the expander 20 conducts the error processing and reporting (S210), and ends the process. If the data can be recovered (S209-YES), the expander 20 executes a data recovery process (S211).

The expander 20 converts the address of the accepted frames in the area on the SAS address of the header thereof (S212). The address is converted with reference to the address table. The expander 20 replaces the source address with the address of the device itself (expander address). It also replaces the destination address with controller address (SAS address of the controller 10). If there are the error information and recovery information (for example, information representing data recovery by the expander 20) in the area, the expander 20 sets them in the reserve area.

The expander 20 publishes the frames converted and formed at the aforementioned process to the physical port beside the controller 10 (S213), and ends the process. The process flow terminates here.

In addition to the above, an ALIGN primitive may be inserted into for the difference between longer and shorter data lengths if the transfer data length for a plurality of HDDs 30 are different. Alternatively, the difference may be padded with a data dummy. With regard to the implementation of the particular operation, it is allowable to implement the multiplex transfer only during transferring data exerting a great influence on traffic. It is also allowable to multiplex-transfer only data (user data). It is allowable to multiplex-transfer data along with all commands and status. According to the situation, it is allowable to select data to be multiplexed.

As described above, in the disk array apparatus of the each embodiment according to the present invention, multiplexing the transfer data in a plurality of HDD-side physical links 50 as one set by the controller-side physical link 40 does not require any insertion of the ALIGN primitive at the controller-side physical link 40 if there is a difference in rate between physical links in the connection of the controller 10 and HDD 30 and in data path. Thereby, the controller 10 can deliver its full performances, transferring data effectively. In addition, it is possible not only for the controller 10 to deliver its full performances but for the bus to be used efficiently for the HDD-side physical link 50, thereby to improve performances by improvement of the total traffic of the data transfer system.

The RAID system for storing distributed data in a plurality of HDDs 30 needs to provide a plurality of data in the storing process. On the other hand, in the embodiment of the present invention, an overhead for providing a plurality of data for data distribution at the slow-side physical link 50 is an inside content of the overhead at the particular operation of the total device, which exerts little influence on performances. Since the transfer data of each HDD 30 at the set of HDD 30 subjected to multiplex transfer concentrates in the controller 10, the frequency and the time of bus occupancy are reduced, accelerating data flow, and improving traffic of the data transfer system.

Since an inexpensive but slow-speed HDD 30 (1.5 Gbps) may be used as a storage device without lowering data transfer performances, the cost of the total system can be reduced. The HDD 30 side need not be a type of high speed (for example, 3.0 Gbps) for matching the rate of the controller 10, which provides an advantage of securing a technical stability.

With the configuration and functions of the disk array apparatus and commands described in each embodiment of the present invention, they are applicable to either case in which the data transfer rate is different or the same (nearly same) between the controller 10 and HDD 30 (SAS-HDD, and SATA-HDD) via the expander 20.

The present invention made by the inventor has been described above in details based upon the embodiments. The present invention is not limited to the embodiments, it is to be understood that the embodiments can be changed without departing from the scope and spirit of the present invention.

The present invention can be applied to an SAS to be connected through an SAS expander device and a disk array apparatus connected to a storage device corresponding to SATA, and a computer system.

What is claimed is:

1. A storage system comprising:
   a plurality of disk devices;
   an SAS expander coupled to the plurality of disk devices via first physical links having a first level transmission rate; and
   a controller coupled to the SAS expander via a second physical link having a second level transmission rate,
   wherein the first level transmission rate is lower than the second level transmission rate,
   wherein the controller obtains information to determine the first level transmission rate and the second level transmission rate, determines a multiplexing ratio based on the determined first and second level transmission rates, multiplexes data to be stored in at least two disk devices of the plurality of disk devices by using time division multiplexing according to the determined multiplexing ratio, transmits a predetermined parameter to the SAS expander to indicate that subsequent data are multiplexed, and transmits the multiplexed data to the SAS expander, and wherein when the SAS expander receives the predetermined parameter via the second physical link, the SAS expander demultiplexes the multiplexed data received after the predetermined parameter, and transmits demultiplexed data to the at least two disk devices in parallel to store the demultiplexed data in the at least two disk devices.

2. A storage system according to claim 1,
wherein the second level transmission rate is n times higher than the first level transmission rate,
wherein n is an integer larger than 1, and
wherein the controller determines the multiplexing ratio as n.

3. A storage system according to claim 2,
wherein the first level transmission rate is 3.0 Gbps, and the second level transmission rate is 6.0 Gbps.

4. A storage system according to claim 1,
wherein the controller transmits a request to obtain the information to determine the first level transmission rate, and
wherein the SAS expander recognizes the first level transmission rate by rate negotiation operations between the SAS expander and each of the plurality of disk devices, and reports the information to determines the first level transmission rate to the controller in response to the request from the controller.

5. A storage system according to claim 4,
wherein the controller obtains the second level transmission rate by rate negotiation operations between the controller and the SAS expander, and
wherein the controller calculates the ratio of the second level transmission rate to the first level transmission rate to determine the multiplexing ratio.

6. A storage system according to claim 1, wherein the storage system further includes another disk device coupled to the SAS expander via a third physical link having a third level transmission rate which is at the same level as the second level transmission rate.

7. A storage system according to claim 6, wherein when the controller controls to write data in the another disk device, the controller transmits the data to the SAS expander without multiplexing.

8. A storage system according to claim 1, wherein the controller multiplexes the data by a unit of a dword.

9. A storage system according to claim 1,
wherein when the SAS expander receives the predetermined parameter from the controller, the SAS expander demultiplexes the subsequent data, and when the SAS expander does not receive the predetermined parameter from the controller, the SAS expander transfers data received from the controller to a destination disk device of the data without demultiplexing.

10. A storage system according to claim 1,
wherein when the controller reads data from the at least two disk devices, data are transmitted from the at least two disk devices to the SAS expander in parallel, and the SAS expander multiplexes data received from the at least two disk devices and transmits the multiplexed data to the controller.

11. A storage system according to claim 10,
wherein the controller demultiplexes the data received from the SAS expander, and transmits demultiplexed data to a computer coupled to the storage system.

12. A storage system according to claim 10,
when the controller reads the data from the at least two disk devices, the controller transmits the predetermined parameter to the SAS expander, and the SAS expander reads the data from the at least two disk devices in parallel, multiplexes the data received from the at least two disk devices and transmits the multiplexed data to the controller according to the predetermined parameter.

13. A storage system according to claim 10, wherein the controller controls the SAS expander to receive data from the at least two disk devices in parallel, multiplex the received data and transmits the multiplexed data to the controller based on the determined multiplexing ratio.

14. A storage system according to claim 10, wherein the SAS expander includes a circuit executing multiplexing and demultiplexing operations.

15. A storage system according to claim 14, wherein the SAS expander is configured to couple to a device including another circuit executing multiplexing and demultiplexing operations.

16. A storage system comprising:
a plurality of disk devices;
an SAS expander, to which each disk device is coupled via a first physical link having a first level transmission rate; and
a controller coupled to the SAS expander via a second physical link having a second level transmission rate,
wherein the first level transmission rate is lower than the second level transmission rate,
wherein the controller obtains information to determine a ratio of the second level transmission rate to the first level transmission rate, determines a multiplexing ratio based on the determined ratio, instructs the SAS expander to read out data from at least two disk devices of the plurality of disk devices and multiplex the data by using time division multiplexing according to the determined multiplexing ratio to transmit multiplexed data to the controller,
wherein, according to an instruction from the controller, the SAS expander reads out the data from the at least two disk devices, multiplexes the data by using time division multiplexing according to the determined multiplexing ratio, and transmits the multiplexed data to the controller, and
wherein when the controller receives the multiplexed data from the SAS expander, the controller demultiplexes the multiplexed data and sends the data to a host computer coupled to the controller.

17. A storage system according to claim 16,
wherein the second level transmission rate is n times higher than the first level transmission rate, n being an integer greater than one, and
the controller determines the multiplexing ratio as n.

18. A storage system according to claim 17,
wherein the first level transmission rate is 3.0 Gbps, and the second level transmission rate is 6.0 Gbps.

19. A storage system according to claim 16,
wherein the controller obtains information of the second level transmission rate by rate negotiation operations between the controller and the SAS expander, and obtains information of the first level transmission rate from the SAS expander,
wherein the SAS expander obtains the information of the first level transmission rate by rate negotiation operations between the SAS expander and the plurality of disk devices and reports the information of the first level transmission rate to the controller, and wherein the controller calculates the ratio of the second level transmission rate to the first level transmission rate based on the obtained information of the first and second level transmission rates.

20. A storage system according to claim 16,
wherein the storage system further includes at least one another disk device coupled to the SAS expander via a third physical link having a third level transmission rate which is at the same level as the second level transmission rate,
wherein when the controller reads data from the another disk device, the controller instructs the SAS expander not to multiplex data to be transmitted from the SAS expander to the controller based on a ratio of the second level transmission rate to the third level transmission rate, and
wherein the SAS expander reads out the data from the another disk device and transmits the data to the controller without multiplexing.

21. A storage system according to claim 16, wherein the SAS expander multiplexes data by a unit of a dword.

22. A storage system according to claim 16, the ratio of the second level transmission rate to the first level transmission rate is equal to the multiplexing ratio.

* * * * *

UNITED STATES PATENT AND TRADEMARK OFFICE
CERTIFICATE OF CORRECTION

PATENT NO. : 7,251,701 B2  Page 1 of 1
APPLICATION NO. : 10/975417
DATED : July 31, 2007
INVENTOR(S) : T. Chikusa et al.

It is certified that error appears in the above-identified patent and that said Letters Patent is hereby corrected as shown below:

ON THE TITLE PAGE

Please correct (56) References Cited, U.S. PATENT DOCUMENTS, to read:

~~2,006 A * 3/1841~~ 2005/0283655  12/2005   Ashmore . . . . . . . . .    12/119.5

Signed and Sealed this

Fourth Day of December, 2007

JON W. DUDAS
*Director of the United States Patent and Trademark Office*